US007720569B2

(12) United States Patent
Forrester et al.

(10) Patent No.: US 7,720,569 B2
(45) Date of Patent: May 18, 2010

(54) ADAPTIVE INTERFACE FOR PRODUCT DISPENSING SYSTEMS

(75) Inventors: Curtis Forrester, Cumming, GA (US); Steven J. Remis, Boyce, LA (US); Brian G. Broussard, Lafayette, LA (US)

(73) Assignee: McKesson Automation Systems Inc., San Francisco, CA (US)

( * ) Notice: Subject to any disclaimer, the term of this patent is extended or adjusted under 35 U.S.C. 154(b) by 650 days.

(21) Appl. No.: 11/552,843

(22) Filed: Oct. 25, 2006

(65) Prior Publication Data

US 2007/0208454 A1 Sep. 6, 2007

Related U.S. Application Data

(60) Provisional application No. 60/730,241, filed on Oct. 25, 2005.

(51) Int. Cl.
*G06F 17/00* (2006.01)

(52) U.S. Cl. ....................... 700/241; 700/231; 700/236; 700/244

(58) Field of Classification Search ................. 700/241, 700/244, 236, 231
See application file for complete search history.

(56) References Cited

U.S. PATENT DOCUMENTS

| | | | | |
|---|---|---|---|---|
| 6,021,392 | A * | 2/2000 | Lester et al. | 705/2 |
| 6,119,932 | A * | 9/2000 | Maloney et al. | 235/380 |
| 6,735,497 | B2 * | 5/2004 | Wallace et al. | 700/231 |

* cited by examiner

*Primary Examiner*—Gene Crawford
*Assistant Examiner*—Timothy R Waggoner
(74) *Attorney, Agent, or Firm*—Alston & Bird LLP

(57) ABSTRACT

An adaptive interface is provided that is capable of brokering requests from a diverse set of customer host systems to a diverse set of backend servers (or backend device or backend automation system) controlling product dispensing devices and/or systems. The interface may be fully configurable and extensible (i.e., there is a lot of control over the behavior, and the interface can support future features without requiring code changes). Two areas of extensibility of the interface may be adapting to new message formats from the same or new host systems, and supporting new backend services.

22 Claims, 33 Drawing Sheets

55

ADAPTIVE INTERFACE FOR PRODUCT DISPENSING SYSTEMS

CROSS-REFERENCE TO RELATED APPLICATIONS

This application claims priority to U.S. Provisional Patent Application Ser. No. 60/730,241 filed on Oct. 25, 2005, which is hereby incorporated by reference.

BACKGROUND OF THE INVENTION

The present invention relates generally to an interface for use in communicating with a controller of a product dispensing system. More particularly, the invention relates to an adaptive interface for managing communications between various host management systems and various product dispensing systems.

Typical product dispensing systems, such as those used to dispense medicaments in a pharmacy, include a host management computer and one or more dispensing stations. Prescription information is entered into the host management computer. If the medicament is located within an automatic dispensing station, a controller or a work flow software program in communication with the host management computer enables a dispensing device within the dispensing station to dispense the medicament. If the medicament is located within a manual dispensing station, a controller or a work flow software program identifies the medicament's storage location within the dispensing station, for example by activating a pick light, so that a user (e.g., pharmacist, pharmacy technician, etc.) may retrieve the medicament to manually fill the prescription.

Once installed, expansion or modification of a typical product dispensing system is difficult. For example, each time that a new type of dispensing station is added to the product dispensing system or a new function is added to an existing dispensing device, programming changes must be implemented to the host management computer so that the host management computer is able to activate the new dispensing devices. For example, a product dispensing system may initially include dispensing stations having Baker Cell™ dispensing devices, Baker Cassette™ dispensing devices, and Baker Universal pharmacy scales. If, for example, additional features are added to the Baker Cell™ dispensing devices the host management computer must be updated to exploit these new features. Additionally, if a different type of dispensing device is introduced to the product dispensing system, new software drivers must be installed so that the host management computer can activate the new type of dispensing device. Each time a driver or software is added or updated, the host management computer must be re-booted before the changes to the system can take effect.

Because the host management computer must be updated to reflect changes made to the product dispensing system, the host management computer's software tends to become customized for each specific installation. Customization increases the time necessary to create software upgrades, increases the likelihood that glitches will be introduced into the host management computer by a software or driver upgrade, increases the time necessary to troubleshoot problems that occur, and raises the expense of operating the product dispensing system.

Therefore, a need exists for an adaptive interface capable of managing communications between and/or amongst a diverse set of host management systems or computers and a diverse set of product dispensing devices or systems.

BRIEF SUMMARY OF THE INVENTION

In general, exemplary embodiments of the present invention provide an adaptive interface capable of brokering requests from a diverse set of customer host systems to a diverse set of backend servers (or backend device or backend automation system) controlling product dispensing devices and/or systems. The interface of one exemplary embodiment runs as a Windows service or Linux daemon. The interface may be fully configurable and extensible. Configurable means that there is a lot of control over the behavior, and extensible means that the interface can support future features without requiring code changes. In another exemplary embodiment, the interface follows an "appliance" model—sort of like a transformer and is preferably multi-platform, supporting Windows and Linux. The interface of one exemplary embodiment provides excellent diagnostics and performance feedback. The two areas of extensibility of the interface are adapting to new message formats from the same or new host systems, and supporting new backend services.

The interface of one exemplary embodiment employs three types of XML files to detail run-time configuration, to define host interaction, and to define backend interaction. The configuration sets general attributes. The host system definition files—the Host Definition Files (HDF) define all aspects of interacting with a host such as message transport (TCP/IP, serial, file), message format and layout, and the request protocols. They answer the question, "How do I listen for, receive, understand and handle requests from a particular type of host?" The backend file—the Backend Definition File (BDF)—defines each of the backend services, the method of communication, and the message layout and protocols. It answers the question, "How do I handle request data from a host by interacting with the backend servers?"

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
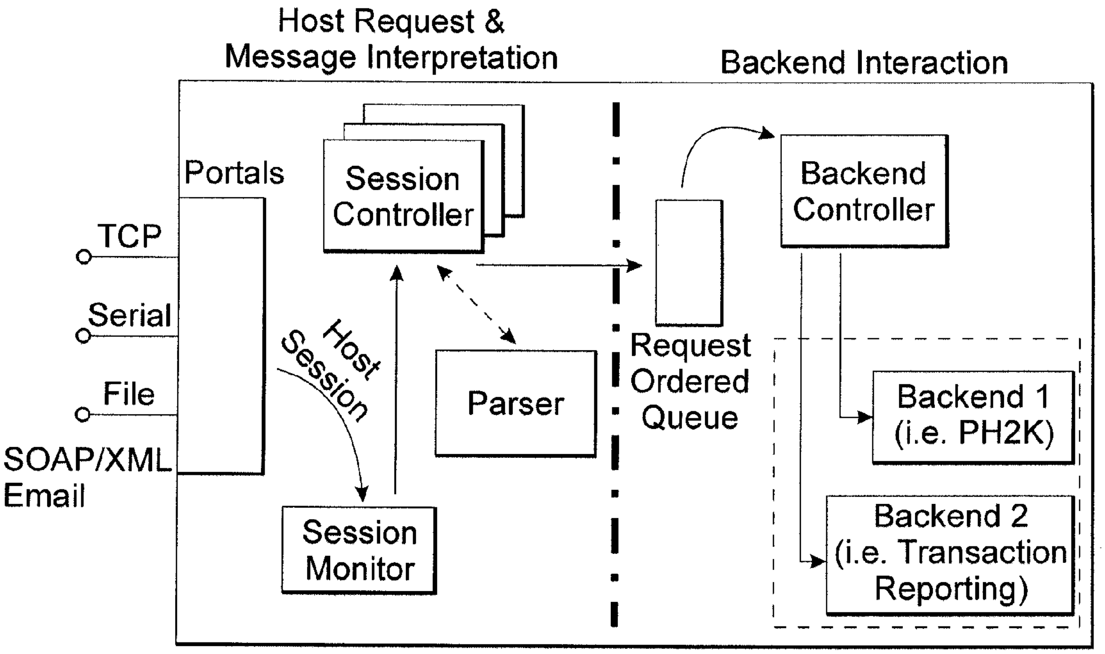
FIG. 1 is a simplified block diagram of an adaptive interface according to an embodiment of the present invention.
Figure 2:
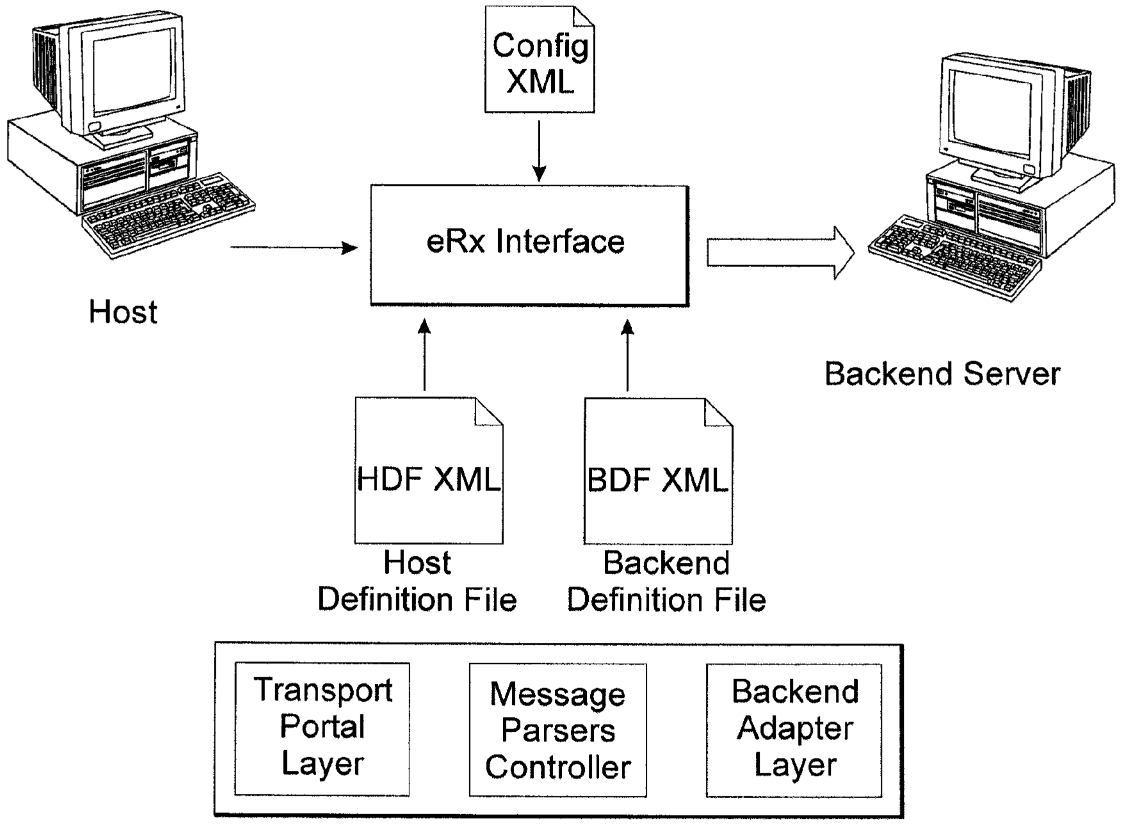
FIG. 2 is a simplified block diagram of a communication system or network comprising an adaptive interface according to an embodiment of the present invention.

A high-level picture of a system comprising an interface according to an exemplary embodiment of the present invention is shown in FIG. 2.

The host and backend servers themselves are outside of the control domain of the interface. Although a host may be modified somewhat to interact with the Interface, preferably minimal or no development or modifications to the interface code are required to communicate with the host systems or backend systems of the present invention.

The configuration XML, in practice, is preferably customized to support each specific installation. For example, it will include IP addresses of the host and backend servers, and will detail exactly which HDF and BDF XML files to load to support their environment.

The HDF and BDF files preferably are defined and tested by the manufacturer of the product dispensing systems or devices, and delivered as part thereof to a customer site. Once these files are defined they should remain basically unchanged unless the message structure or a backend server is modified. As such, they are developed, tested, and versioned along with the core interface product. If the product is installed into new customer sites, a new set of HDF may be developed to support a new customer host format, unless they decide to use one of the already-created standards-based definitions (HL7, for example).

Host Systems

The host is the computer that communicates with the product dispensing device or system (which my include a server or controller) through the interface. Such system or device may, or may not, already be in place and support a method of sending requests. The customer may already be communicating with another system, or may be designed to support a particular request format; this format may follow a standard, such as HL7, or may be a proprietary internal standard.

The interface preferably supports a wide set of message format standards and variations including a published interface standard and customizations for specific customer sites. A new host may require a different message format, and may require a specific type of response message or messages. The interface of the present invention preferably provides a way to define the layout of new messages using an XML file, and allows definition of both inbound and outbound messages.

eRx Interface Behavior Summary

The interface according to an embodiment of the present invention preferably has the following general behavior support: Multiple host transport portals—The interface supports multiple, simultaneous transport channels. For example, several TCP Socket ports, a serial, and file polling may all be active at the same time. Support for multiple types of active hosts and request formats. Fully multi-threaded support—multiple request transactions at the same time. Ability to "single-thread" requests to a backend—if the backend server or device can not handle simultaneous requests. Request "transaction" tracking—ability to log each transaction with configurable levels of detail. Error or warning log—separate log to list current and historical warnings or errors.

Configuration Files and the eRx Interface

Preferably, three files configure and define how the interface server behaves. These files reside on the local file system or on remote servers, and are loaded on startup. A single XML file contains the general server configuration. This XML file includes details of which hosts to support, how they communicate, and the "HDF" to use to handle the message format. It also configured which backend servers are integrated. Part of the foundation of the interface is a set of host and backend definition XML files. There is one HDF for each of the types of hosts and request/message formats. There is also one BDF for each type of backend supported. All of these files are standard XML files, and are not necessarily designed to be customer supported. There is a configuration GUI to support easy configuration of the general installation settings. The BDF and HDF files preferably are manually created as part of the development process, and in the event of a new customer host system and message format, will be created and tested for such new customer host system.

Host Definition Files

Host Definition Files contain a description of the interaction between one host and the adaptive interface. Host Definition Files describe the communication method and the message format both from and to the host. They also contain a mapping between the host request fields and the message object sent to the backend adapter(s). Host Definition Files preferably are loaded by the interface on startup, and describe a run-time relationship between hosts and the interface.

HDF Sections

The primary sections in an HDF are: (1) Message Definitions—defines message format layout; (2) Field Mappings—maps host message fields to backend message objects; (3) Scripts—to implement special data handling script; and (4) Rules—pattern to recognize the type of message.

Message Definitions

Message definitions define the layout and interpretation of the messages that are received from and sent to the host. It includes support for a wide variety of message types including fixed-length field, delimited field layout, and segmented records. Message definitions also may allow for a combination of these types in the same message.

Field Mappings

Once a message has been received and interpreted, the data must be mapped to the message object that is sent to the backend. This section maps the host fields to the backend fields. It provides for data conversions and reformatting where necessary.

Scripts

The server implements a VB Scripting engine that allows specific handling of field data. Generally the meta-data in the HDF XML files simply maps a field unchanged from the host request to the backend. The scripting engine allows specific manipulation of the data before mapping it.

Rules

Since a host may send several types of requests, the rules provide a "pattern recognition" engine to determine the type of request that is received, and to define which message definition handles that specific type of request.

Backend Definition Files

Backend Definition Files contain a description of the interaction between the interface and the backend servers. They provide the possibility of externalizing changes between how the interface interacts with backend servers with no need for code changes. BDF are composed of message object definitions, commands definitions, and backend service definition. Message object definitions define message objects that are used by the parser and by the backend adapter. The parser populates the data in a message object and the backend adapter may use the fields to write to the backend. Think of these as simply a container, or data structure. This supports the requirement of a solid separation between the knowledge about the host and the knowledge of the backend. The host implementation never assumes that any specific backend is being used. Likewise, the backend logic also never assumes that any specific host is sending requests.

Command definitions list the commands that the adaptive interface supports. Each backend may implement, or define a command handler, for each of these commands.

Backend service definitions define each of the backend services, and the commands they support. The supported types of interaction are: File—specifically, supporting the Will Call type of scenario; Database—interaction with backend database to support transactions; Socket—sending and receiving messages with a backend server over TCP.

There are three broad sections that are defined within a Backend Definition File. (1) Message objects—these define messages that can be referenced internally and from the HDF. (2) Backend definitions—these simply name the backend, and point to the script that implements the logic for it. (3) Along with these sections, the BDF can also include Property definitions. These can be thought of as simply name value "variables", or containers to hold either pre-defined properties or run-time values (actually, request-time).

Finally, the backend logic is either implemented in C#, or in the VB script engine.

Figure 3:
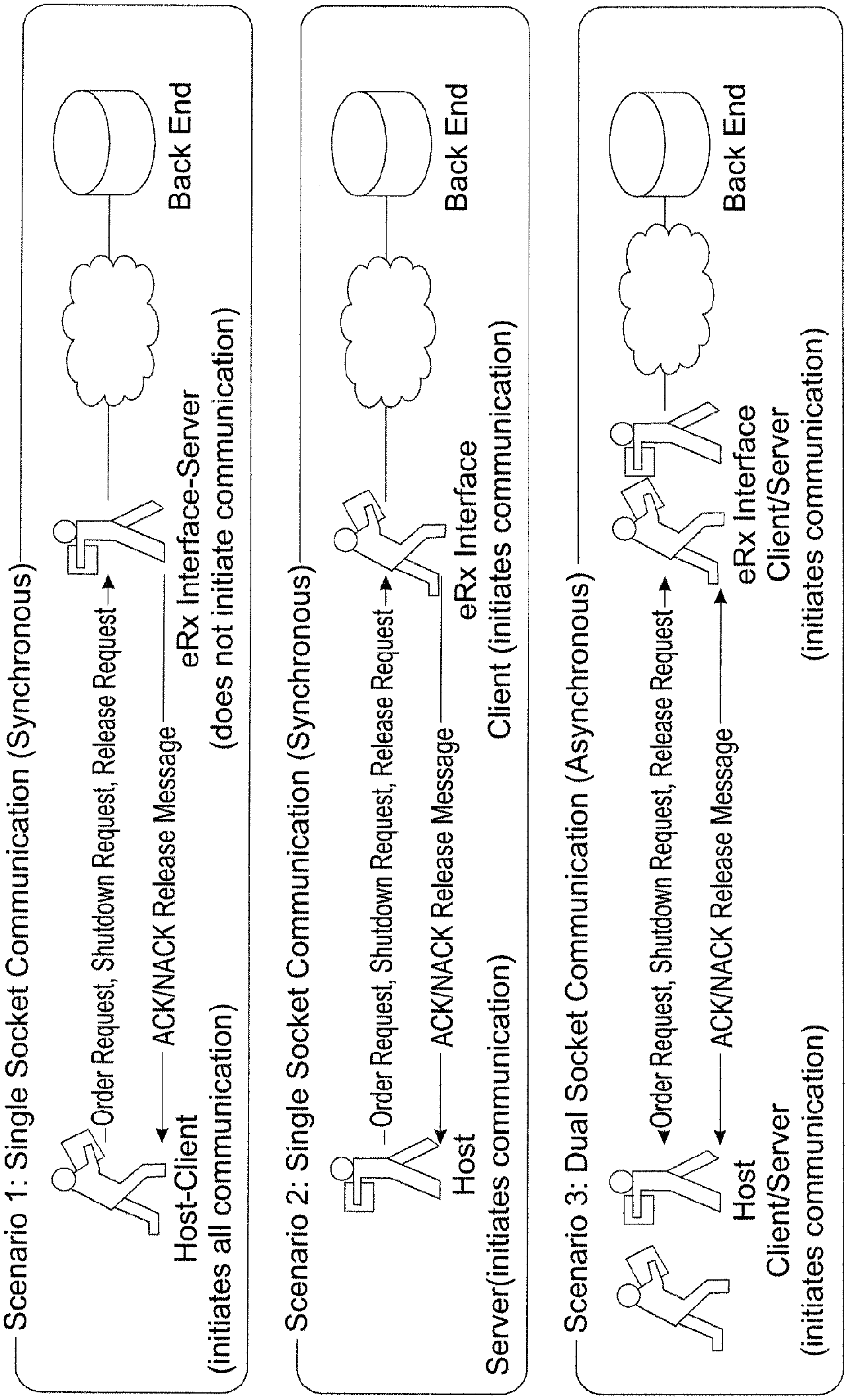
FIG. 3 is a simplified block diagram illustrating various communication links and/or connections to and from an adaptive interface according to an embodiment of the present invention.

FIG. 3 is a simplified block diagram illustrating various communication links and/or connections to and from an adaptive interface according to an embodiment of the present invention.

The interface according to an embodiment of the present invention supports three types of communication: Network connection over TCP/IP (Sockets); Serial line; and File/Directory polling.

A network connection is similar to how a web browser communicates with a web server over the Internet: the browser opens a channel to the remote web server, and sends text (or binary) requests through that channel. The web server, then, sends the web page or an error as a reply through the same channel. If the host does not already have a method for generating prescription requests, such host preferably will employ a network connection to communicate with the interface.

The serial line connection uses a physical serial cable connected from the host computer to the computer running the interface. The interface listens for requests over the serial port.

With file/directory polling the host writes requests into specially named files into a directory. The interface periodically looks into that directory watching for these request files.

It reads the files, performs the request, and optionally communicates a response to another file.

Network Connection Details

When a host connects to the interface over a network, it generally opens a "socket" connection that is used to send requests and receive replies. Optionally a second socket connection can be used for sending "releases" to the host. The diagrams of FIG. 3 illustrate the several operating modes.

The "scenario 1" mode uses a single connection, but all transactions are initiated by the host. The host requests, the interface responds.

The "scenario 2" mode also uses a single connection, but the host sends requests and does not necessarily expect an immediate reply. The interface will reply when ready over the same connection, and may also later initiate the sending of "releases", or other event messages to the host. This mode preferably is commonly employed.

With "scenario 3" there are two connections. The host initiates a connection to the interface which, in turn, initiates another connection back to the host. The first connection is used by the host to send requests to the interface while the second connection is used by the interface to send replies and "releases". This is a truly "asynchronous" mode required by some hosts.

To make modifications to the interface for a given host, the following questions must be answered: (1) Which communication mode more closely matches the expected interaction by the host, if any? (2) Does the host expect a method of communication that does not match any of the above scenarios? If so, describe the expected behavior. Note that a host preferably may open multiple connections to the interface, and send requests through each simultaneously.

Serial Line Details

When the host is to communicate with the interface over a serial line(s), the connection is a physical and dedicated line from the host to the interface. The interface supports as many serial lines as the computer physically supports. Each can operate independent of the others.

Figure 4:
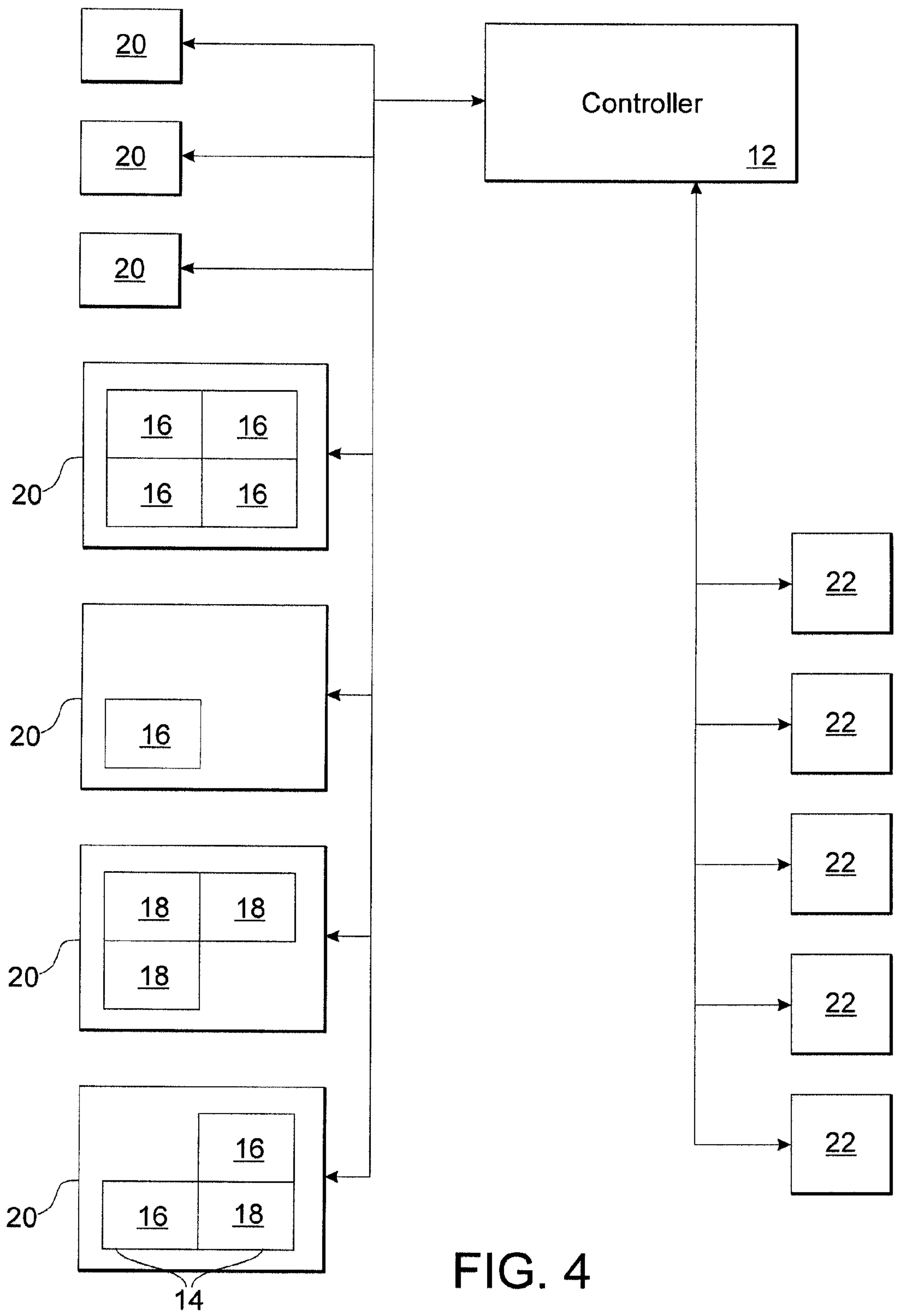
FIG. 4 is a simplified block diagram of a product dispensing system for use with an adaptive interface according to an embodiment of the present invention.

FIG. 4 is a simplified block diagram of a product dispensing system 10 according to an embodiment of the present invention. For simplicity, the product dispensing system 10 in one embodiment is described as being used to dispense medicaments (for example, in a pharmacy setting). It should be noted, however, that the description is in no way intended to limit the product dispensing system 10 to that use and that other products may be dispensed while remaining within the scope of the present invention.

The product dispensing system 10 may include a controller 12, one or more dispensing stations 20, and one or more validation devices 22. A dispensing station 20 may be comprised of one or more automated dispensing devices 16 and/or one or more non-automated dispensing devices 18. For example, a plurality of automated dispensing devices 16 such as Baker Cells or Baker Cassettes may be housed within a single cabinet. Likewise, a plurality of non-automated dispensing devices 18 (such as a plurality of bins) may be housed within a stationary shelving unit. A single cabinet, multiple cabinets, and the stationary shelving unit may each comprise one of the dispensing stations 20. Each automated dispensing device 16 and each non-automated dispensing device 18 comprises a dispensing location 14. Hybrid types of equipment, such as a carousel, which may be viewed as partially automated and partially non-automated (automatically presenting the correct bin for a manual pick of an item) may be included in either the automated or non-automated categories.

A validation device 22 may include, for example, a scale, a barcode scanner, an RF scanner, and a quality control device (such as pill verification devices, fragment detection devices, etc.). One or more validation devices 22 may be used at various times by the product dispensing system 10. For example, a validation device 22 may be used during dispensing and/or during replenishment to verify that the correct medicament is being dispensed or replenished, to verify that the correct quantity of the medicament is being dispensed or replenished, and to verify that the quality is acceptable for the medicament being dispensed or replenished. It should be noted that one or more functions of a validation device may be incorporated into a dispensing location 14 while remaining within the scope of the present invention. For example, fragment detection may be incorporated into an automated dispensing device 16.

Figure 5:
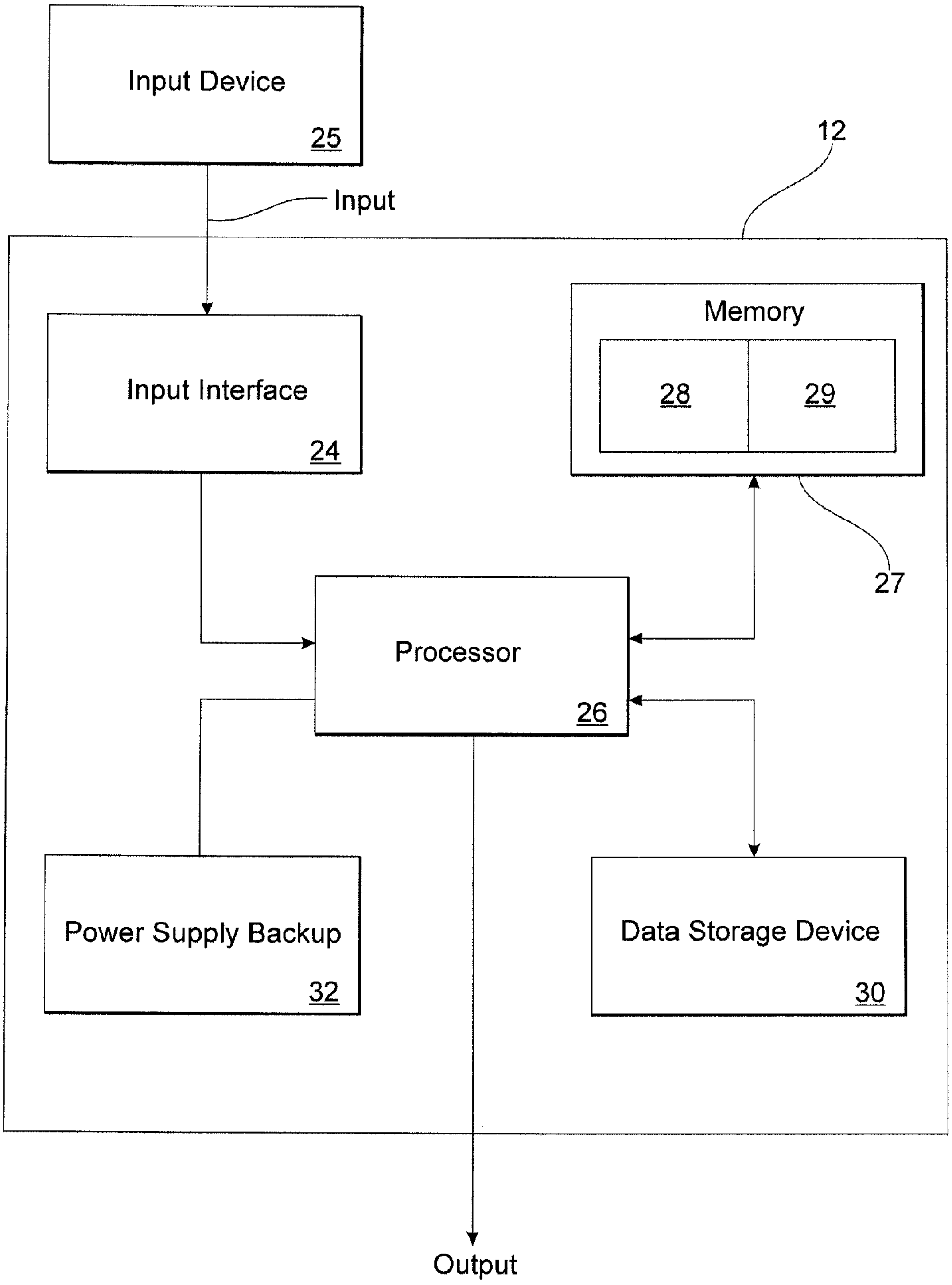
FIG. 5 is a simplified block diagram of a controller for the product dispensing system of FIG. 4 according to one embodiment of the present invention.

FIG. 5 is a simplified block diagram of the controller 12 for the product dispensing system 10 of FIG. 4 according to one embodiment of the present invention. Controller 12 may include one or more input interfaces 24, a processor 26, a memory 27, a data storage device 30, and a power supply backup 32. It should be noted that the functionality of the controller may be implemented on a personal computer, workstation, PDA, etc.

In one embodiment, controller 12 may be accessed using a hand held touch screen device having a built in processor, communications device, internal flash memory, and removable flash memory card. For example, controller 12 may be access by a PDA. Control code on the PDA may communicate with the controller 12. It should be noted that multiple PDAs may access the controller concurrently.

The input interface 24 is responsive to an input device 25. Input device 25 may be any device operable to input data to the controller 12. For example, an input device 25 may include a communications link, a keyboard, a mouse, a touch screen, a bar code scanner, an RF tag reader, an image scanner, a personal digital assistant (PDA), a fingerprint scanner, a retinal scanner, a microphone, etc. Controller 12 may support several input devices 25 depending upon the input interface 24 provided and may be operable to simultaneously support access by multiple users. For example, controller 12 may be able to support multiple users accessing the product dispensing system 10 via multiple PDA's, a PDA and a touch screen, a bar code scanner and a touch screen, etc. It should be noted that the type and number of input devices 25 supported by controller 12 may be altered while remaining within the scope of the present invention.

In one embodiment, the input device 25 is operable to receive at least one of dispensing information, user information, product information, inventory control information, validation information, and maintenance information. Dispensing information refers to data used to request a particular product from the product dispensing system 10. User information refers to data used to identify a person operating the product dispensing system 10. Product information refers to information that may be used to identify a given medicament, for example, a medicament's stock number, lot number, manufacture date, manufacturer, expiration date, specifications (i.e., size, color, piece weight etc.), and the quantity in a dispensable unit (e.g., each, per box of 10, etc.). Inventory control information refers to data used to establish, track, and report the product inventory levels within one or more dispensing locations 14 for the product dispensing system 10. Validation information refers to data used by the product dispensing system 10 to insure that the correct product is being dispensed or replenished, that the correct quantity of the product is being dispensed or replenished, and to insure that the quality is acceptable for the product being dispensed or replenished. Maintenance information refers to information used by the product dispensing system 10 to schedule maintenance and cleaning intervals for one or more dispensing locations 14. These explanations are not intended to be exclusive, but rather are provided to aid the reader in understanding the present invention.

Processor 26 may be operable to receive input data and commands, to execute one or more coded instructions, and to output commands and data. Processor 26 may be operable to communicate with the other components of controller 12 (e.g., input interface 24, memory 27, storage device 30, etc.) and with other components of the product dispensing system 10 (e.g., dispensing stations 20, validation devices 22, etc.).

Memory 27 may include an internal flash memory 28 and/or a removable flash memory 29 component. The removable flash memory 29 may be implemented using a memory card that is accessed by a memory card reader (not shown). Memory 27 may be operable to store instructions and information used by the controller 12. For example, one or more device drivers (for activating an automatic dispensing device 16 and/or a validation device 22) and one or more graphical user interfaces (GUI) may be stored in memory 27. In one embodiment, memory 27 may store AccuMed cabinet, RxPort cell, cell, cassette, Baker Universal Scale, AutoScript III (ASIII), and packing box device drivers and cell, cassette, and Baker Universal Scale GUI's.

Drivers convert command information from the controller 12 (for example, from the processor 26) into commands that are recognizable by one or more automated dispensing devices 16 and convert signals from one or more automated dispensing devices 16 into data that is recognizable by the controller 12. Likewise, drivers also convert command information from controller 12 (for example, from the processor 26) into commands that are recognizable by one or more validation devices 22 and convert signals from one or more validation devices 22 into data that is recognizable by the controller 12. It should be noted that in one embodiment, the drivers may be operable to simultaneously drive multiple automatic dispensing devices 16 and/or validation devices 22.

One or more GUIs may facilitate user interaction with the controller 12 and with the other components of the product dispensing system 10. A GUI may include a pictorial representation of a dispensing station 20, each dispensing location 14 (e.g., cell, cassette, bin, etc.) within each dispensing station 20, and the products associated with each dispensing location 14. In one embodiment, GUIs that are frequently accessed by the user (e.g., a GUI of an automated dispensing device 16 accessed during a dispensing operation) may be stored within memory 27, whereas GUI's that are infrequently accessed by the user (e.g., a medicament mapping GUI) may be stored elsewhere (e.g., within data storage device 30 or in an external data storage device (not shown)).

In one embodiment, processor 26 is responsive to the input device 25 and to the memory 27. For example, the processor 26 may select an address which may be comprised of a station address (identifying the station 20) and a local address (identifying a dispensing location 14) of a dispensing device 16, 18 based on the information received from the input device 25 and from information stored in the memory 27 which links the requested medicament to an associated dispensing location 14 or device 16, 18. The processor 26 may also be operable to elect a driver from a plurality of drivers if the address corresponds to an automated dispensing device 16 and/or a validation device 22. The processor 26 may also be operable to produce an output responsive to the address if the address corresponds to a nonautomated dispensing device 18. That output may take a variety of forms including an identification of the device (e.g., the McKesson MedCarousel), signals needed to operate the device (e.g., signals to rotate the carousel's bins to the proper position), the location of the device (e.g., shelving unit 2 in storage room 406), pick lighting, door unlock signals, etc. In sum, it is anticipated that the type of signals produced in response to the selected address will be as broad as the types and variety of the storage locations that are provided.

It should be noted that the information stored in memory 27 may be upgraded, or new information may be added, by "hot swapping" (i.e., may be updated or added without rebooting the controller 12). For example, if a new type of automated dispensing device 16 is added to the product dispensing system 10, or if a new feature is added to an existing automated dispensing device 16, the device driver associated with the new and/or improved automated dispensing device 16 may be changed by hot swapping. A removable flash memory 29 containing the new device driver may be inserted into controller's 12 flash card reader (not shown). The new driver may then be transferred to the controller's 12 internal flash memory 28 where it is immediately available to the controller 12, without the need of re-booting the controller 12. It should be noted that the device drivers may also be accessed by processor 26 directly from removable flash memory 29 without first being transferred to the internal flash memory 28.

Back-up power supply 32 may be internally located within controller 12, thereby providing a continuance of power during periods of short power outages and decreasing the physical size of the product dispensing system 10. Back-up power supply 32 may be implemented using common components as is know in the art.

In one embodiment, one or more databases and one or more GUI's may reside on data storage device 30. The databases may contain prescription information, site information, product information, archive information, history files, etc. The databases may also be used to store dispensing information, user information, product information, inventory control information, validation information, and maintenance information as discussed above. It should be noted that the information stored in the database may be stored as a single database, or as in one embodiment, stored in multiple databases. The database may be implemented using various hardware and software configurations as is known in the art to access a keyed set of data. For example, the database may be implemented as a relational database, as a distributed database, or as an object-oriented programming database. The database may reside on one or more data storage devices 30. Data storage device 30 may be implemented using a disc drive, CD-ROM, tape drive, flash memory, etc.

Prescription information refers to data used to request a particular medicament from the product dispensing system 10 (it should be noted that in one embodiment, prescription information may be considered as one type of dispensing information as discussed above). Prescription information may include, for example, patient data (e.g., name, address, age, phone number, allergies, insurance carrier, etc.), medicament data (e.g., name, medicament number, dosage, number of refills, substitute medicament permission, etc.), and prescribing physician data (name, office address, phone number, etc.).

Site information refers to data used to map each medicament's location within the product dispensing system 10. For example, the product dispensing system 10 may use one or more dispensing stations 20, each having one or more dispensing locations 14 therein. Site information may include data related to the dispensing location 14 type (e.g., automated or non-automated, cell or cassette, bin or shelf, etc.), the mapping of the location for each medicament within a dispensing location 14, as well as the inventory of each medicament within the product dispensing system 10.

Archive information refers to data that may be related to a dispensing transaction that may be required for reporting purposes. In one embodiment, archive information may include information required to be saved for government regulators such as type, amount, and dosage of medicament dispensed, insurance carrier information, prescribing doctor information, etc.

A history file refers to data that may be saved for later use by the product dispensing system 10 administrator. For example, a history file may include inventory data, customer information, customer ordering history, user information, access logs, transaction logs, etc. It should be noted that the type of information stored in the database(s) may be altered while remaining within the scope of the present information. For example, pill images (i.e., graphical or pictorial representations of medicaments that are stocked in the product dispensing system 10) may also be stored in the database(s).

The GUI's residing on the data storage device 30 may be operable to facilitate user interaction with the controller 12 and other components of the product dispensing system 10. For example, in one embodiment, a medicament mapping GUI, a replenishment GUI, and an inventory GUI may be stored on the data storage device 30 and may be used to facilitate the medicament mapping, replenishment, and inventory processes, respectively, initiated by a user. The GUI's may also be used to facilitate the input and output of at least one of dispensing information, user information, product information, inventory control information, validation information, maintenance information, and mapping information (information linking products to locations). GUI's may include a pictorial representation of each dispensing station 20 and the products associated with the plurality of dispensing locations 14 within each dispensing station 20. GUI's that are frequently accessed by the user (e.g., a GUI for an automated dispensing device 16 accessed during the prescription filling process) may be stored within memory 27, whereas GUI's that are infrequently accessed by the user (e.g., a medicament mapping GUI) may reside on data storage device 30. It should be noted that other GUI's may be added, for example to facilitate a maintenance process, while remaining within the scope of the present invention.

The controller 12 may utilize a database manager (not shown) to facilitate communication between the processor 26 and database(s) stored on the data storage device 30. The database manager may accept commands from and may provide data to processor 26, and may retrieve and store information within the database(s) residing on data storage device 30.

The database manager may be implemented using various hardware and software configurations as is known in the art. For example, the database manager may be implemented as a software component that may be implemented within controller 12. It should be noted that other implementations may be used for the database manager while remaining within the scope of the present invention.

It should be noted that controller 12 may also include other components for improving the product dispensing system 10. For example, controller 12 may provide a Baker Cell Computer Link emulator (not shown), to allow the deploying of AccuMed cabinets in a traditional Baker Cell™ dispensing device environment.

It should also be noted that controller 12 may be operable to communicate with, and able to facilitate communication between, the product dispensing system 10 and a host management system (not shown). For example, controller 12 may accept information from a host management system and translate the information into a format that is recognizable to product dispensing system 10. Likewise controller 12 may accept information from product dispensing system 10 (for example, data retrieved from a database) and translate the information into a format that is recognizable to a host management system.

In one embodiment, the controller 12 supports existing host management system interfaces and allows for the addition of customer specific host management system interfaces as they are developed and become available for use with the dispensing system 10. Additionally, controller 12 may be operable to support an internet browser, thus allowing remote access to the product dispensing system 10.

As used herein, the term "host management system" generally refers to any method, means, and/or apparatus (either manual and/or automatic) that is used to provide prescription information to the product dispensing system 10. As discussed above, prescription information refers to data used to request a particular medicament from the product dispensing system 10 and may include, for example, patient data (e.g., name, address, age, phone number, allergies, insurance carrier, etc.), medicament data (e.g., name, medicament number, dosage, number of refills, substitute medicament permission, etc.), and prescribing physician data (name, office address, phone number, etc.). The prescription information may be adjudicated, which means that a determination is made as to whether equivalent medicaments may be dispensed for the medicament prescribed by the physician.

The host management system may include a host management computer executing a software program that receives prescription information, applies rules associated with the prescription information (e.g., rules related to adverse medicament interactions, to payment ability of the customer, to payment ability of the insurance carrier, etc.), and produces adjudicated prescription information based upon the received prescription information and applicable rules. The host management computer may include a central processing unit, display, input devices (for example, a keyboard, bar code scanner, mouse, etc.), memory, data storage device (for example, a disc drive, CD-ROM, tape drive, etc.) and a communications device (for example, an Ethernet card, modem, etc.) for communicating with the product dispensing system 10.

The host management system may also include a manual process which produces prescription information which may be communicated to the product dispensing system 10 by a phone line, fax line, email line, or entered using another input device 25. For example, a pharmacy technician may apply rules gathered from a text or manual to the prescription information to obtain adjudicated prescription information which is then communicated to the product dispensing system 10.

It should be noted that the output of the host management system may be in any form that can be used by the product dispensing system 10 (e.g., electronic, paper, wireless, etc.). For example, the host management system may produce a transaction data sheet. The transaction data sheet may be transmitted electronically and/or may include one or more bar code labels that may be scanned for use by the product dispensing system 10.

Selecting a Dispensing Location/Validation Device

Figure 6:
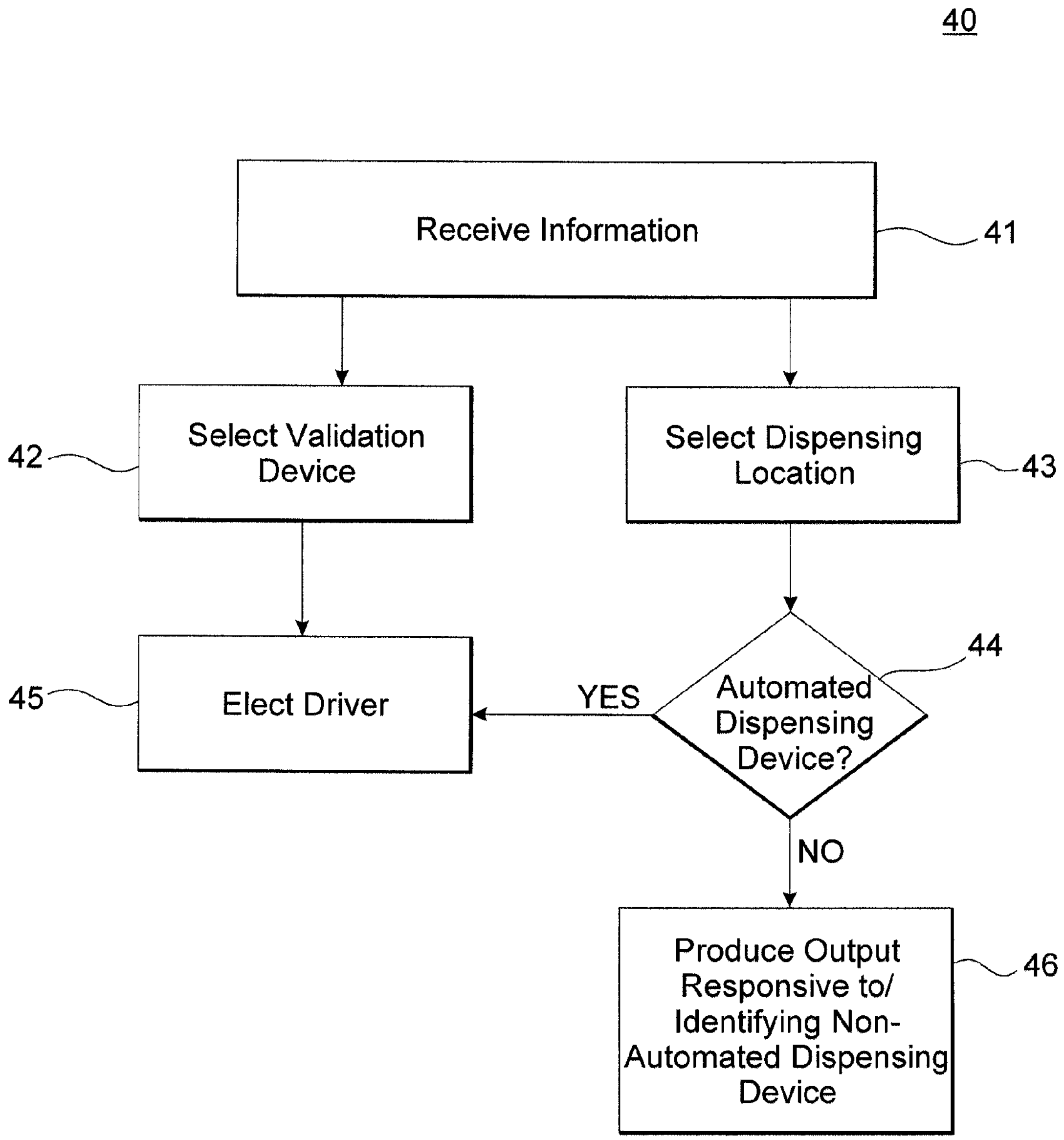
FIG. 6 is an operational process for selecting a dispensing location and/or validation device within the product dispensing system of FIG. 4 according to an embodiment of the present invention.

FIG. 6 is an operational process 40 for selecting a dispensing location 14 and/or validation device 22 within the product dispensing system 10 of FIG. 4 according to an embodiment of the present invention. A typical dispensing operation using the product dispensing system 10 may begin with a pharmacist or pharmacy technician logging onto, and entering prescription information into, a host management system. The host management system may produce adjudicated prescription information which may be encoded in one or more bar code labels for scanning by an input device 25 of the product dispensing system 10.

Operational process 40 begins when the product dispensing system 10 receives information in operation 41. For example, controller 12 may receive information when the bar code containing the adjudicated prescription information is scanned using a bar code scanner and/or the adjudicated prescription information is electronically transmitted to controller's 12 input interface 24 which may be a communication device (e.g., modem, network card, etc.). It should be noted that controller 12 may also receive information directly, for example, when a user enters prescription information and/or adjudicated prescription information using an input device 25 such as a touch screen, PDA, keyboard, etc. The received information may be saved in a database residing on the data storage device 30.

After the information is received in operation 41, a dispensing location 14 within the product dispensing system 10 is selected in operation 43 and/or a validation device 22 is selected in operation 42 in response to the information entered in operation 41 and data linking the requested product with (or mapping product to) dispensing locations for that product. For example in one embodiment, the medicament's name, medicament number, dosage, substitute medicament permission, etc. may be used by the controller 12 to select a dispensing location 14 containing the desired medicament and/or a validation device 22 to insure that the proper medicament is dispensed.

If a validation device 22 is selected in operation 42, a device driver associated with the selected validation device 22 is elected in operation 45. As discussed above, one or more validation devices 22 may be used at various times by the product dispensing system 10. Thus, more than one driver may be activated at any given time (e.g., to support multiple users or multiple methods of inputting information into the system).

If a dispensing location 14 is selected in operation 43, a determination is made in operation 44 as to whether the dispensing location 14 is associated with an automated dispensing device 16. If it is determined in operation 44 that the selected dispensing location 14 is associated with an automated dispensing device 16, control branches YES and is passed to operation 45. A device driver associated with the selected automated dispensing device 16 is elected in operation 45.

If it is determined in operation 44 that the selected dispensing location 14 is not associated with an automated dispensing device 16 (i.e., the dispensing location 14 is associated with a non-automated dispensing device 18), control branches NO and is passed to operation 46. In operation 46, the controller 12 produces an output responsive to the address of, and/or identifies, the non-automated dispensing device 18 which contains the desired medicament. For example, controller 12 may produce an output signal which is used to activate a pick light, unlock a drawer, activate an indicator, etc. corresponding the selected non-automated dispensing device 18 as discussed above.

It should be noted that "elected" as used in this document means to select, load, and/or initialize the driver used to control the selected validation device 22 and/or selected automated dispensing device 16. For example, if the automated dispensing device 16 selected in operation 43 is a cassette, a cassette driver may be elected in operation 45. Likewise, if the validation device 22 selected in operation 42 is a scale, the driver related to the scale is elected in operation 45.

Mapping

Figure 7:
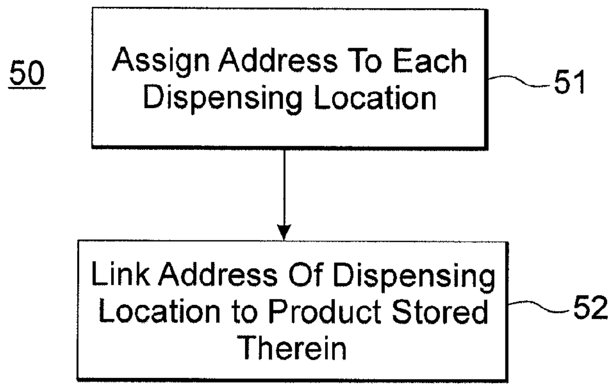
FIG. 7 is an operational process for creating a product map for the product dispensing system of FIG. 4 according to an embodiment of the present invention.

FIG. 7 is an operational process 50 for creating a product map for the product dispensing system 10 of FIG. 4 according to an embodiment of the present invention. Product mapping refers to a process of identifying a specific dispensing location 14 and the medicament carried therein for one or more dispensing locations 14 within the product dispensing system 10. In its simplest form, the "map" is a link between a product and a dispensing location 14.

Operational process 50 begins when an address is assigned to each dispensing location 14 within the product dispensing system 10 in operation 51. The dispensing location's 14 address may include a portion related to the dispensing station 20 (e.g., an AccuMed Cabinet, a RxPort Cabinet, etc.) in which the dispensing location 14 is grouped. Additionally, the address may include a unique local address portion which identifies the particular dispensing location 14 (for example, each cell, cassette, bin, etc) within the dispensing station 20.

After an address is assigned in operation 51, the address of the dispensing location 14 is linked to the product stored therein in operation 52. For example in one embodiment, a medicament may be placed within a dispensing location 14 that has been assigned an address in operation 51. A medicament identifier (e.g., name, medicament number, stock number, etc.) may then be linked to (i.e., associated with) the address of the dispensing location 14 in a table. The table may then be stored in a database residing on the data storage device 30 or in the memory 27. Accordingly, if prescription information is entered into the product dispensing system 10 calling for the specific medicament to be dispensed, for example, the dispensing location 14 linked to that medicament may be selected and, depending on the type of dispensing location 14 selected, the appropriate driver may be elected or the appropriate output signal may be produced.

Figure 11:
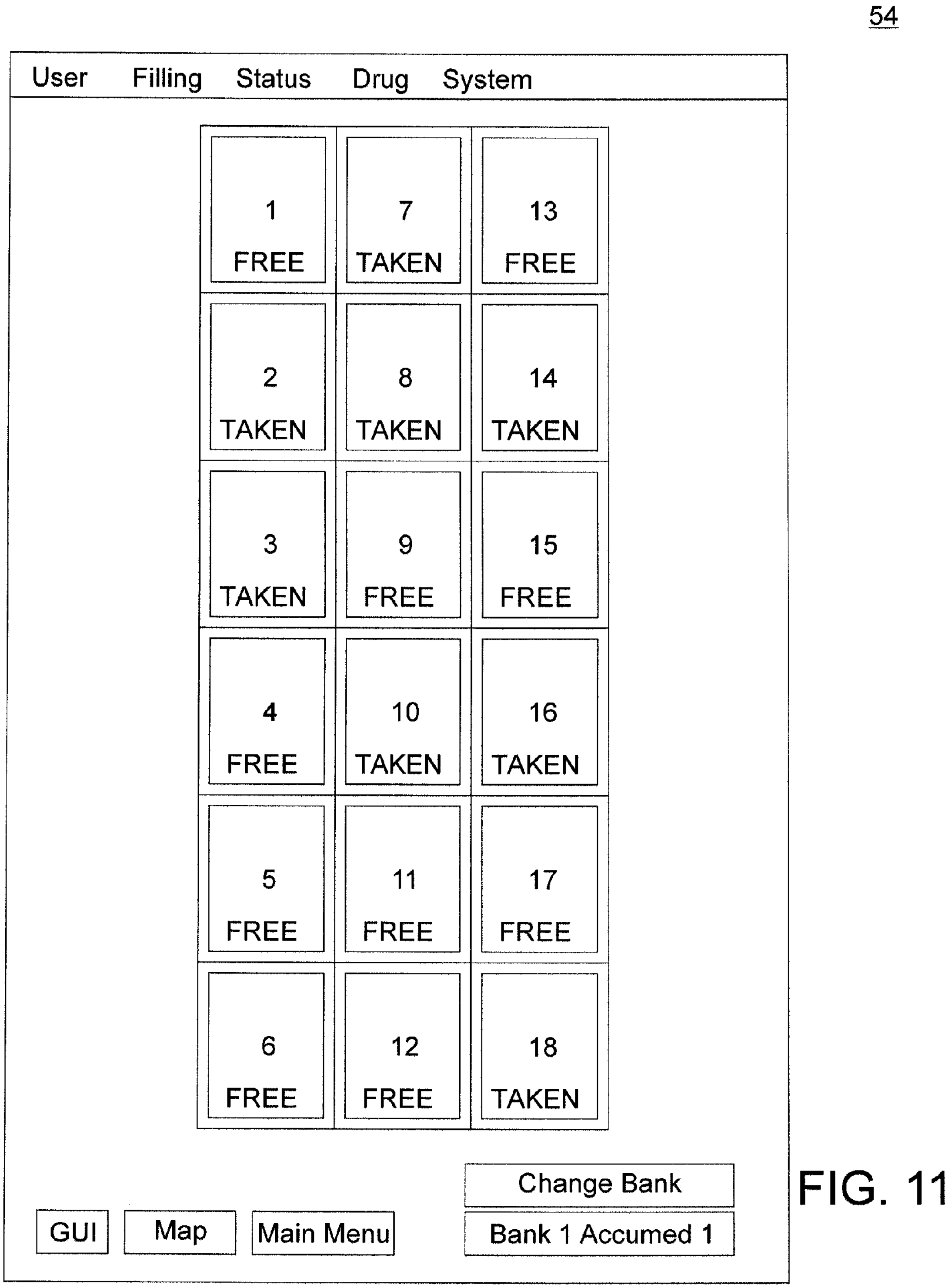
FIG. 11 is a graphical user interface screen display for a dispensing station during the product mapping process of FIG. 7 according to an embodiment of the present invention.

The medicament mapping process allows a user an easy and intuitive method for locating, adding, editing and deleting a medicament from a specific dispensing location 14. For example, FIG. 11 illustrates a graphical user interface (GUI) 54 used during the medicament mapping process for a dispensing station 20 according to an embodiment of the present invention. As illustrated in FIG. 11, GUI 54 represents eighteen dispensing locations 14 grouped in a single dispensing station 20. The dispensing locations 14 in the dispensing station 20 are divided into six rows, each having three dispensing locations 14 per row as represented by the GUI 54. Each dispensing location 14 may be given a number for easy identification (e.g., the address of the dispensing location 14 as discussed above in conjunction with operational process 50 may be used).

From GUI 54, a user may choose to view more details for an individual dispensing location 14 by selecting the corresponding number. The user may also switch to another dispensing station 20 by selecting the "Change Bank" button, return to the main menu screen by selecting the "Main Menu" button, select another screen by selecting the "GUI" button, or view a map of the entire product dispensing system 10 by selecting the "Map" button. GUI 54 also includes a pull-down menu (as is known in the art) having "User", "Filling", "Status", "Drug" and "System" menus. It should be noted that other information, other menus, and other selection buttons may be included in GUI 54 while remaining within the scope of the present invention.

The user may choose to display GUI 54 when mapping a medicament to one of the dispensing locations 14 represented in GUI 54. GUI 54 indicates which dispensing locations 14 in the dispensing station 20 are available to have a product assigned (i.e., "free") and which dispensing locations 14 in the dispensing station 20 already have a product assigned (i.e., "taken"). For example, the word "free" is displayed for dispensing location 14 numbers 1, 4, 5, 6, 9, 11, 12, 13, 15, and 17 indicating that a medicament may be assigned to these dispensing locations 14. In contrast, the word "taken" is displayed for dispensing location 14 numbers 2, 3, 7, 8, 10, 14, 16, and 18 indicating that a medicament has already been assigned to these dispensing locations 14. It should be noted that other methods of indicating whether a dispensing location 14 may be "free" or "taken" may be used while remaining within the scope of the present invention. For example, dispensing locations 14 that are free may be colored green, whereas dispensing locations 14 that are taken cells may be colored red.

The user may select one of the available dispensing locations 14 and enter medicament information (for example, name, dosage, number of pills, medicament number, etc.) for the medicament that will be stored within that dispensing location 14. The medicament information may then be linked with that dispensing location's 14 address. After the user enters the medicament information, the dispensing location's 14 status changes from "free" to "taken" to indicate that a medicament has been assigned to that dispensing location 14.

It should be noted that in addition to entering medicament information during the medicament mapping process, the user may set the maintenance interval (e.g., "clean the dispensing location 14 every 30 days," "clean the dispensing location 14 after 10,000 pills have been dispensed," etc.) and the replenishment par level (e.g., replenish when less than one hundred pills are in the dispensing location 14) for the dispensing location 14.

Replenishing

Figure 8:
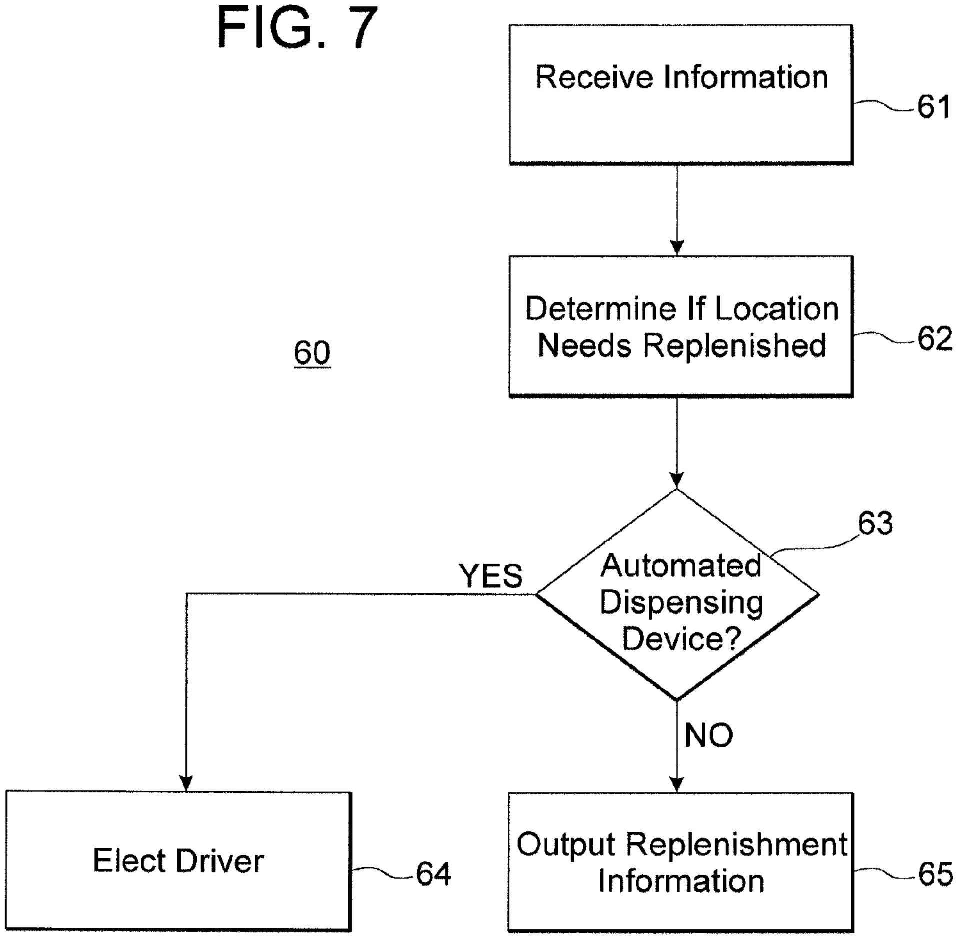
FIG. 8 is an operational process for identifying a dispensing location that requires replenishment within the product dispensing system of FIG. 4 according to an embodiment of the present invention.

FIG. 8 is an operational process 60 for identifying a dispensing location 14 that requires replenishment within the product dispensing system 10 of FIG. 4 according to an embodiment of the present invention. It should be noted that in one embodiment, replenishment refers to the process of refilling dispensing locations 14 up to a maximum capacity determined by the user. Operational process 60 begins when the controller 12 receives prescription information related to a dispensing location 14 in operation 61.

After the prescription information is received in operation 61, a determination is made as to whether the selected dispensing location 14 requires replenishment in operation 62. For example, in one embodiment, controller 12 may be capable of comparing the actual amount of a medicament (e.g., pills, capsules, etc.) located in the dispensing location 14 to a predetermined amount of medicament (referred to as the "par level"). If the actual amount of medicament is less than the par level, controller 12 may determine that the dispensing location 14 needs replenished.

After operation 62, a determination is made in operation 63 as to whether the selected dispensing location 14 is associated with an automated dispensing device 16. If it is determined in operation 63 that the selected dispensing location 14 is associated with an automated dispensing device 16, control branches YES and is passed to operation 64. A device driver associated with the selected automated dispensing device 16 is elected in operation 64. The controller 12 may activate the driver to provide access for replenishing the selected automated dispensing device 16. In one embodiment, access may be granted only to a user who is authorized to replenish the particular medicament. For example, controller 12 may be capable of controlling locks on the cabinet containing the automated dispensing device 16, as well as sensors, switches, etc. on the cabinet and/or device to insure that the proper device is accessed during replenishment (if an incorrect device is replenished, the controller 12 may require a pharmacist or higher security level to clear the error).

If it is determined in operation 63 that the selected dispensing location 14 is not associated with an automated dispensing device 16 (i.e., the dispensing location 14 is associated with a non-automated dispensing device 18), control branches NO and is passed to operation 65. In operation 65, the controller 12 produces replenishment output information, for example, information identifying the non-automated dispensing device 18 which requires replenished. For example, controller 12 may produce an output signal which is used to activate a pick light corresponding the non-automated dispensing device 18 which needs to be replenished.

Figure 9:
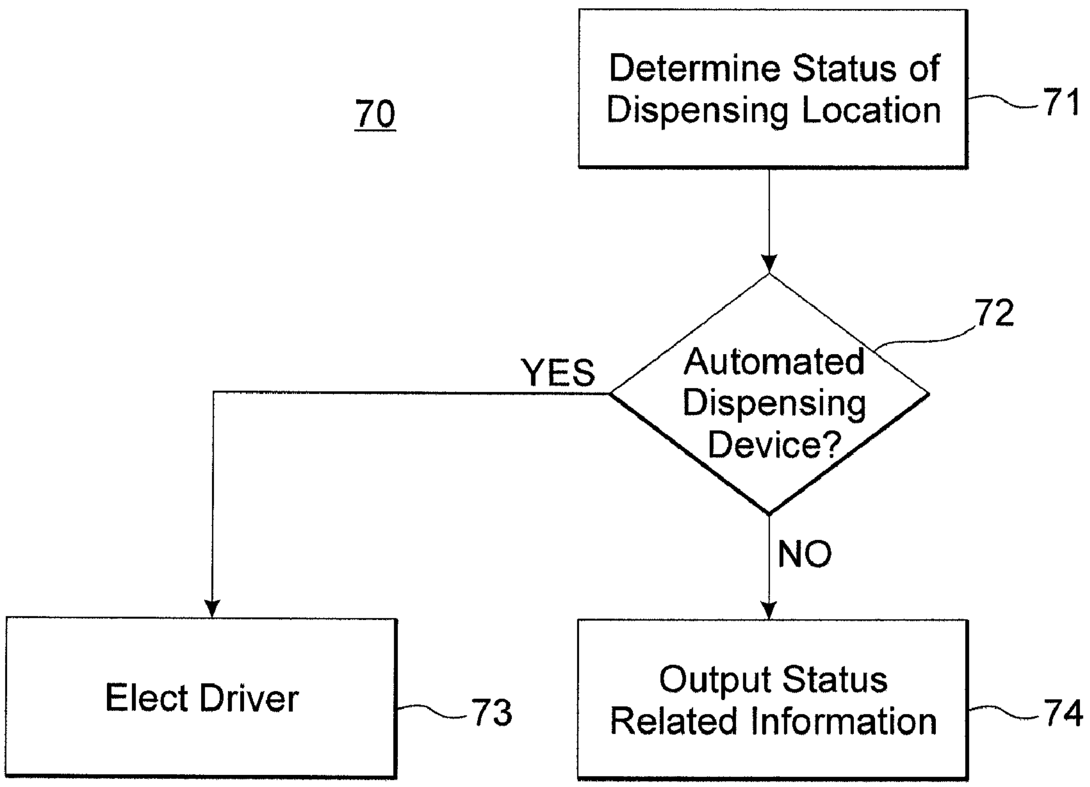
FIG. 9 is an operational process in which the status of a dispensing location 14 is determined for use by one of several other functions of the product dispensing system of FIG. 4 according to an embodiment of the present invention.
Figure 10:
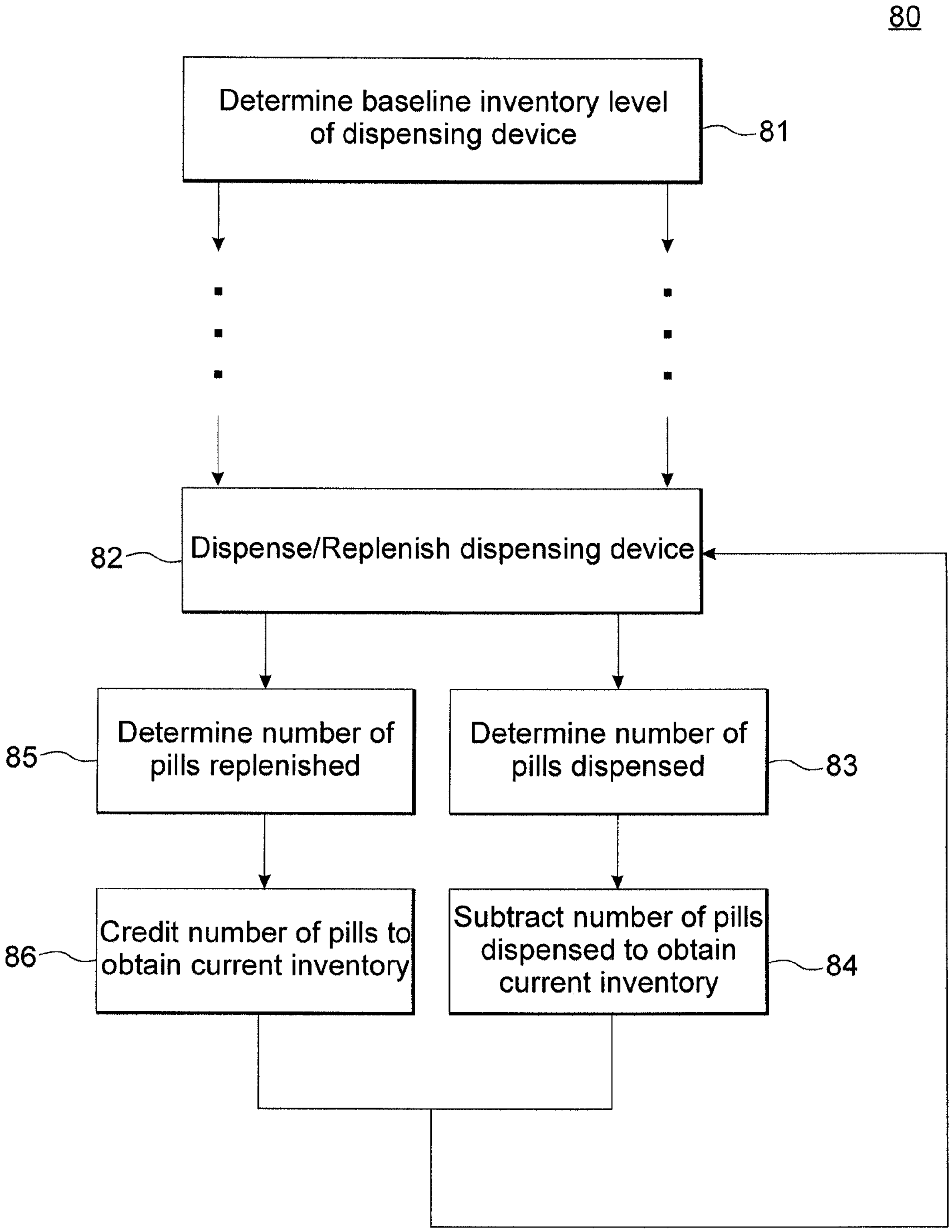
FIG. 10 is an operational process for tracking inventory within a dispensing location of the product dispensing system of FIG. 4 according to an embodiment of the present invention.
Figure 12:
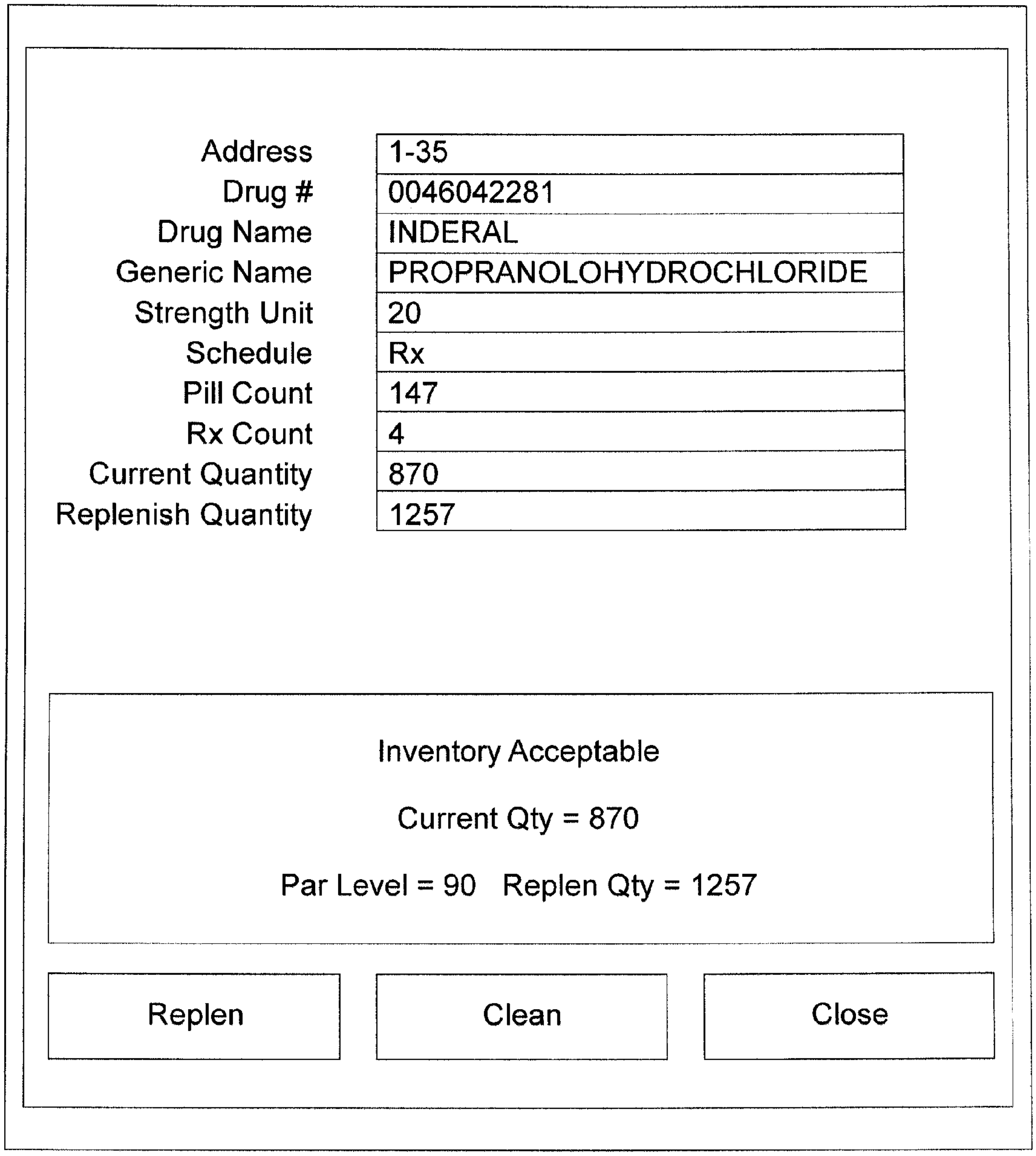
FIG. 12 illustrates a replenishment graphical user interface screen display for a single dispensing location within the product dispensing system of FIG. 4 according to an embodiment of the present invention.

FIGS. 9 and 10 are replenishment GUIs 55, 56 for the product dispensing system 10 of FIG. 4 for a single dispensing location 14 and for a dispensing station 20 having multiple dispensing locations 14, respectively, according to an embodiment of the present invention. As illustrated in FIG. 12, the fields at the top of the GUI 55 identify the address and the contents of the dispensing location 14. The status portion of the display shows the predetermined par level (i.e., 90), replenishment quantity (i.e., 1257), current quantity (i.e., 870), and because the current quantity is greater than the par level, the message "inventory acceptable" may be displayed. At the bottom of the GUI 55 are three "buttons" that may be selected by a user "Replen" (which activates operational process 60 even when the current quantity is not below the par level), "Clean" (which allows dispensing location 14 maintenance to be completed) and "Close" (which closes the status window). It should be noted that other information and other choices may be included with the GUI 55 while remaining within the scope of the present invention.

Figure 13:
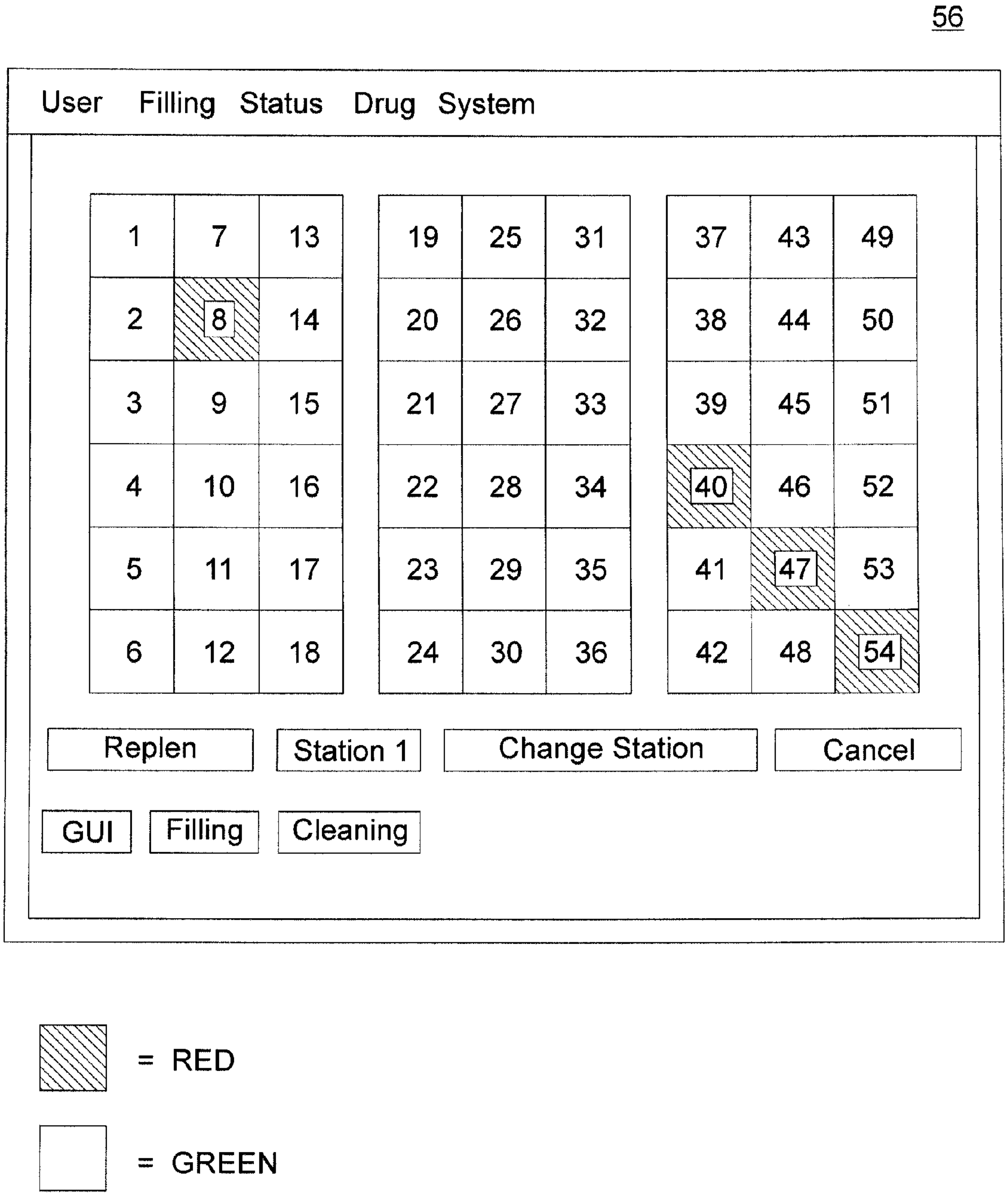
FIG. 13 illustrates a replenishment graphical user interface screen display for a dispensing station having a plurality of dispensing locations within the product dispensing system of FIG. 4 according to an embodiment of the present invention.

FIG. 13 illustrates the replenishment status of multiple dispensing locations 14 grouped in a dispensing station 20. As illustrated by buttons near the bottom of GUI 56, the dispensing station 20 being shown is designated as "Station 1" and the status of the dispensing station 20 being shown relates to replenishment as illustrated by the "Replen" button. The dispensing station 20 has three sets of eighteen dispensing locations 14. The first set includes dispensing locations 1-18, the second set 19-36, and the third set 37-54. Dispensing location # 8 in the first set and dispensing locations #40, #47, and #54 in the third set are illustrated (by the color red) as being below par.

A user may select to replenish or retrieve more information about a dispensing location 14, for example dispensing location #8, by touching the box on the screen representing the dispensing location (i.e., touching box #8). The user may then be transferred to another screen (such as that illustrated in FIG. 12) representing the selected dispensing location 14 (i.e., for dispensing location #8).

The user may also view another dispensing station 20 by selecting the "Change Station" button, return to the previous screen by selecting the "Cancel" button, select another screen by selecting the "GUI" button, select to fill a dispensing location 14 by selecting the "Filling" button, and select to clean a dispensing location 14 by selecting the "Cleaning" button. GUI 56 also includes a pull-down menu (as is known in the art) having "User", "Filling", "Status", "Drug" and "System" menus. It should be noted that other information, other menus, and other selection buttons may be included in the status display while remaining within the scope of the present invention.

During the replenishment process, the user must input accurate data into controller 12 to achieve accurate replenishment records. User input data may be managed via the controller's 12 touch screen display. In one embodiment, on screen reporting data may be available to the user for a predetermined time period to facilitate the replenishment process. For example, screen reports may include data related to a medicament dispensed from a dispensing location 14, the quantity of the medicament dispensed from the dispensing location 14, the ID of the user dispensing the medicament, the time that medicament was dispensed, and the lot number and the expiration date of medicament. Controller 12 may be capable of providing an on screen status of expired medicaments, maintaining a last date of replenishment for each dispensing location 14, and tracking multiple lot numbers, national drug code (NDC) numbers, and expiration dates. Controller 12 may also be capable of accommodating replenishment using multiple stock bottles for a dispensing location 14. In one embodiment, data may be stored in controller 12, however, relevant data tables (e.g., Rx Transaction table, Replenishment table, Inventory level table, etc.) may be stored in the database residing on the data storage device 30.

Inventory, Back-Up Security, and Maintenance

In addition to product mapping and replenishment (and as mentioned above), controller 12 also handles inventory, backup, security, and maintenance functions.

FIG. 9 is an operational process 70 in which the status of a dispensing location 14 may be used by one of several other functions of the product dispensing system 10 of FIG. 4 according to an embodiment of the present invention. The status of the dispensing location 14 may be used, for example, to determine whether the dispensing location 14 requires inventory management and/or maintenance functions to be completed, or for example, to determine whether the data for the product dispensing system 10 requires backup and/or whether only authorized personnel are using the product dispensing system 10.

In operation 71, the status of a dispensing location 14 is determined. For example, an automated dispensing device 16 may transmit signals to the controller 12 indicative of its current inventory level, its need for maintenance, its need for cleaning etc. The status of a non-automated dispensing device 18 may be determined, for example, by a user scanning the non-automated dispensing device's 18 identification tag and entering the current inventory amount, the need for maintenance, the need for cleaning, etc.

After the status of a dispensing location 14 is determined in operation 71, a determination is made in operation 72 as to whether the selected dispensing location 14 is associated with an automated dispensing device 16. If it is determined in operation 72 that the selected dispensing location 14 is associated with an automated dispensing device 16, control branches YES and is passed to operation 73. A device driver associated with the selected automated dispensing device 16 is elected in operation 73. The controller 12 may activate the associated driver to provide access to the selected automated dispensing device 16, for example, for inventory management, cleaning, maintenance, etc. In one embodiment, access may be granted only to a user who is authorized to access the selected automatic dispensing device 16. For example, controller 12 may be capable of controlling locks on the cabinet containing the automated dispensing device 16, as well as sensors, switches, etc. on the cabinet and/or device to insure that the proper device is accessed by an authorized user during inventory management, cleaning, maintenance, etc. (if an incorrect automated dispensing device 16 is accessed or an unauthorized user attempts to access an automated dispensing device 16, the controller 12 may require a pharmacist or higher security level to take corrective action).

If it is determined in operation 72 that the selected dispensing location 14 is not associated with an automated dispensing device 16 (i.e., the dispensing location 14 is associated with a non-automated dispensing device 18), control branches NO and is passed to operation 74. In operation 74, the controller 12 produces output status related information, for example, information identifying the non-automated dispensing device 18 which requires inventory management, cleaning, maintenance, etc. For example, controller 12 may produce an output signal which is used to activate a pick light corresponding to the non-automated dispensing device 18 which needs inventory management, cleaning, maintenance, etc.

As discussed above, the status information determined using operational process 70 maybe used by the product dispensing system 10 for other operational processes. For example, FIG. 10 illustrates operational process 80 for tracking inventory within a dispensing location 14 of the product dispensing system 10 of FIG. 4 according to an embodiment of the present invention.

Operational process 80 begins when an inventory baseline is established for the dispensing location 14 in operation 81. In one embodiment, the inventory baseline may be established when a product is first mapped to the dispensing location 14 as previously discussed.

After a medicament is assigned to a dispensing location 14, a user may scan a stock bottle to ensure that the correct medicament is being placed into the dispensing location 14. If the correct medicament is selected, a user may empty an entire stock bottle (for example, containing 1000 pills of the medicament) into the empty dispensing location 14. The user may then re-scan the stock bottle bar code which notifies controller 12 of the quantity of medicament (i.e., 1000 pills) that were place within the dispensing location 14, or may enter the quantity manually. The controller 12 may then set the inventory baseline at that value (i.e., at 1000) and may store this value in a database residing on the data storage device 30.

Alternatively if the quantity of pills within the stock bottle is unknown, the user may set the stock bottle and medicament onto a scale. The weight reading may be transmitted to the controller 12. The user then may empty the medicament from the stock bottle into the dispensing location 14. The user may set the stock bottle (and any remaining medicament) back onto the scale and the weight of the bottle (and any remaining medicament) may be transmitted to the controller 12. The user may scan the stock bottle bar code, and in response, the controller 12 may retrieve the piece weight of the medicament from a database residing on the data storage device 30. Piece weight refers to the weight of one unit (e.g., pill, capsule, etc.) of the medicament. The controller 12 may subtract the weight of the stock bottle (i.e., the second weight reading) from the weight of the stock bottle and medicament (i.e., the first weight reading) to obtain the total weight of medicament placed in the dispensing location 14. Controller 12 may then divide the total weight of the medicament by the piece weight of the medicament; the result represents the number of pills placed in the dispensing device 22. Controller 12 may set this value as inventory baseline which may be then stored in a database residing on data storage device 30. Alternatively, a user may place an unknown quantity of medicament (e.g., pills) into an automated dispensing device 16, implement a "Cycle Count" in which all of the pills are dispensed (out of the automated dispensing device 16 into) container and counted. The now-known quantity of medicament is then placed back into the automated dispensing device 16 and the inventory baseline set.

After the inventory baseline is established in operation 81, operational control passes to operation 82. In operation 82, the dispensing location 14 may be placed into either a dispensing mode or a replenishment mode. In one embodiment, controller 12 sends dispensing commands or replenishment commands via the appropriate driver and/or output signal.

If dispensing location 14 receives dispensing commands from controller 12, operational control is passed to operation 83. In operation 83, the quantity of medicament (e.g., number of pills) dispensed by the dispensing location 14 is determined. In one embodiment, the quantity of medicament dispensed may be determined, for example, by a counter on an automatic dispensing device 16, by a user manually counting the medicament dispensed, by a weight reading of the medicament dispensed, etc. The quantity is then sent to the controller 12.

After the quantity of medicament dispensed is determined in operation 83, operation 84 determines the current inventory within the dispensing location 14. For example, the first time a dispensing or replenishment operation occurs after the baseline inventory is determined, the quantity of medicament dispensed (as determined in operation 83) may be subtracted from the inventory baseline (as found in operation 81) to obtain the current inventory for the dispensing location 14.

If an inventory level has been previously determined (i.e., the instant dispensing operation is not the first dispensing or replenishment operation after the baseline inventory is determined), the amount of medicament dispensed (as determined in operation 83) may be subtracted from the inventory found after a previously completed dispensing or replenishment operation to obtain the current inventory for the dispensing location 14. In one embodiment, controller 12 subtracts the amount of medicament dispensed from the dispensing location 14 (as found in operation 83) from the inventory baseline (or the last inventory found) to obtain the current inventory. After operation 84 determines the current inventory, operational control is returned to operation 82 to await other dispensing or replenishment commands.

If dispensing location 14 receives replenishment commands from controller 12, operational control is passed from operation 82 to operation 85. The amount of medicament (e.g., number of pills) that are replenished within the dispensing location 14 is determined in operation 85. In one embodiment, the amount of medicament replenished may be determined using similar methods discussed above in conjunction with operation 81.

After the quantity of medicament replenished is determined in operation 85, the current inventory within the dispensing location 14 is determined in operation 86. For example, the first time a dispensing operation occurs after the baseline inventory is determined, the amount of medicament replenished (as determined in operation 85) may be credited to the inventory baseline (as found in operation 81) to obtain the current inventory for the dispensing location 14. If the inventory level has been previously found (i.e., the instant replenishment operation is not the first dispensing or replenishment operation after the baseline inventory is determined), the amount of medicament replenished (as determined in operation 85) may be credited to the inventory found after a previously completed dispensing or replenishment operation to obtain the current inventory for the dispensing location 14. In one embodiment, controller 12 credits the amount of medicament replenished within the dispensing location 14 (as found in operation 85) to the inventory baseline (or the last inventory found) to obtain the current inventory. After operation 86 determines the current inventory, operational control is returned to operation 82 to await other dispensing or replenishment commands.

Operational process 80 offers an enhanced inventory management system. In one embodiment, the current inventory levels calculated in operational process 80 may be used to determine when a replenishment operation should be instituted as discussed above in conjunction with FIG. 8.

Through operational process 80, controller 12 provides an improved inventory control process. Controller 12 may be capable of maintaining inventory levels for each dispensing location 14, providing an inventory adjustment ability for each dispensing location 14, and validating each empty dispensing location 14. Controller 12 provides an on screen status of current inventory levels. Status may be sorted by dispensing location 14, NDC, medicament name, % below the predetermined value, and quantity dispensed. Controller 12 displays the pill count and prescription count history for each automated dispensing device 16, for example, at a monthly resolution for one year. Controller 12 provides basic inventory management functions for conducting cycle counts and adjusting inventory quantity. Controller 12 produces an alert to conduct cycle counting, which enables user to review inventory quantity of each dispensing location 14. For example, cycle count settings may be for number of pills dispensed or number of days since last cycle count. Controller 12 has the ability to run all product out of a cell to validate inventory. It should be noted that controller 12 may also periodically provide inventory levels to a host management system, for example, for re-ordering medicaments.

For a typical back-up operation, the controller 12 may provide a backup process for disaster recovery of the database(s) residing on the data storage device 30. The backup process may support both a network storage location, as well as removal media for the repository. The controller 12 may also provide a process for moving history files to a network location.

The controller 12 may incorporate a security system that utilizes one or more devices for user verification and user access. For example, the controller 12 may incorporate one or more of a password (e.g., entered via the touch screen), a barcode scanner (for scanning a user-id), an RF scanner, a fingerprint scanner, or a retinal scanner. In one embodiment, the user may be prompted to enter user-id and password information using the touch screen, scan a user-ID barcode, scan a user-ID RF device, etc., before the access is granted by the controller 12.

The product dispensing system 10 may use a master password along with pharmacy manager, pharmacist, and technician categories to provide four basic levels of access. Each user's access, however, may be further customized as desired. For example, a user may be categorized as a technician but granted additional access rights normally reserved for pharmacists only. Likewise, the user may be restricted from certain access rights that are available to other users in the technician group. The pharmacist or pharmacy supervisor issues and maintains the levels of security allowed. Password expiration may also be configurable. Thus by combining the use of hardware devices which have locking drawers, indicator lights and alarms, secure gates, etc. with the use of assigned user access levels, the product dispensing system 10 effectively restricts access to the products within the system 10.

Controller 12 may also provide an improved maintenance program. For example, in one embodiment, controller 12 may follow current Baker Cell™ dispensing device maintenance configurations. A user may input pre-determined maintenance intervals, and when the interval has expired, controller 12 notifies the user that cleaning and maintenance should occur. The maintenance function may provide an on screen display and light a "Maintenance" annunciator LED on the dispensing station 20 and/or at the dispensing location 14 when cleaning is required. Controller 12 may track the amount of medicament dispensed by each dispensing location 14 or the time that has elapsed since the last cleaning and may notify the user when cleaning or maintenance is due. Controller 12 may have the ability to adjust maintenance schedules during an actual predetermined cycle, for example, controller 12 may control a drawer unlock during the scheduled maintenance steps. Controller 12 may also provide a manual means to unlock the drawers during unscheduled maintenance and may provide additional system 10 diagnostics.

The controller 12 of the present invention may be used with all types of dispensing devices 16, 18. For purposes of illustration, and not limitation, a particular type of dispensing cabinet will now be described which may be controlled by the controller 12 of the present invention. The reader should understand that the description of a particular type of dispensing cabinet should not be construed in any was as limiting the controller of 12 the present invention.

Figure 14:
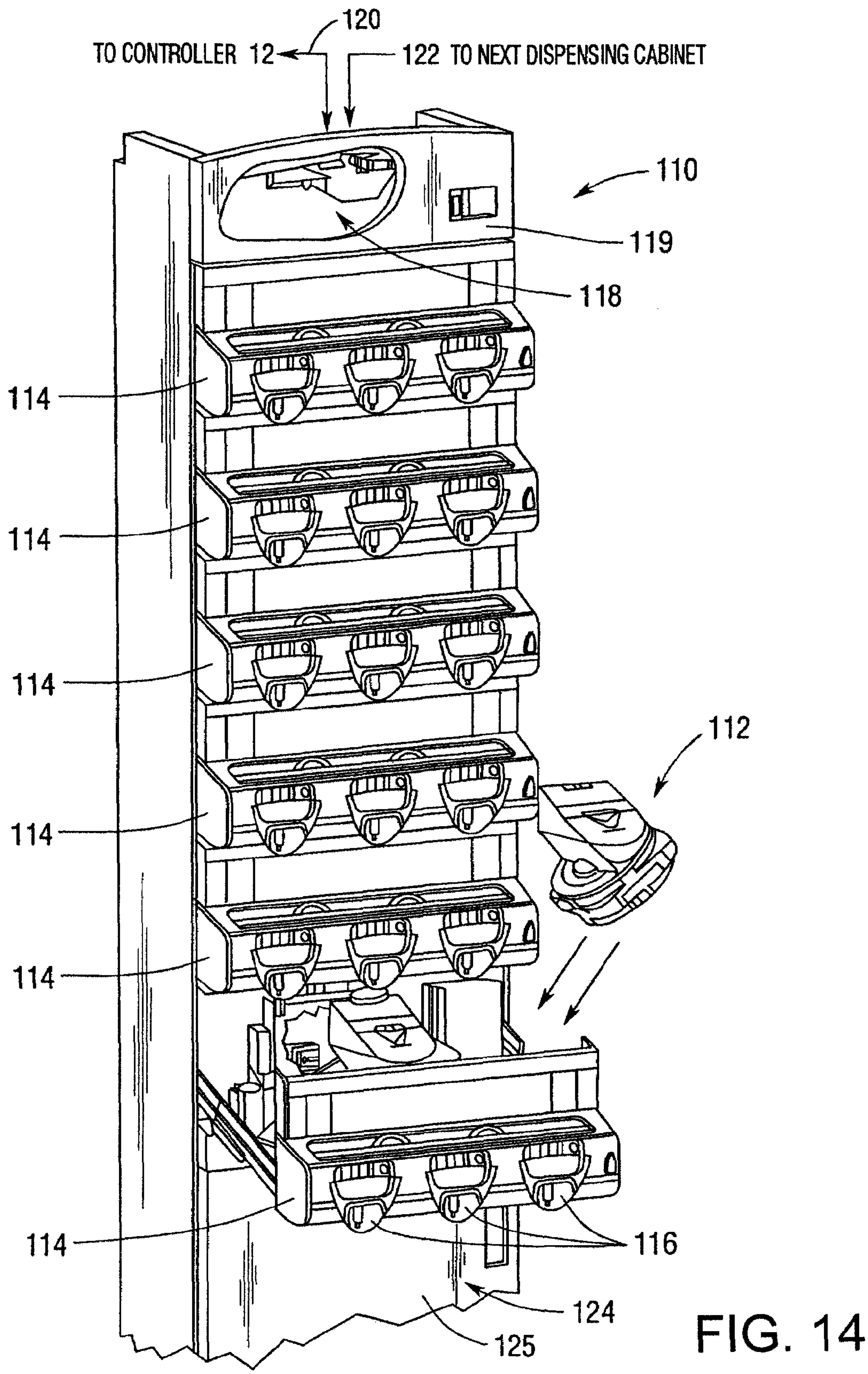
FIG. 14 is a front perspective view of a medicament dispensing cabinet which may be utilized in association with an adaptive interface according to an embodiment of the present invention.

FIG. 14 illustrates a front view of a medicament dispensing cabinet 110 having a plurality of dispensing devices 112. The medicament dispensing cabinet 110 is comprised of a plurality of dispensing drawers 114 each containing three dispensing cells 116. Each dispensing cell 116 is comprised of certain electrical and mechanical components (described below) carried by the drawers 114, which cooperate with a dispensing device 112. Each dispensing cell 116 and dispensing device 112 form one type of dispenser although any type of dispenser, such as a Baker Cell™, may be carried by drawers 114. It should be apparent to those skilled in the art that the construction of the medicament dispensing cabinet 110 may be modified to contain fewer or more dispensing drawers 114 to meet different requirements. Also, each dispensing drawer 114 may be constructed to contain fewer than three dispensing cells 116 or more than three dispensing cells 116. Each medicament dispensing cabinet 110 contains a cabinet controller 118 contained behind a door 119. The cabinet controller 118 may be connected to the controller 12 or, alternatively, to a dispensing computer, filling workstation, embedded controller, or other control device by an interface cable 120 or by a radio frequency connection used in conjunction with a device such as a PDA (not shown in FIG. 14). Additional medicament dispensing cabinets 110 may be connected to the controller 12 by an interconnect cable 122 connected between successive medicament dispensing cabinets 110. All medicament dispensing cabinets 110 may be controlled by the common controller 12. A storage area 124 is located in the medicament dispensing cabinet 110 behind a door 125 for storing bulk medicament stock bottles, alternative removable dispensing devices 112, or other materials or inventory.

Figure 15A:
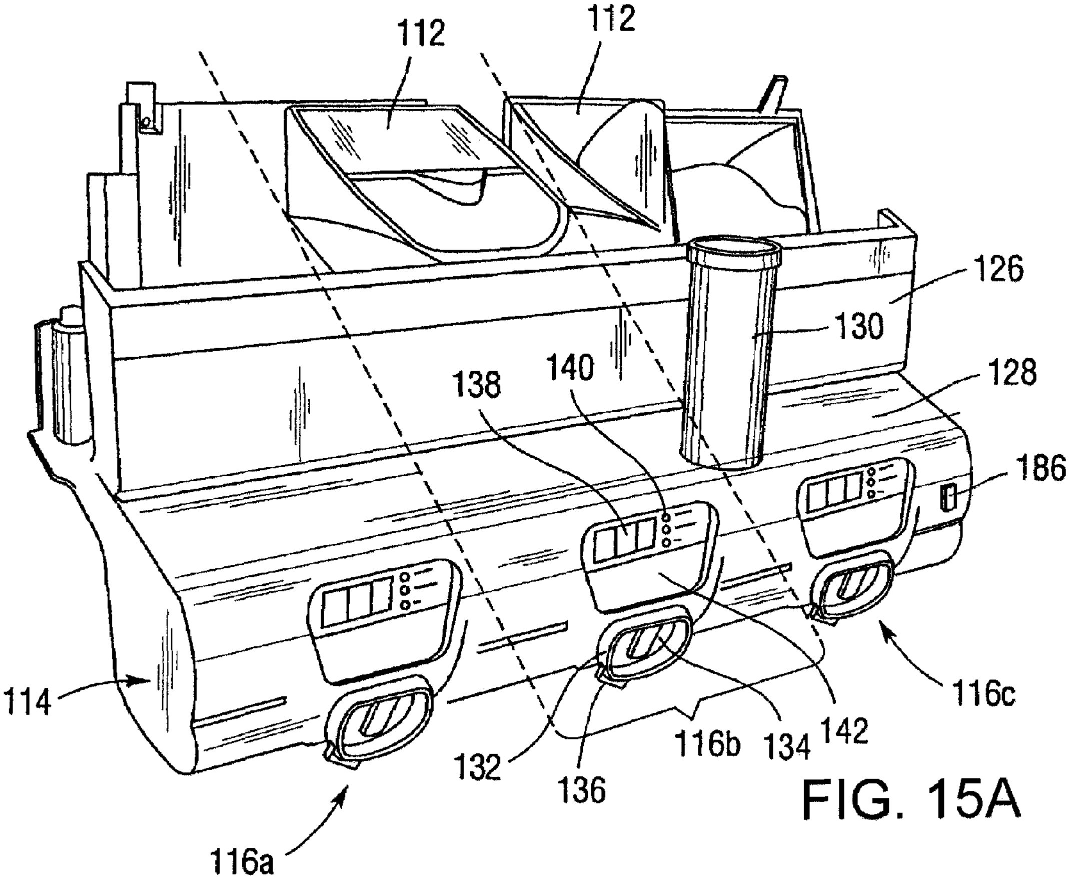
FIG. 15A is a left-front perspective view of a medicament dispensing drawer with the far left dispensing device removed and the lid opened on the far right dispensing device.

FIG. 15A shows a front-left view of the dispensing drawer 114 (all dispensing drawers 114 being of a similar construction). In the present embodiment, each dispensing drawer 114 is comprised of three dispensing cells 116*a*, 116*b*, 116*c* and a drawer controller 146 (see FIG. 16*b*). Each dispensing cell 116 contains a removable dispensing device 112 filled with medicament (not shown in FIG. 15A). In FIG. 15A, the removable dispensing device 112 has been removed from the left most dispensing cell 116*a* while the removable dispensing device 112 in the right most dispensing cell 116*c* is shown in an opened condition (for restocking). Each dispensing drawer 114 may also comprise an instruction fascia panel 126, a ledge 128 for temporarily holding a prescription vial 130 or bulk medicament stock bottle (not shown). The dispensing drawer's ledge 128 may be used by the pharmacy worker to temporarily place empty or full prescription vials 130 while dispensing medicament from another dispensing cell 116 into another prescription vial 130.

Figure 15C:
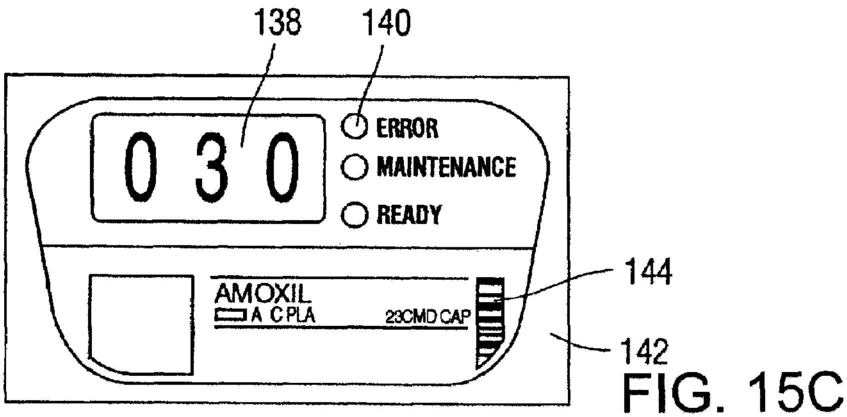
FIG. 15C illustrates details of a display, annunciator and a cell label.
Figure 15B:
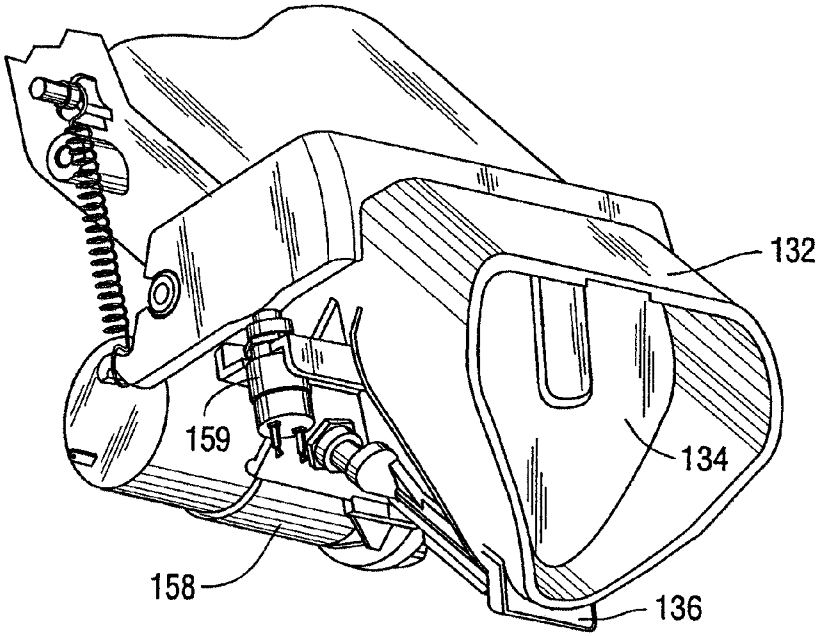
FIG. 15B illustrates details of the chute, chute gate, and gate release.

Each dispensing cell 116 includes a chute 132, chute gate 134 and gate release 136, as shown in FIG. 15B. Each dispensing cell 116 also includes a cell display 138, annunciator (e.g. LEDs) 140 and a cell label 142 as shown in FIG. 15C. In the present embodiment, the cell display 138 consists of three alphanumeric digits for displaying information to the pharmacy worker while the dispensing cell 116 is operating. It should be apparent to those skilled in the art that the cell display 38 may include additional characters, symbols, pictures, etc. to better communicate with the pharmacy worker. It should also be apparent to those skilled in the art that the techniques to display information on the cell display 138 may be varied by a drawer controller (146 in FIG. 17) in such a manner as to effectively display more than three characters of information to the pharmacy worker. The information display techniques may include alternating between multiple message segments consisting of three characters, scrolling a message from left to right through the three digits, or changing the intensity of the display characters while either alternating or scrolling the message.

The annunciator LEDs 140 provide immediate status information to the pharmacy worker about the current state of the dispensing cell 116 or dispensing device 112. In the present embodiment, the dispensing cell 116 comprises three different annunciators 140 with each annunciator representing a single state when illuminated. In the present embodiment, the annunciators 140 represent the dispensing cell states of 'READY', 'MAINTENANCE' and 'ERROR'. Multiple annunciators 140 may be illuminated at any moment in time. In the present embodiment, the annunciators 140 are implemented using independent LEDs. It should be apparent to those skilled in the art that the annunciators 140 may also be implemented using incandescent light bulbs integrated into the cell display, or implemented with display icons on the cell display 138 which may or may not comprise a backlight that may be provided by various light sources. Likewise, it should be apparent that additional annunciators 140 may be added to the dispensing cell 116 to present other information to the pharmacy worker. The cell display 138 and annunciators 140 are connected to and controlled by the drawer controller 146 (shown in FIG. 17).

The cell label 142 is attached to the front of each dispensing cell 116 and provides a visual and a machine readable representation, i.e., bar code indicia 144, of the medicament contained in the removable dispensing device 112 of the dispensing cell 116. In the alternative, a display that presents a picture of the product, a sample of the product or a barcode, may be used. The dispensing cell bar code indicia 144 uniquely identifies the dispensing cell 116 to the controller 12. The cell label 142 also contains textual information representing the medicament in the removable dispensing device 112. This textual information identifies the medicament to the pharmacy worker and may comprise one or more of the following: a drug number (i.e. either a U.S. National Drug Code (NDC) or Canadian Drug Identification Number (DIN)), a drug name, a generic drug name, a drug strength and dosage form, a manufacturer and a distributor, among others, which represents some or all of the same textual information shown on a bulk medicament stock bottle used to fill dispensing device 112. The cell label 142 may also comprise textual information representing a unique drug identification number (e.g., NDC or pharmacy generated ID) to create a unique representation for a medicament that may be supplied under the same drug number but having several different physical representations due to different manufacturers, size variations, color variations or imprints, among others. The cell label 142 may further comprise a photographic image or illustration of the medicament to allow the pharmacy worker a visual means to verify the medicament dispensed from the removable dispensing device 112 and dispensing cell 116.

The cabinet controller 118 (See FIG. 14) is connected to the drawer controller 146 (See FIG. 16B) located in each drawer 114 by an electrical or optical cable or any wireless means to communicate instructions and data. The cabinet controller 118 receives instructions from the controller 12 and determines the appropriate drawer controller 146 and dispensing cell 116. The instructions or data are then forwarded to the appropriate drawer controller 146 by the cabinet controller 118 for further processing. After the drawer controller 146 has executed the instruction or processed the data, the drawer controller 146 responds to the cabinet controller 118. The cabinet controller 118 in turn responds to the controller 12. While the cabinet controller 118 and drawer controllers 146 are described as separate components, it should be apparent to those skilled in the art that the cabinet controller 118 and drawer controller 146 may be combined in various ways, and with functions shifted among them. Additionally, duplicate components are also intended to be within the scope of the present invention. For example, each dispensing cell 116 may consist of its own controller connected to the cabinet controller 118 or directly to the dispensing computer or other control device.

Figure 16A:
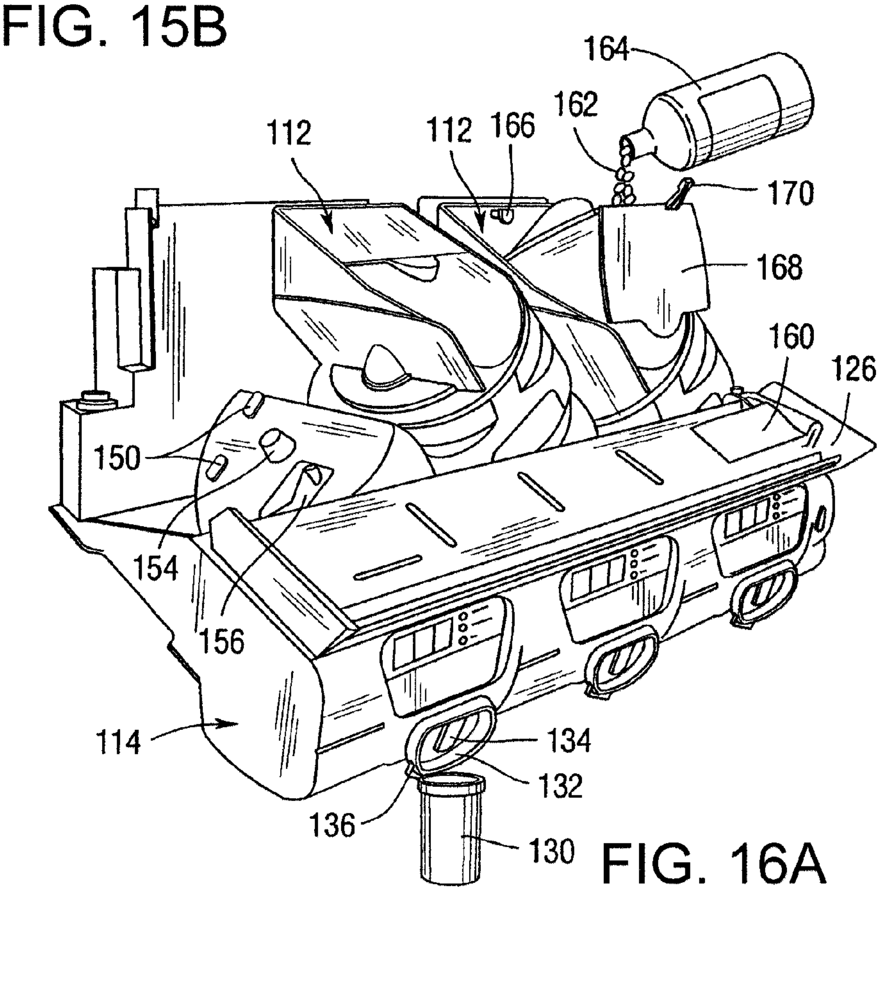
FIG. 16A is a left-front perspective view of the medicament dispensing drawer as shown in FIG. 15A with the instructional fascia panel in the open position.
Figure 16B:
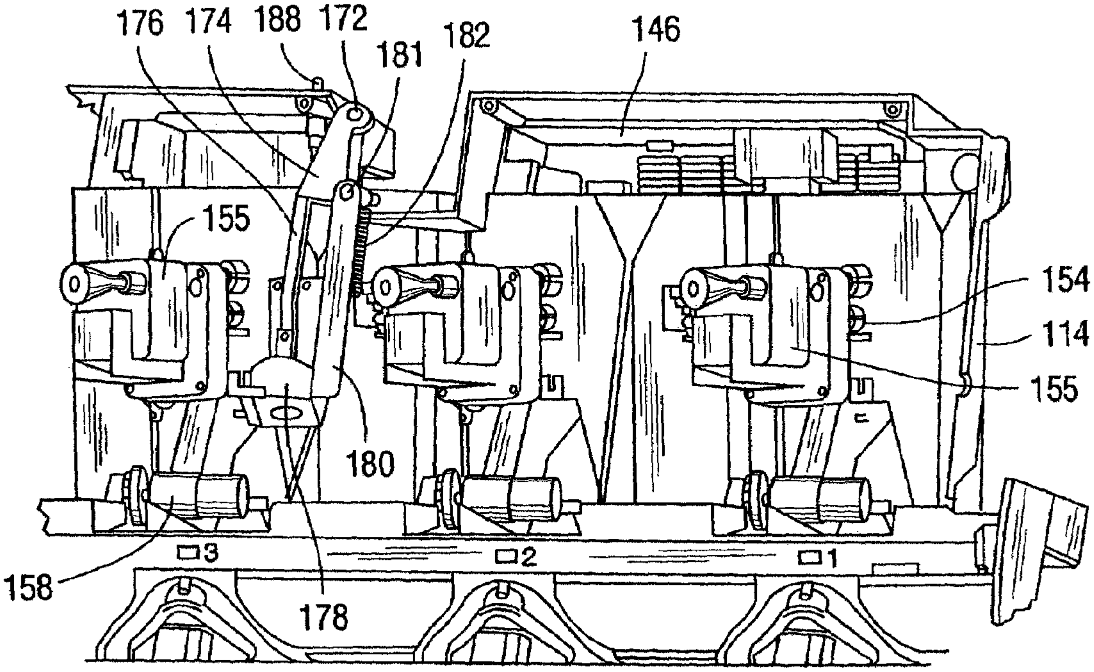
FIG. 16B is a top view of the medicament dispensing drawer of FIG. 15A with all three dispensing devices and the shell removed.
Figure 16C:
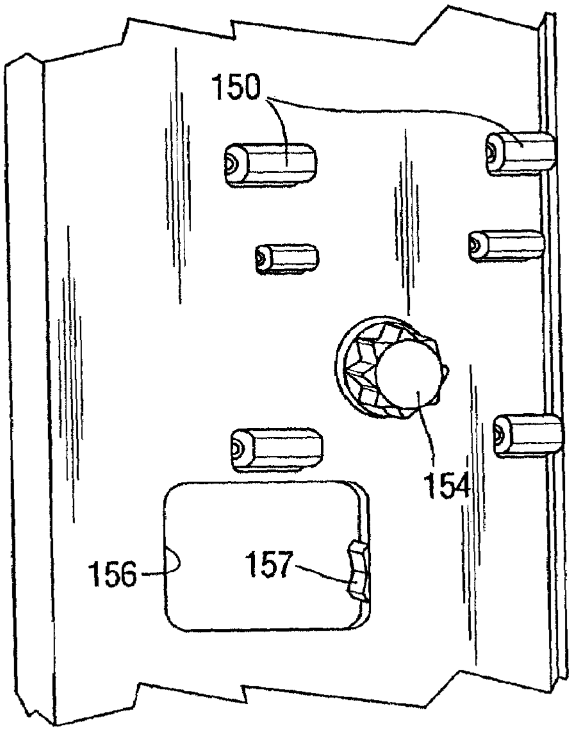
FIG. 16C illustrates the motor disc block and cell drop out opening.

FIG. 16A is a left-front perspective view of a dispensing drawer 114 with the instruction panel 126 lowered to provide easier access when removing the removable dispensing devices 112 from the dispensing cell 116. Also, the removable dispensing device 112 has been removed from the first dispensing cell 116*a*. Each dispensing cell 116 further comprises a pair of alignment sockets 150 that mate with alignment pins (discussed below) on the removable dispensing device 112 to properly orient and center the removable dispensing device 112 onto the dispensing cell 116. Those of ordinary skill in the art will recognize that other devices for alignment may be used while remaining within the scope of the invention. A motor drive block 154 (See FIG. 16C) driven by a motor 155 (See FIG. 16B) engages a hopper disk located within the removable dispensing device 112 which is rotated to dispense medicament from the removable dispensing device 112. The motor drive block may be allowed to “float” to allow for misalignment. As the motor drive block 154 and hopper disk rotate, the medicament falls from the dispensing device 112 through a dispensing cell drop out opening 156 and passes in front of a medicament sensor 157 (See FIG. 16C). As the medicament passes in front of the medicament sensor 157, the medicament is counted by the drawer controller 146. The dispensed medicament is temporarily stored in the dispensing cell’s chute 132 awaiting retrieval by the pharmacy worker.

Once the medicament is dispensed into the chute 132, the pharmacy worker may release the medicament into the prescription vial 130 by pressing the gate release 136 which will actuate a gate actuator 158 (FIG. 15B) thus opening the chute gate 134 allowing the medicament to fall into the prescription vial 130. The gate actuator 158 slowly opens the chute gate 134 to prevent the medicament from spilling over the top of the prescription vial 130. A gate open sensor 159 provides feedback to the drawer controller 146 to indicate the current position of the chute gate 134, which may simply be an ‘open’ or ‘closed’ indication. When the gate release 136 is activated, the drawer controller 146 will close the chute gate 134 by operating the gate actuator 158 until the gate open sensor 159 indicates the chute gate 134 has returned to the closed position. The chute gate 134 may be composed of a flexible material to seal the lower end of the chute 132 to prevent any medicament from escaping while being dispensed from the removable dispensing device 112. The flexible gate material prevents very small medicaments from escaping from the chute 132 while being dispensed. In the present embodiment, the gate actuator 158 may be comprised of a motor and cam which lifts the chute gate 134. It should be apparent to those skilled in the art that other means may be used to lift or slowly open the chute gate 134, to thereby open the lower end of the chute 132 to allow medicament to fall from the chute 132 into an awaiting prescription vial 130 or other container. For example, an electric solenoid may be used to open the chute gate 134. The electric solenoid could have either a linear or rotary motion when actuated.

Referring to FIG. 16A, the interior surface of the instruction panel 126 comprises tabs and slots for the pharmacy worker to insert a medicament lot card 160 to record the medicament 162 provided by stock bottle 164 and contained in the removable dispensing device 112. A pharmacy worker, inventory clerk, or pharmacist, among others, may record date, time, worker initials and other comments while performing routine maintenance on each dispensing cell 116 or removable dispensing device 112. The medicament specific information (e.g. lot number and expiration date) from the bulk medicament stock bottle 164 may also be recorded by the workers.

The dispensing cell 116 further comprises a dispensing device switch 166 (see also FIG. 17) which is actuated when the removable dispensing device 112 is inserted and its lid 168 is in the closed position. The lid 168 of the removable dispensing device 112 contains a tab 170 that mechanically actuates the switch 166. Likewise, the tab 170 will de-activate the switch 166 when either the lid 168 is opened or the removable dispensing device 112 is removed from the dispensing cell 116. It should be apparent to those skilled in the art that the switch 166 and tab 170 may be implemented in other ways so as to provide information as to the state of the removable dispensing device 112 being inserted into the dispensing cell 116 or the lid 168 being in the open position. For example, an optical or magnetic sensor could replace the mechanical switch 166 shown in the present embodiment to detect when the removable dispensing device 112 is inserted or its lid 168 is in the open position.

Figure 16D:
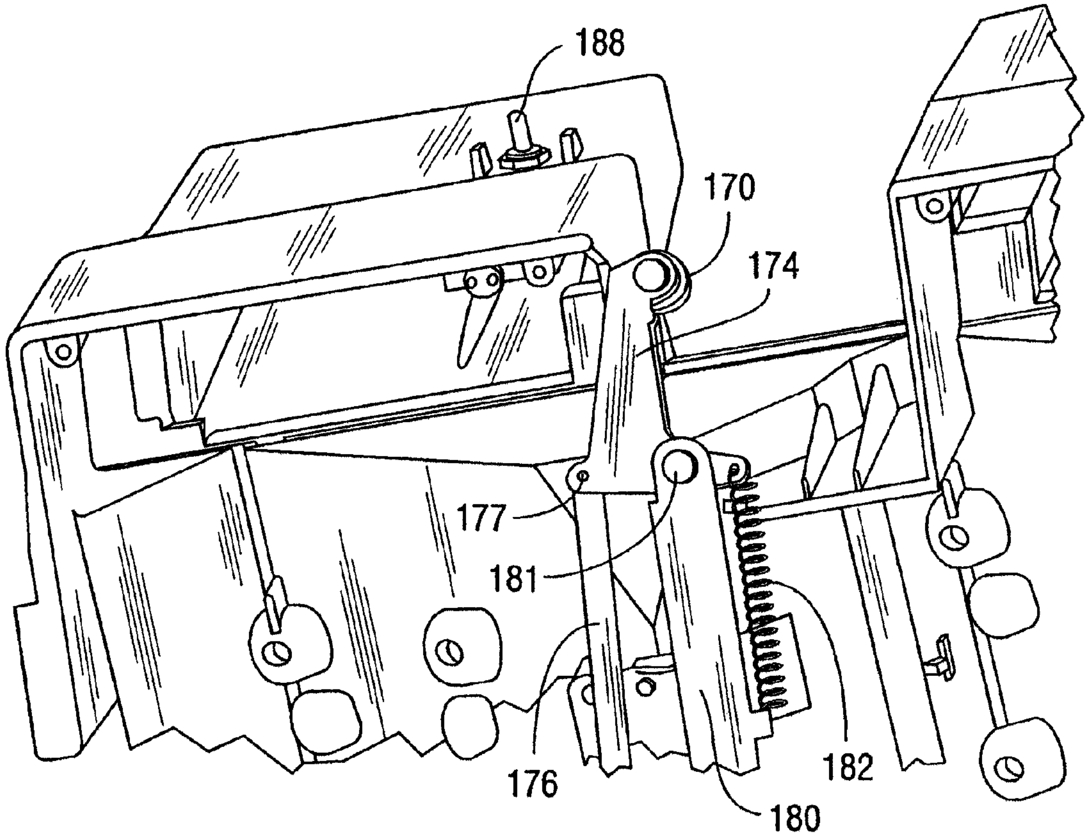
FIG. 16D illustrates the details of a locking assembly.

Turning to FIG. 16D, a latch roller 172 is carried by a latch pawl 174. Latch pawl 174 is connected to a latch arm 176 at a first pivot point 177. The other end of latch arm 176 is connected to a solenoid 178. (See FIG. 16B). Latch pawl 174 is also pivotally connected to a fixed member 180 at a second pivot point 181. A latch pawl return spring 182 is connected between the latch pawl 174 and the fixed member 180. The connection between spring 182 and latch pawl 174 is at a position opposite to the first pivot point 177 with respect to the second pivot point 181.

Figure 17:
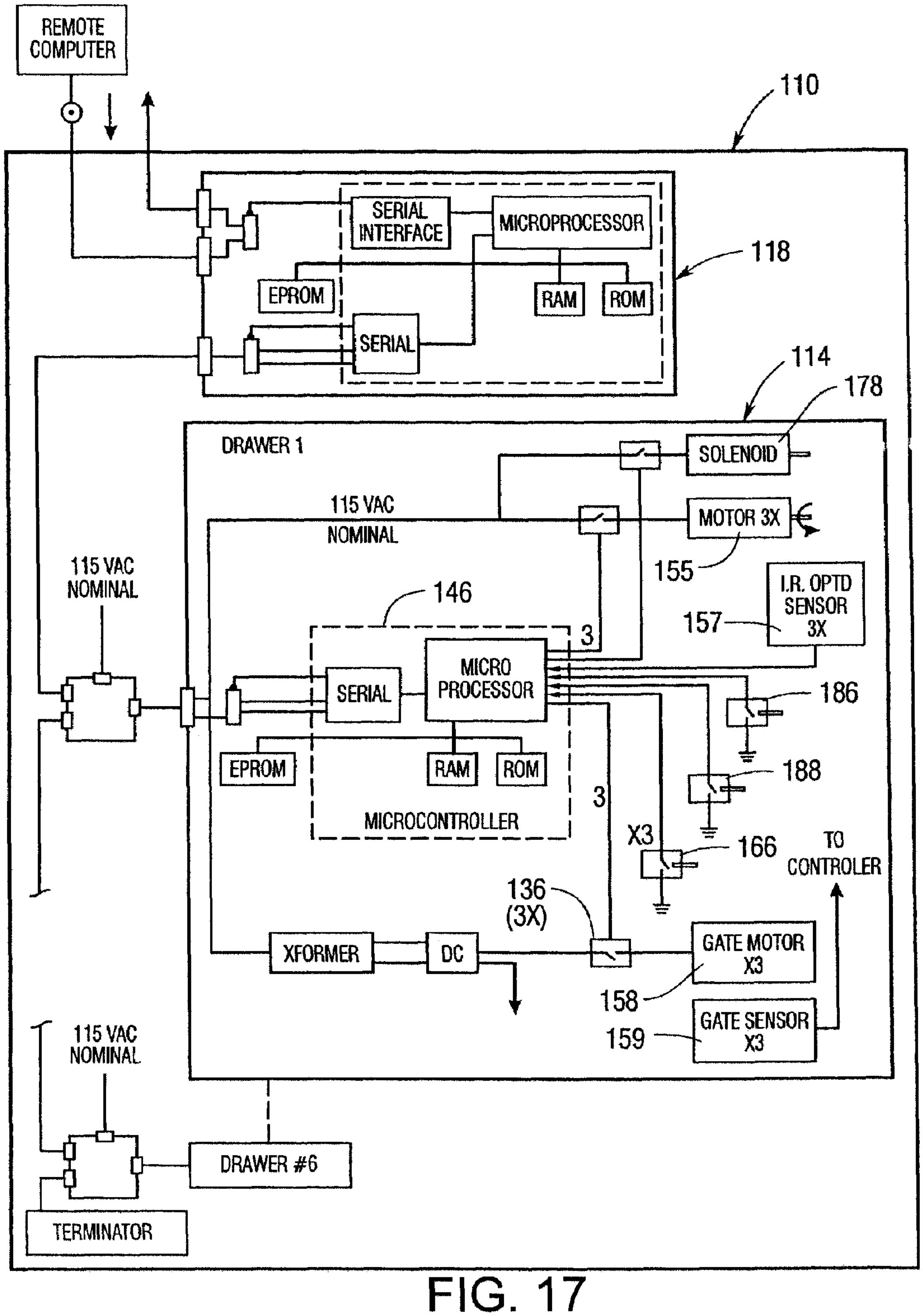
FIG. 17 is an electrical schematic illustrating the cabinet and drawer controllers and associated electronics.

With reference to FIG. 17, if the controller 12 sends an appropriate command, the cabinet controller 118 forwards the command to the appropriate drawer controller 146 which acknowledges receipt of the command by returning a command response to the controller 12 via the cabinet controller 118. The drawer controller 146 then begins to monitor a drawer release switch 186 (see also FIG. 15A). When a worker presses the drawer release switch 186, the drawer controller 146 issues a command to activate the solenoid 178 (see also FIG. 16B). When the solenoid 178 is activated, the latch arm 176 will be pulled downward in FIGS. 16B and 16D, causing latch pawl 174 to rotate counterclockwise about second pivot point 181, overcoming the opposing tension applied by the latch pawl return spring 182. The rotation of the latch pawl 174, counterclockwise as shown in FIGS. 13B and 13D, moves the latch roller 172 away from and clear of a strike plate (not shown), thereby unlocking the drawer 114. The drawer release switch 186 is positioned on the drawer 114 so as to allow the worker to positively grip the drawer 114 while guiding and pulling the drawer 114 to its fully opened position. The activation of solenoid 178 can be timed so that the solenoid is not burned out should the user continue to hold drawer release switch 186 in the closed position.

The drawer controller 146 monitors a drawer position switch 188 (see also FIGS. 13B and 13D). Once the drawer 114 has been unlocked, and the drawer 114 begins to move away from the cabinet 110, the drawer position switch 188 will change state. After a slight delay, the drawer controller 146 will disable drawer release switch 186.

To move the drawer from its fully open to its fully closed position, the user pushes the drawer back into the cabinet 110. As the latch roller 172 encounters the strike plate notch, the latch pawl 174 rotates away from the strike plate notch in opposition to the force provided by spring 182 as a result of the user pushing the drawer 114 toward its fully closed position. After the latch roller 172 has cleared strike plate notch, spring 182 causes the latch pawl 174 to rotate in a direction toward the strike plate notch thus securing the latch roller 172 behind the strike plate notch thereby locking the drawer 114 in its fully closed position.

Those of ordinary skill in the art will recognize that alternative embodiments may be used to construct the electronic drawer lock assembly. Such embodiments include the solenoid 178 being connected directly to the latch pawl 174, replacing linear solenoid 178 with a rotary solenoid, further eliminating the need for various pivot points. Additionally, latch roller 172 could be replaced by a cam surface. Although in the present embodiment an unlock command from the controller 12 and user input in the form of depressing drawer release switch 186 are both required to unlock a drawer 114, in other embodiments users might elect to allow the drawer to be unlocked in response to either a command from the controller 12 or user input, without requiring both the command and user input to be present.

Figure 18:
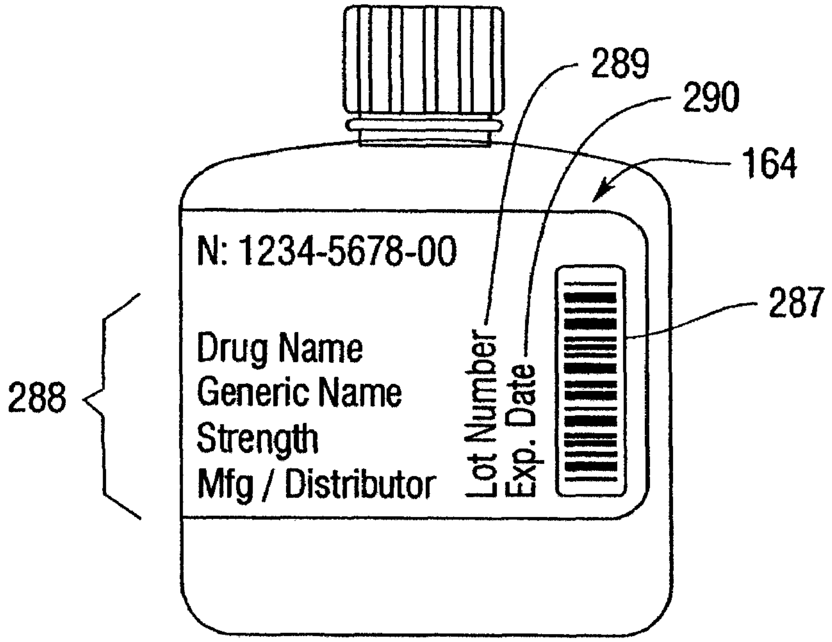
FIG. 18 illustrates a typical bulk medicament stock bottle and label.

FIG. 18 illustrates a typical bulk medicament stock bottle 164 as supplied to a pharmacy by a medicament manufacturer. The bulk medicament stock bottle 164 will generally contain a stock bottle bar code indicia 287 which is unique to the medicament and may also contain a package size code which represents the quantity of medicament in the bulk medicament stock bottle 164. The bulk medicament stock bottle 164 also contains textual information 288 specific to the batch or lot of medicament contained within bottle 164. A lot number 289 and expiration date 290 are printed by the manufacturer when the medicament is packaged into the bulk medicament stock bottle 164. The lot number 289 is used by the pharmacy to track medicament dispensed to patients should the medicament be recalled by the manufacturer. The expiration date 290 is the date by which the medicament must be repackaged into a patient prescription and sold by the pharmacy.

Figure 19:
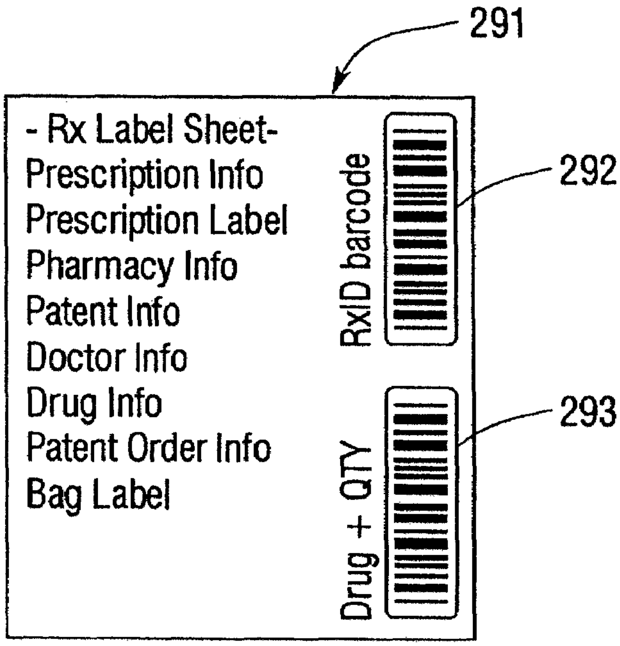
FIG. 19 illustrates a typical patient prescription label sheet as used by a pharmacy.

FIG. 19 illustrates a patient prescription sheet 291 printed by the pharmacy computer system for each patient prescription. The patient prescription sheet 291 comprises a vial label that is applied to the prescription vial 130, prescription bar code indicia 292, and medicament bar code indicia 293, among others. The prescription bar code indicia 292 is a machine readable indicia and represents the patient prescription and allows controller 12 to retrieve various elements of the patient prescription. The various elements of the patient prescription may comprise the prescription information (e.g. prescription number, refill number, number of refills, quantity), medicament information (e.g. drug number, drug name, generic drug name, strength, dosage form, manufacturer/distributor), prescription label as required by the particular state pharmacy laws, patient information, prescribing doctor information, order grouping information used to associate all of the patient prescriptions, a bag label to be placed on the completed prescription bag containing the prescription vial 130 and other prescription instruction sheets or coupons, among others.

Figure 20:
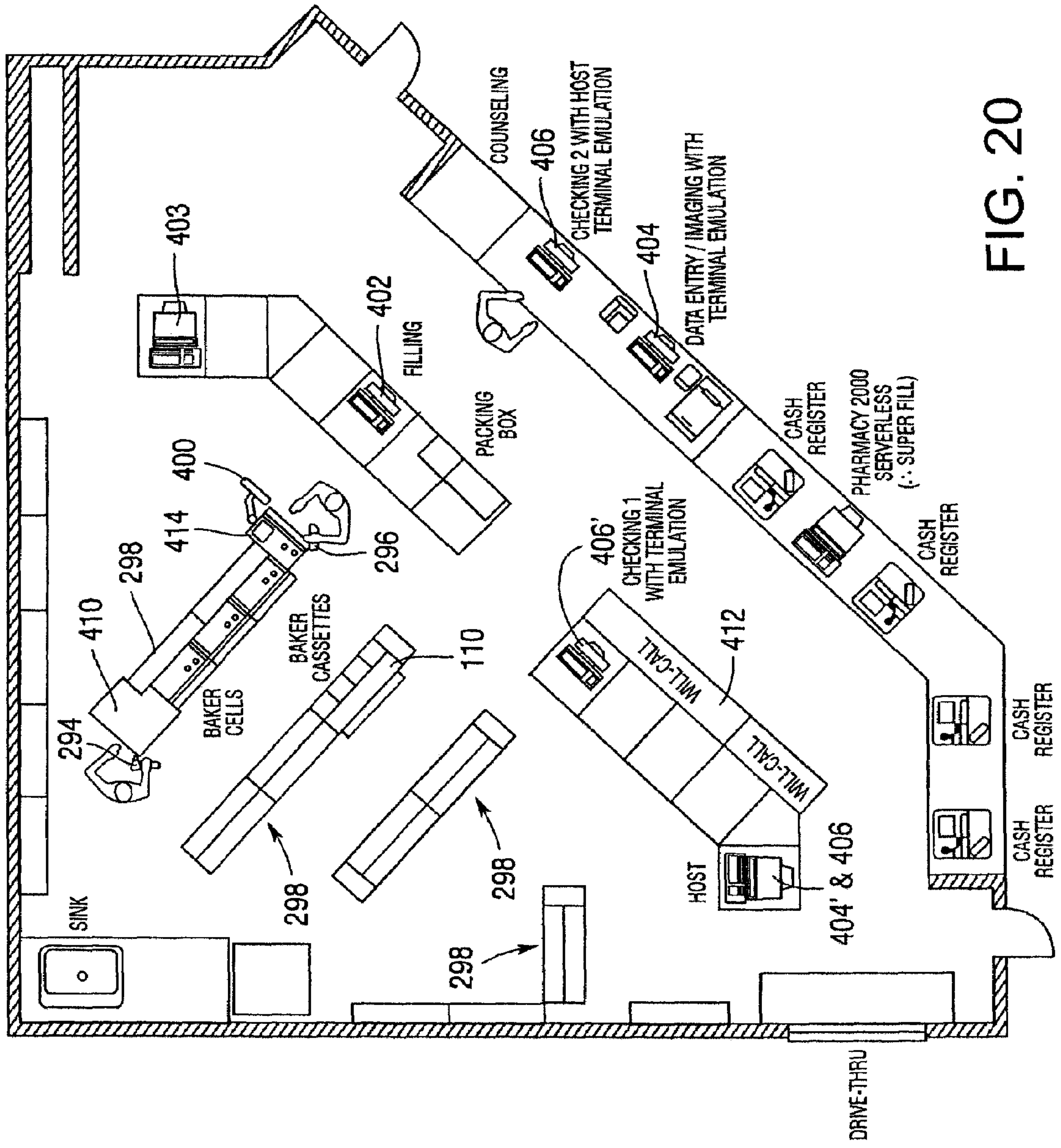
FIG. 20 illustrates a typical pharmacy layout utilizing a medicament dispensing cabinet of the type shown in FIG. 14.

FIG. 20 illustrates a layout of a typical pharmacy utilizing the medicament dispensing cabinet 110, open shelving 298, dispensing computer 400, cordless bar code scanner 294 (RF, IR, ultrasonic, etc.), handheld computer or handheld computer which incorporates a bar code scanning device 296, filling workstation 402, pharmacy system 403, data entry workstation 404, pharmacist checking workstation 406, inventory workstation 410, an area for completed prescriptions generally known as 'will call' area 412 and a check out station 414. Additionally, one or more duplicate medicament dispensing cabinets 110, dispensing computers 400, filling workstations 402, pharmacy systems 403, data entry workstations 404, pharmacist checking workstations 406, inventory workstations 410, 'will call' areas 412 and check out stations 414 are also intended to be within the scope of the present invention, which may be used to simultaneously interact to properly fill and verify patient prescriptions. For example, multiple medicament dispensing cabinets 110, cordless bar code scanners 294 and handheld computers or handheld computers 296 which incorporates bar code scanning devices may be used simultaneously to properly replenish, operate and maintain the removable dispensing device 112 and dispensing cell 116.

Figure 21:
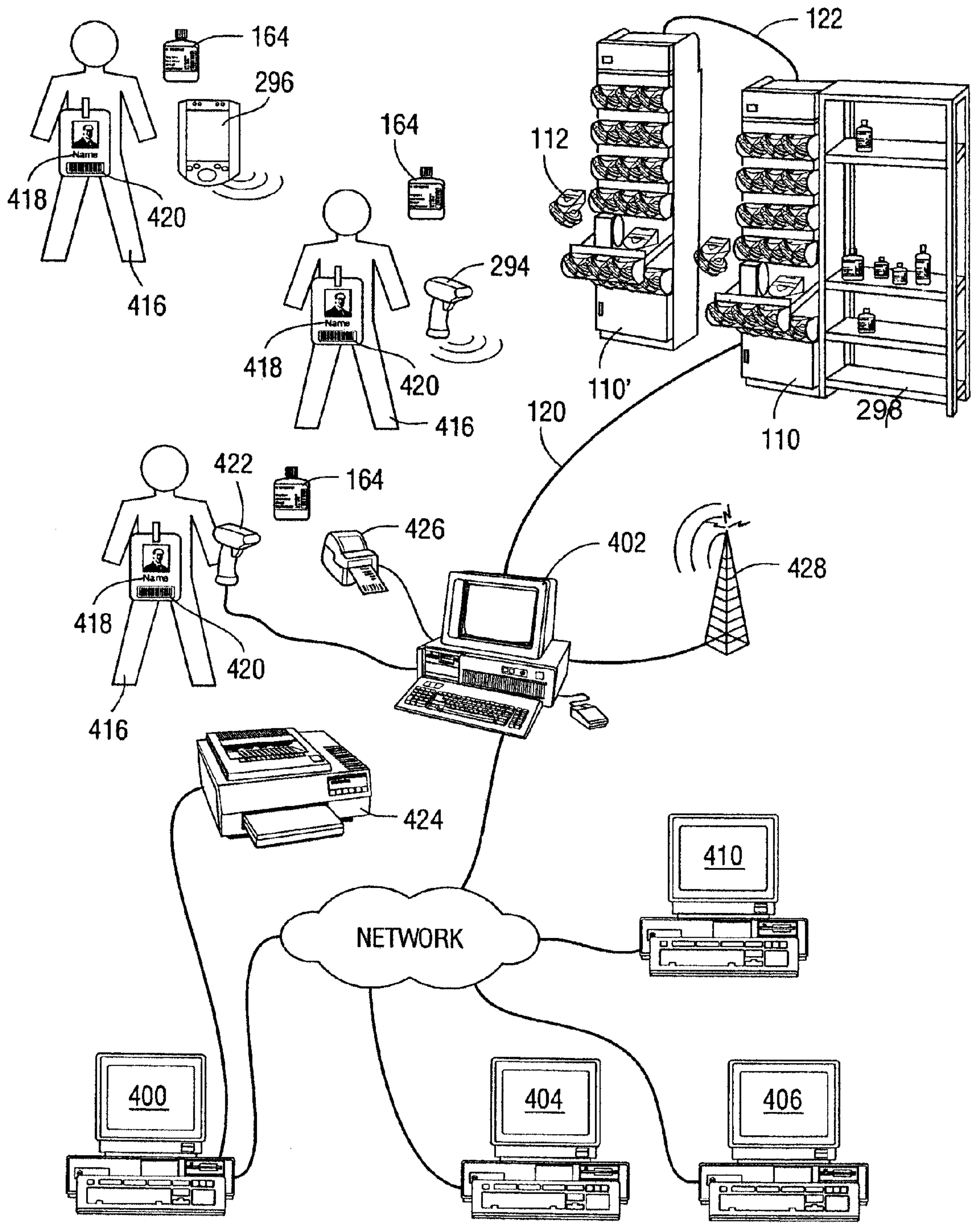
FIG. 21 illustrates a pharmacy computer system and medicament dispensing cabinets.

Turning to FIG. 21 each worker 416 in the pharmacy is assigned an identification badge 418 or bracelet (not shown) which contains bar code indicia 420 that can be scanned by a bar code reader 422, cordless bar code reader 294 or handheld computer or handheld computer which incorporates a bar code scanning device 296 or can be manually entered into one of the computers. FIG. 21 further illustrates a medicament dispensing system showing the various workstation configurations and functional interconnection of the components as they are used to implement the processes of filling a patient prescription, replenishing the removable dispensing devices 112, and maintaining or cleaning the dispensing devices 112. In the present embodiment, the filling workstation 402, dispensing computer 400, and the remainder of the pharmacy computer system are interconnected via a network providing intercommunication of files, data and instructions among the connected computers and workstations. In addition, the remainder of the pharmacy computer system may be further comprised of the data entry workstation 404, checking workstation 406, inventory workstation 410, and a printer 424.

In the present embodiment, the filling workstation 402 comprises a computer, display, and keyboard although, as previously mentioned, the terms "computer", "workstation" or the like are to be construed to mean any type of control device. The filling workstation 402 may incorporate the controller 12 or may be replaced by the controller 12, although the controller may be placed at any convenient location "downstream" of the host management system. The filling workstation 402 is responsive to the bar code reader 422 and may control a printer such as prescription label printer 424. A radio frequency transmitter/receiver 428 may be provided for communication with the cordless bar code scanner 294 and the handheld computer or handheld computer which incorporates a bar code scanning device 296. The filling workstation 402 is connected to a first medicament dispensing cabinet 110 by the cable 120. Additional medicament dispensing cabinets 110' may be connected to the first medicament dispensing cabinet 110 by the cable 122.

Figure 22:
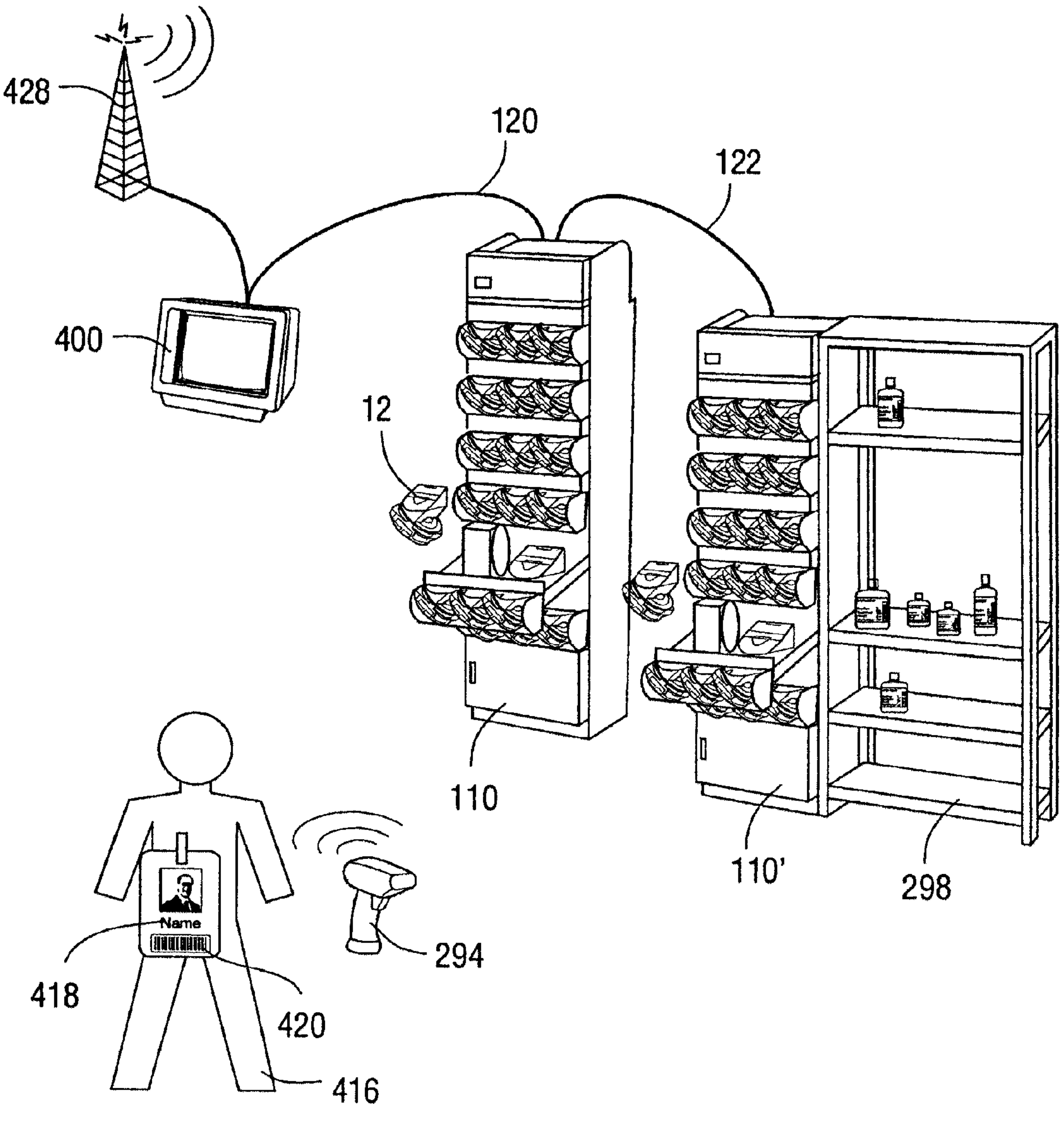
FIG. 22 illustrates a dispensing computer utilizing a cordless bar code scanner in conjunction with dispensing cabinets and open shelving.

FIG. 22 is an illustration of a medicament dispensing system showing the filling workstation 402 implemented by utilizing a dispensing computer 400 to control the processes of filling a patient prescription, replenishing the removable dispensing devices 112, and maintaining or cleaning the dispensing devices 112. In the present embodiment, the dispensing computer 400, and pharmacy computer system are interconnected via a central network providing intercommunication of files, data and instructions. The dispensing computer 400 is further connected to the radio frequency transmitter/receiver 428 for communication with, for example, cordless bar code scanner 294 and handheld computer or handheld computer which incorporates a bar code scanning device 296. The dispensing computer 400 may control the prescription label printer (not shown in FIG. 22). It should be apparent to those skilled in the art, however, that some of the components may be combined while remaining within the scope of the present invention. For example, the dispensing computer 400, radio frequency transmitter/receiver 428, and medicament dispensing cabinet 110 may be combined into a single unit to perform the same operations.

For simplicity of discussion, the filling workstation 402 and dispensing computer 400 as illustrated in FIGS. 18 and 19, respectively, are shown as separate components. It should be apparent to those skilled in the art, however, that the functions of the filling workstation 402 and dispensing computer 400 are similar in scope and in general are interchangeable with each other. Additionally, although in the embodiments shown, workers 416 identify themselves by badges or bracelets carrying bar codes, other forms of identification may be used including radio frequency (RF) tags, among others.

Figure 23:
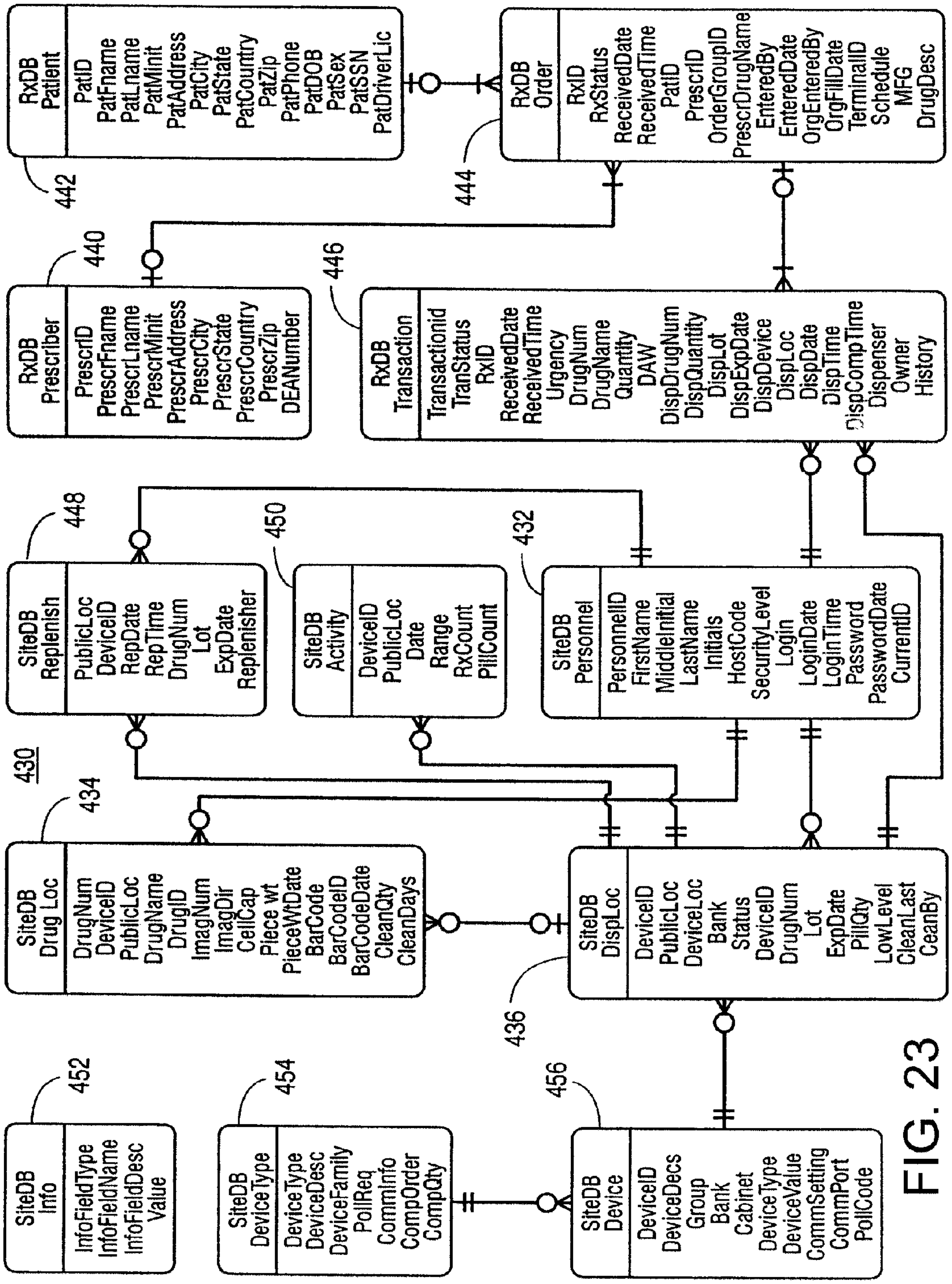
FIG. 23 illustrates a database which may be used in conjunction with the pharmacy computer system shown in FIG. 21.

FIG. 23 is a representation of a database 430 which may be utilized by controller 12. The database 430 has several fields, certain of which represent specific information about a specific worker. The database 430 has a personnel database 432 which includes fields representing the worker's name or initials, password, badge or bracelet indicia, worker classification or security level, medicament access security level, among others. Each worker is also assigned configurable settings that allow them the ability to fill prescriptions, replenish or access the removable dispensing devices 112, and retrieve another worker's fill prescription request.

The worker classification may be selected from a group which comprises a pharmacy technician, inventory clerk, pharmacist, or pharmacy manager (sometimes collectively referred to as a pharmacy worker). Each worker classification allows the worker to access or perform different functions or procedures within the controller 12. In addition, the worker classification defines a hierarchy to operating the controller 12. The pharmacy manager has the highest security level and is allowed access to all dispensing computer functions, including maintaining workers and their worker classifications. The pharmacist reports to the pharmacy manager and has the ability to perform tasks and override errors created by either a pharmacy worker or inventory clerk or other pharmacist but is restricted from modifying the worker database or each worker's classification. The pharmacy worker is allowed to operate the controller 12 to fill patient prescriptions; but may not be given access to all medicaments or may not be given the ability to replenish the removable dispensing devices 112 or perform maintenance (including cleaning) of dispensing cells 116, collectively referred to as servicing. The inventory clerk is allowed to replenish the dispensing devices 112, remove and replace removable dispensing devices 112 or return medicament to a dispensing device 112.

In addition, each worker is given a drug access level based on their experience and training. The medicaments used in a pharmacy are classified by the Food and Drug Administration (FDA) as being Over-The-Counter (OTC), prescription (RX), controlled substance (C2, C3, C4 or C5) or narcotic. These classifications determine the level of training or restrictions in handling while dispensing patient prescriptions or replenishing the removable dispensing device. The controller 12 maintains two levels of drug access security. If a worker is assigned an access security level of 'Controlled', they may access any medicament within the dispensing system. If a worker does not have the 'Controlled' access security level, the controller 12 will restrict their access to only the OTC or prescription drugs. The controller 12 will check the access level required for all medicaments in an entire dispensing drawer 114 before the worker will be allowed access. If the drawer contains a 'Controlled' medicament and the worker does not have access to 'Controlled' medicaments, the worker will not be allowed to replenish, clean or maintain the removable dispensing device 112 or dispensing cell 116 requested by the worker. The allocation of responsibility/access may change from pharmacy to pharmacy or periodically within a pharmacy. Security can thus be individualized based on employees as discussed above or based on dispensers (dispensing cell 116 plus dispensing device 112) as discussed below.

A database 434 of each medicament that may be dispensed from the medicament dispensing cabinet 110 is also maintained. Each medicament is assigned a drug access level that corresponds to the user drug access level. The medicament database is typically maintained only by a pharmacist or pharmacy manager.

A database 436 for each dispensing cell 116 comprising dispensing cell indicia, e.g. bar code 144, textual drug description for display, textual drug number (NDC or DIN), indicia on the removable dispensing device 116, medicament stock bottle indicia 287 (see FIG. 18), among others, is also maintained. Each dispensing cell 116 maybe associated to several medicament stock bottle indicia 287.

The database 430 also contains a prescriber database 440, patient database 442, order database 444 and transaction database 446. A replenish database 448 and site activity database 450 are provided, as are site information database 452, device type database 454 and site device database 456 as shown in FIG. 23.

Figure 24:
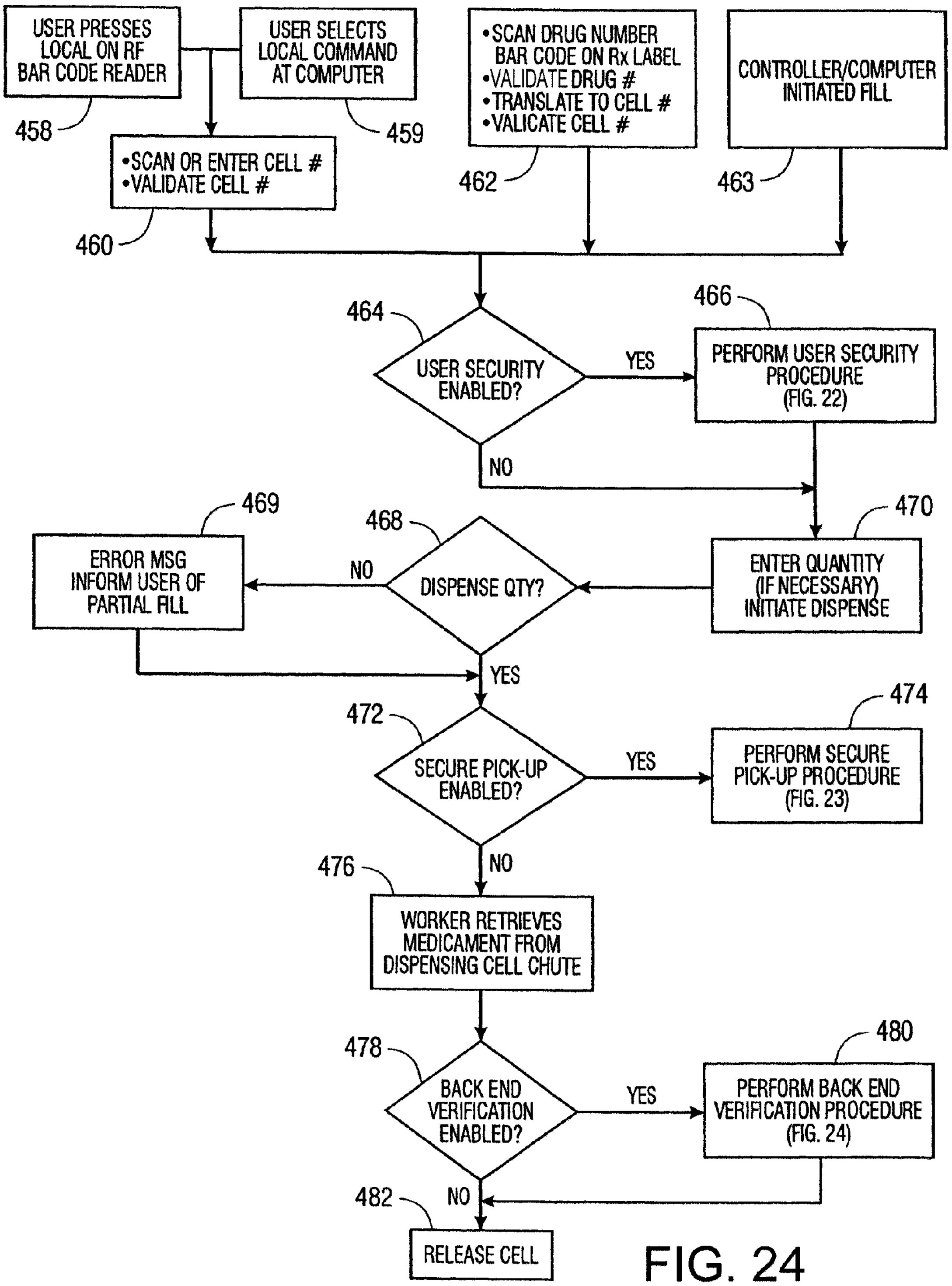
FIG. 24 is a high level flow chart illustrating a patient prescription filling process.

Now referring to FIG. 24, the controller 12 of the present invention can control and interact with the cabinet 110 to facilitate a method for directing and tracking the patient prescription filling process and verifying the proper steps are taken by a pharmacy worker and recording the medicament and prescription filling details which occur during the patient prescription filling process. As stated before, cabinet 110 is but one example of the kind of hardware that can be controlled by controller 12. During normal operation of the medication dispensing cabinet 110, the dispensing cell 116 is idle, waiting for instruction.

The prescription filling process may be initiated in one of several ways as shown in FIG. 21. As shown at 458, a user may press the "local" button on a cordless bar code reader followed by scanning or entering a cell number at 460. Additionally, the process could begin by the user entering a command on a host computer or controller 12 to enter the "local" mode as shown at 459. Thereafter, the system validates the cell number. Alternatively, as shown in block 462, the user may scan a drug number bar code on a prescription label which causes the system to validate the drug number, translate the drug number to the appropriate cell number, and validate the cell number. Alternatively, prescription filling could be initiated electronically by the host computer or the controller 12 as shown at 463.

From either block 460, 462, or 463 the system then determines if user security is enabled at 464. If user security has been enabled, then a user security procedure is performed as shown by block 466. That procedure is described in detail in conjunction with FIG. 25. After performance of the user security procedure, or if the user security was not enabled, the process proceeds with block 470. When the patient prescription is to be dispensed by a dispensing cell 116, the controller 12 instructs the appropriate dispensing cell 116 of the proper quantity of medicament 162 to dispense at 470. As the medicament 162 is dispensed, the cell display 138 associated with the dispensing cell 116 indicates the present quantity dispensed into the chute 132 located in the dispensing cell 116.

When the patient prescription dispensing is complete, a determination is made at step 468 as to whether the entire quantity was dispensed. If the entire quantity was dispensed, the pharmacy worker 416 is notified by the drawer controller 146 through the illumination of the 'READY' annunciator LED 140 or displaying a message on the cell display 138. If the entire quantity was not dispensed, an error message is displayed at 469 and the worker is advised that the prescription was only partially filled.

After 469, or if the query at 468 is answered in the positive, the process continues with decision 472 where a determination is made if the secure pick up procedure is enabled. If yes, the secure pick up procedure is performed as shown by block 474 and described in detail in conjunction with FIG. 26. After the secure pick up procedure has been performed, which may preferably include a scanning by the worker of the barcode or other identification device associated with the prescription, or if the secure pick up procedure has not been enabled, the worker retrieves the medicament from the dispensing cell chute as shown by 476.

Based on the security configuration settings maintained by the controller 12, the dispensing cell's gate release 136 is enabled after the appropriate worker and dispensing cell identification security checks have been completed. Once these security verification checks have been successfully completed, the pharmacy worker 416 may press the gate release 136 (with the prescription vial 130 under the chute 132), which opens the electronically operated dispensing chute gate 134, allowing the medicament 162 to fall from the dispensing cell's chute 132 into the patient's prescription vial 130.

Completing the description of the workflow illustrated in FIG. 24, after the worker retrieves the medicament, a determination is made at block 478 if a back end verification procedure has been enabled. If the procedure has been enabled, it is performed as shown by block 480 and described in detail in conjunction with FIG. 27. After the performance of the back end procedure or if the back end procedure has not been enabled, the cell is released at 482.

Figure 25:
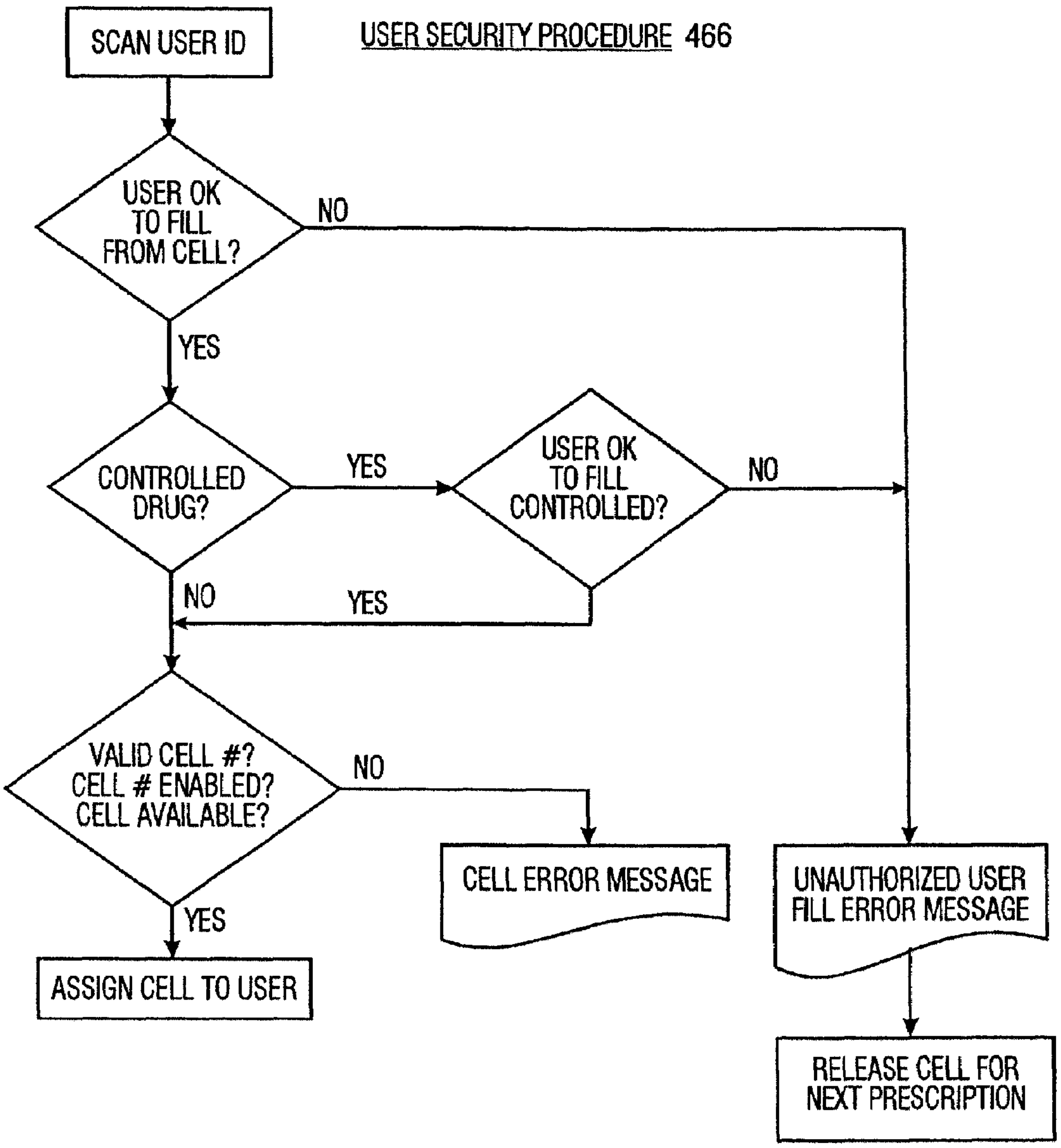
FIG. 25 is a flow chart illustrating the user security process shown in FIG. 24.

The user security procedure 466 is illustrated in FIG. 25 and is used to insure the worker security level will allow the worker to dispense medicament from a dispensing cell 116 based on medicament configuration settings maintained in the database in, e.g. the database 430. After the worker has initiated a medicament to be dispensed by one of the several methods illustrated in FIG. 24, the controller 12 directs the worker to scan their worker bar code indicia 420 on their identification badge 418 or bracelet. Other forms of user identification that could be implemented are an RF tag assigned to each user, fingerprint recognition, retinal scan, or other alternatives known in the art to specifically and uniquely identify an individual. The controller 12 will verify the pharmacy worker 416 has a medicament access level sufficient to dispense the medicament from the dispensing cell 116 by going through the following sequence of questions:

User OK to fill from cell?

Controlled drug? If yes, is user OK to fill this controlled drug?

Valid cell number?

Cell number enabled?

Cell available?

If the worker has the correct medicament access level, and the cell number is valid, enabled and available, the dispensing cell 116 is temporarily assigned to the worker, if not, the cell is released.

Figure 26:
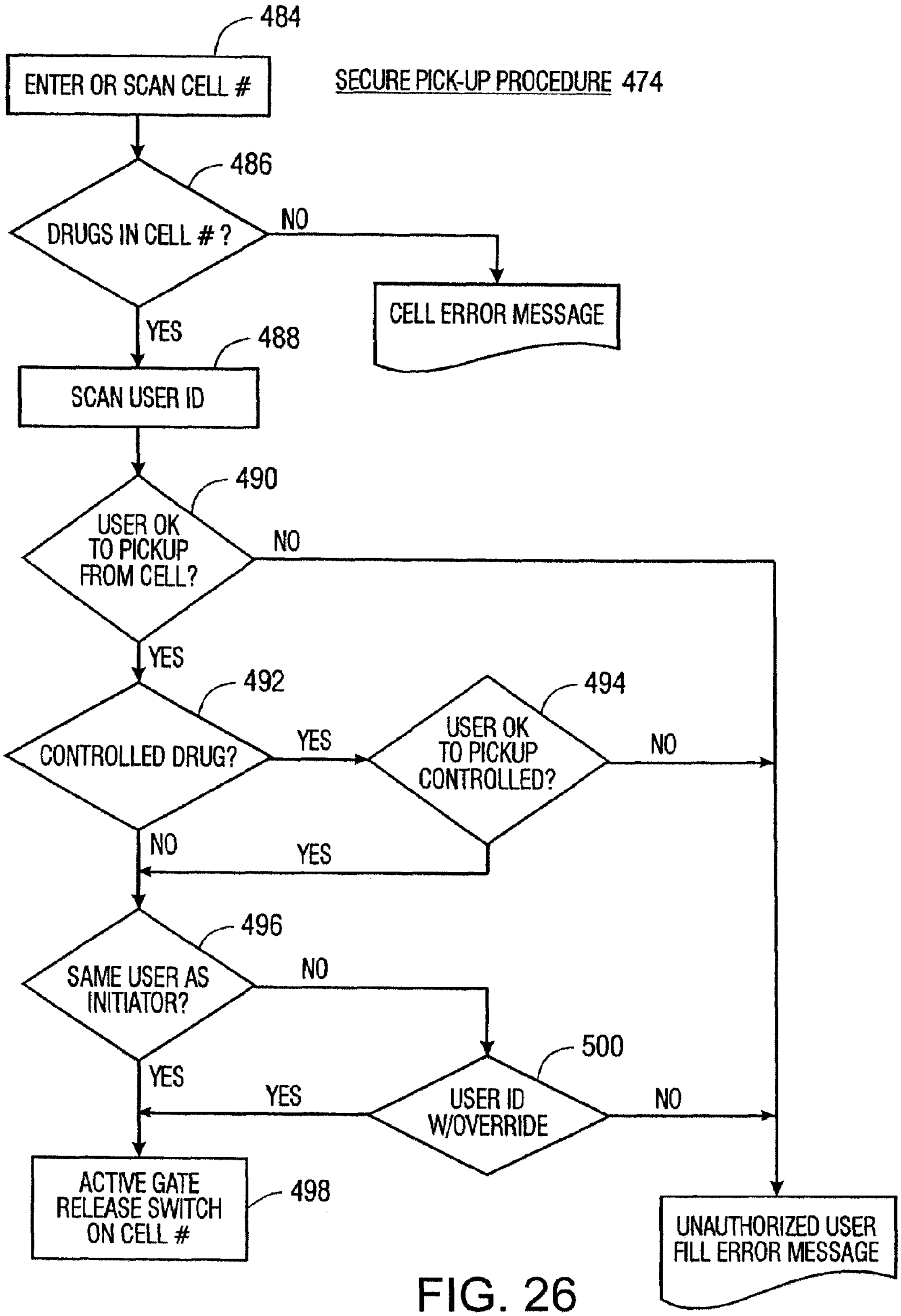
FIG. 26 is a flow chart illustrating the secure pick-up procedure shown in FIG. 24.

The steps required for verifying the pharmacy worker or pharmacist which originally initiated the dispensing event and for verifying that the cell 116 has the proper medicament access level, i.e. the secure pick up procedure 474, are shown in FIG. 26. The worker is instructed at 484 to scan the dispensing cell bar code indicia 144 to identify the dispensing cell 116 from which medicament 162 is being retrieved by the pharmacy worker. If the identified dispensing cell 116 contains medicament ready for pick up as shown at 486, the controller 12 then directs the worker to scan the worker bar code indicia 420 of the worker's identification badge 418 or bracelet at 488. The controller 12 verifies at 490, 492 and 494 that the medicament access level of the worker will allow retrieval of the medicament in the dispensing cell 116. The controller 12 then verifies if the worker picking up the dispensed medicament is the same worker that initiated the dispensing event by checking if the dispensing cell was temporarily assigned to this worker at 496. If there is a match, the controller 12 enables the gate release 136 by sending instructions to the drawer controller 146 at 498. If the worker did not originally initiate the dispensing event, the controller 12 must check the worker database configuration setting to verify the worker seeking to retrieve the medicament has permission to retrieve a patient prescription initiated by another worker. If the worker is allowed to pick up another worker's prescription as shown at 500, the gate release 136 is enabled for the dispensing cell 116.

During continued use of the medication dispensing cell 116, the status of the dispensing cell may change and this state change may be indicated on the appropriate dispensing cell annunciator LED 140 and/or the cell display 138. The dispensing cell 116 may indicate to the pharmacy worker 416 when the removable dispensing device 112 should be replenished by illuminating the 'MAINTENANCE' annunciator LED 140 and also displaying additional replenishment message information on the cell display 138. Should a problem be detected in the dispensing cell 116 or dispensing device 112, need for this type of service may be indicated using the 'ERROR' annunciator LED 140 in combination with messages displayed on the cell display 138.

In some extremely busy pharmacies, the patient prescription filling task is subdivided further and requires the controller 12 to allow a first pharmacy worker to initiate the medicament dispensing while a second pharmacy worker retrieves the medicament 162 from the dispensing cell 116 upon completion as shown in FIG. 26. As discussed above in conjunction with FIG. 23, the system maintains a pharmacy worker database 432 of security levels for each worker that may be set which allows a worker to retrieve medicament from the dispensing cell initiated by another worker. This capability allows a second pharmacy worker to initiate the secure pickup of a patient's prescription from a dispensing cell while maintaining the verification and pharmacy worker auditing trail needed in busy pharmacies. The same security level for both fill and pickup can be enabled or disabled independently.

Figure 27:
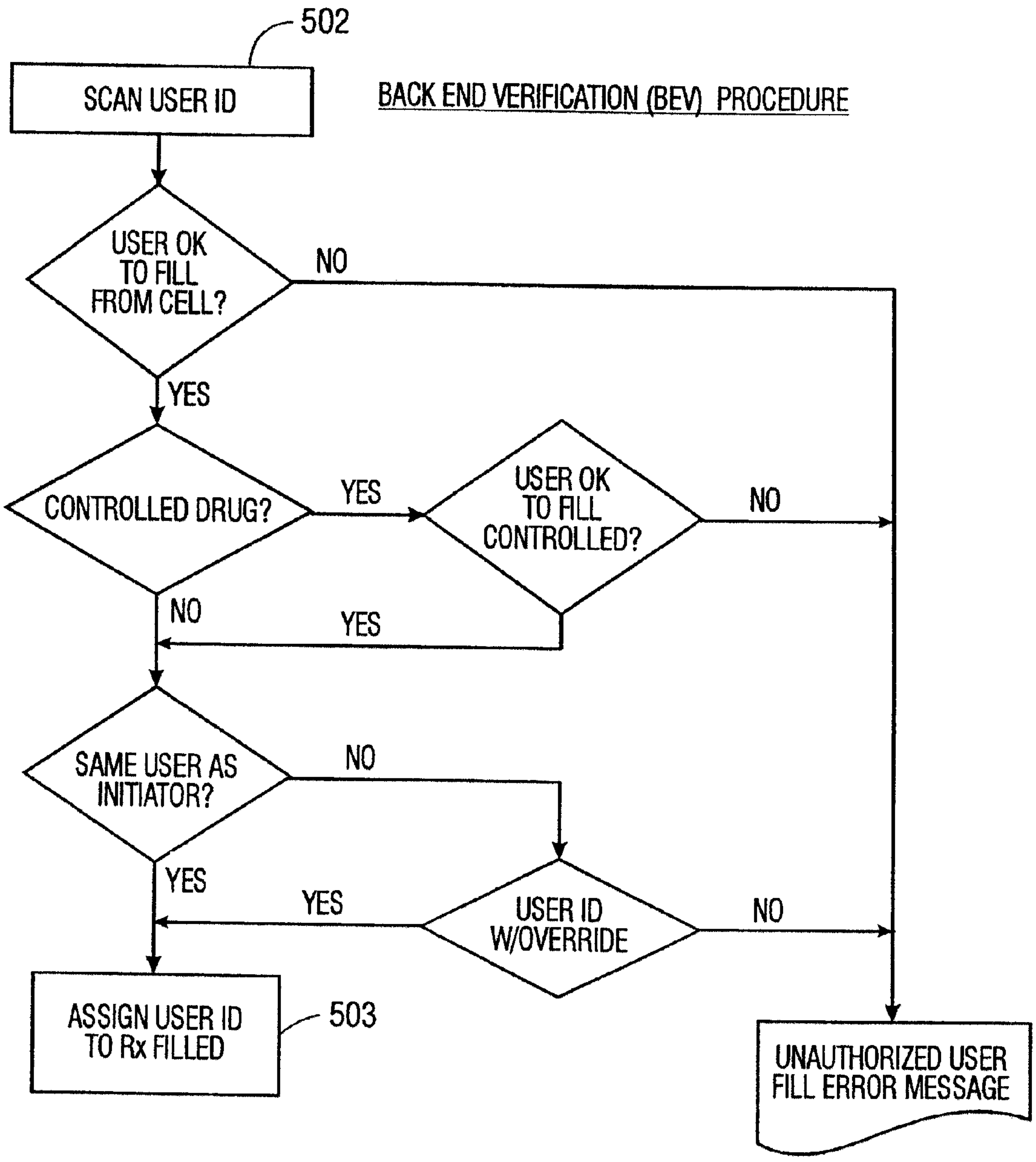
FIG. 27 is a flow chart illustrating the back end verification procedure shown in FIG. 24.

Another level of pharmacy worker auditing captured by the system is the back end verification procedure shown in FIG. 27. That procedure requires the pharmacy worker identification bar code indicia 420 to be scanned immediately after the medicament 162 retrieval from the dispensing cell 116 as shown in FIG. 27 at 502. The controller 12 receives a signal from the medicament dispensing cabinet 110 indicating the dispensing cell 116 from which medicament 162 was retrieved. This signal is associated with the pharmacy worker 416 identified by the worker identification badge scanned and verifies the correct pharmacy worker retrieved the patient prescription. The user ID is assigned to the filled and picked up prescription as shown at 503.

The back end verification procedure can be expanded to allow the worker the capability to instruct the controller 12 when the medicament 162 retrieved from the dispensing cell 116 will be returned to the removable dispensing device 112. An example of such a "return to stock procedure" is illustrated in FIG. 27C. This procedure provides the user with a way of dealing with a patient canceling a prescription, a prescription not being picked up, prescription errors that may be caught after the prescription has been initiated for dispensing, or returning stock after a cycle count. The return to stock portion of the back end verification process insures accurate inventory quantity records while also insuring the dispensing device's medicament integrity by directing, tracking and verifying the worker while performing the steps of the return to stock task.

Figure 27A:
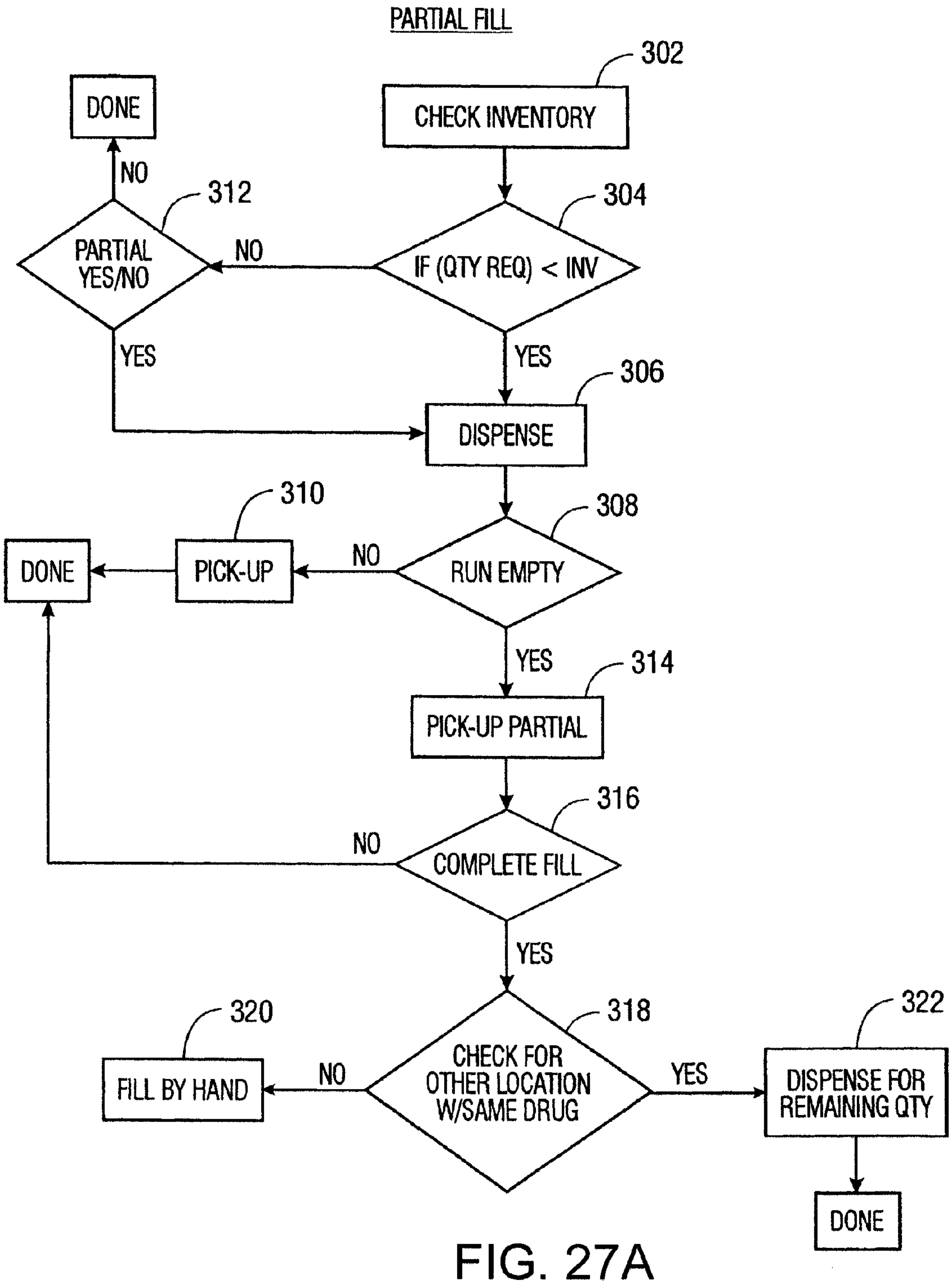
FIG. 27A is a flow chart illustrating a partial fill process.

The back end verification procedure can be further expanded to allow the worker to handle partial prescription fills when the dispensing device runs empty while dispensing a patient prescription as shown in FIG. 27A.

In FIG. 27A, after a dispensing location for filling has been selected, and the desired quantity requested, a check is made at 302 to ascertain the inventory at that dispensing location. At 304, if the quantity requested is less than the inventory at that location, a dispensing event occurs at 306. At 308, a decision is made as to whether the dispense ran the inventory at that location to zero. Recall that in 304 the quantity required was determined to be less than the current inventory, so the determination at 308 will be negative leading to a pick up event at 310 followed by the conclusion of the process.

If at 304 the quantity required was equal to or greater than the inventory at the dispensing location, a decision is made at step 312 whether a partial dispense is acceptable. If not, the process terminates with an appropriate message. If a partial dispense is possible, then a dispensing event occurs at 306.

From 306, at decision 308, because the quantity required was greater than the inventory, this dispensing location has been emptied by the partial fill, which may be picked up at 314. A decision is made at 316 if the fill should be completed. If not, the process concludes; if yes, another location with the same drug is searched for at 318. If no automated dispensing device is located, instructions are provided at 320 to complete filling the prescription by hand. If, on the other hand, an automated dispensing device is identified, then a dispensing event occurs at 322 for the remaining quantity. The partial fill process can track the identification of both the worker retrieving the first prescription portion from the dispensing cell 16 and the worker completing the second prescription portion, or the worker retrieving the second prescription portion from another dispensing cell 16, and finalizing the complete prescription before it is checked by the pharmacist. Additional labels for multiple vials can be prepared as needed.

Figure 27B:
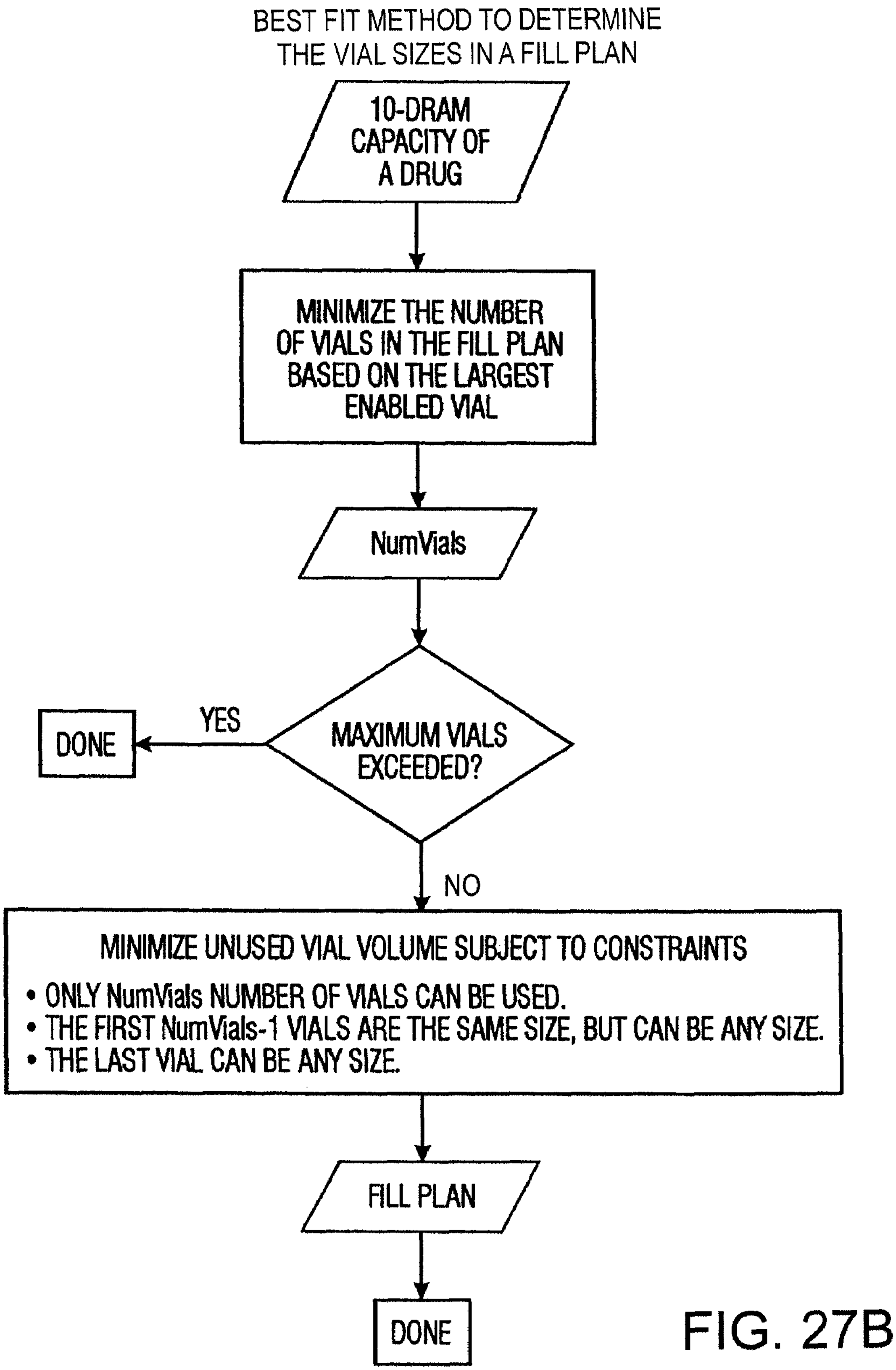
FIG. 27B is a flow chart illustrating a best fit vial sizing process.
Figure 27C:
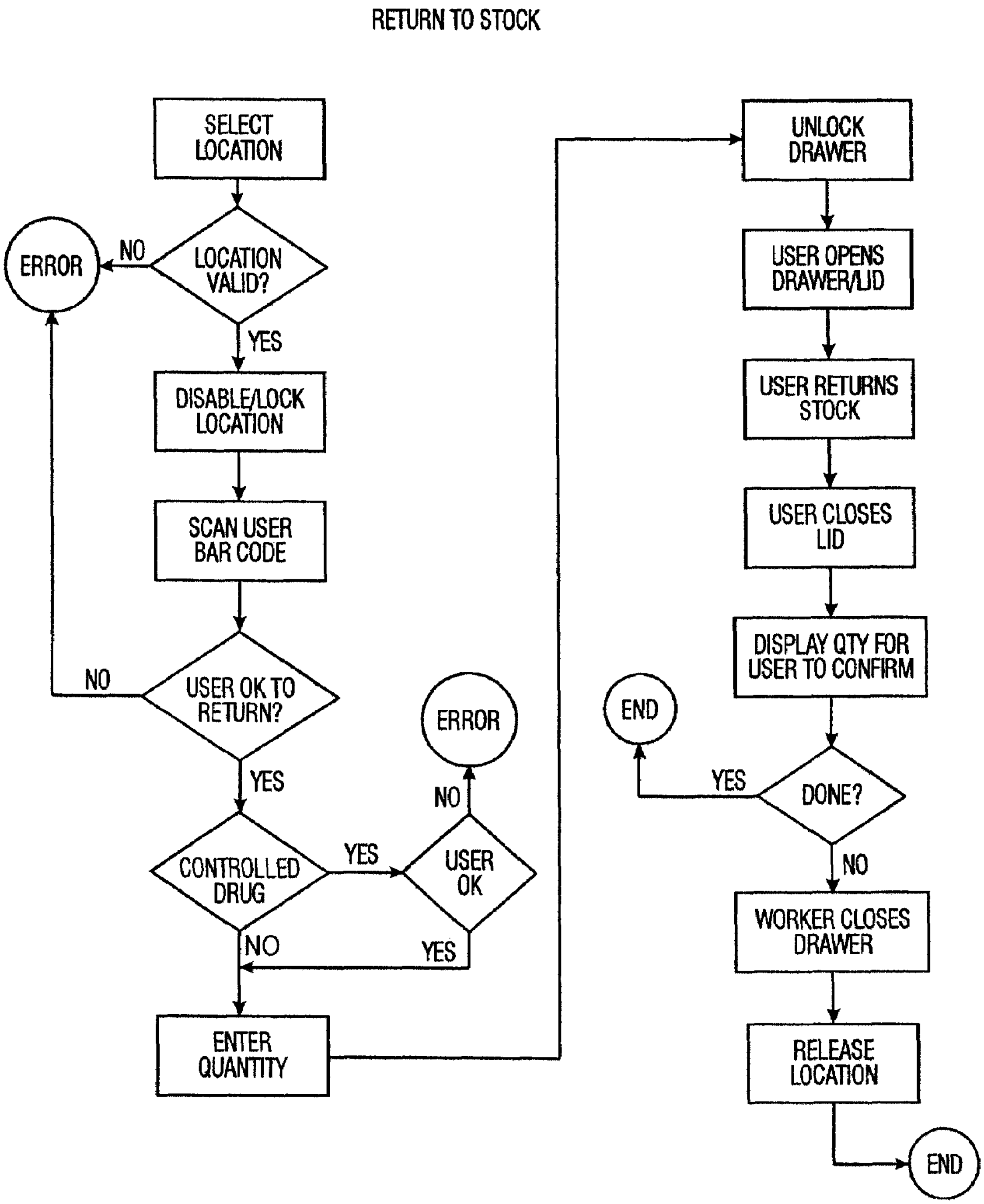
FIG. 27C is a flow chart illustrating a return to stock procedure.

Should a patient prescription require multiple prescription vials 130, the controller 12 will inform the worker of the vial size needed for each portion of the complete prescription. An example of that process in shown in FIG. 27B. The controller maintains a site configuration allowing a patient prescription to be broken into 'Best Fit' or 'Same Size' prescription medicament vials. The 'Best Fit' setting would select from the available site medicament vial sizes to best fill a prescription. When multiple vials are required, the largest medicament vial size would be used on the first and subsequent portions; while the smallest medicament vial size needed for the remainder of the prescription would be used on the final portion. The 'Same Size' setting would select from the available site medicament vial sizes to fill the complete prescription and all portions of the prescription would be in the same medicament vial size. The controller 12 would inform the worker of the vial size to use and the medicament quantity to dispense into each vial. Once all medicament vials 130 with the appropriate quantities were dispensed by a worker, the back end verification process would finalize the prescription as being completely filled and ready for checking by the pharmacist. The system maintains a database of medicament vial sizes, volumetric capacity and the recommended fill level. The system also maintains a medicament volumetric database and the quantity of medicament per volumetric standard which can be used to determine the appropriate vial size for a patient prescription quantity. Various vial combinations may be used, e.g., two medium vials instead of a large and a small vial based on business rules that could include cost, stock on hand, etc. The medicament volumetric database may be remotely updated on a periodic basis without intervention by a pharmacy worker.

Now referring to FIGS. 25A and 25B, the controller 12 may control the cabinet 110 to facilitate a method for verifying a pharmacy worker 416 correctly replenishes the removable dispensing device 112 in a medicament dispensing cell 116 with the correct medicament 162 retrieved from the pharmacy storage shelves 298. The worker initiates the replenishment procedure on the controller 12, cordless bar code reader 294 or handheld computer or handheld computer which incorporates a bar code scanning device 296 and is then instructed to scan the dispensing cell bar code indicia 144 on the dispensing cell 116 to be replenished at 510. The worker identification bar code indicia 420 is scanned and the controller 12 confirms at 512 if the worker is authorized to replenish the identified cell. The controller 12 displays the recommended replenishment quantity and other medicament information while also directing the worker to the bulk medicament stock shelf 298 within the pharmacy at 514. The controller 12 insures the correct medicament bulk stock bottle 164 is retrieved from the shelf 298 by requiring the pharmacy worker 416 to scan the bar code 287 located on the bulk stock bottle 164 at 516. The controller 12 then compares the bulk stock bottle bar code indicia 287 to the information stored in a database of approved bar code indicia values for the appropriate removable dispensing device 112 as shown at 518.

The controller 12 instructs the worker to enter the expiration date 290 printed on the bulk medicament stock bottle 164 at 520 and then compares the expiration date to the current date at 522. If the bulk medicament has expired, the worker is notified at 524 and prevented from replenishing the removable dispensing device 112. By checking the expiration date, the controller 12 insures the medicament 162 is not repackaged into patient prescriptions if it is beyond the expiration date.

The controller 12 instructs the worker to enter the lot number 289 printed on the bulk medicament stock bottle 164 at 526. If the current removable dispensing device 112 inventory quantity is not zero, the lot number of the medicament remaining in the dispensing device 112 at 528 is compared to the lot number 289 entered by the worker. If the two lot numbers do not match, the controller 12 must check a medicament dispensing system configuration setting for allowance of mixed lot numbers. If the mixing of lot numbers is not allowed, the worker is prevented from replenishing the dispensing device 112. By the controller 12 preventing mixing of medicament lot numbers 289, the pharmacy can accurately track the specific medicament lot number 289 used to dispense a patient prescription should the medicament be recalled by the manufacturer.

The pharmacy worker 416 and dispensing cell 116 are indicated by corresponding bar code scans of the pharmacy worker identification badge 418 and dispensing bar code indicia 144, respectively. The controller 12 confirms the pharmacy worker 416 is authorized to replenish the identified cell and can access all other dispensing devices 112 in the same dispensing drawer, and the correct medicament is available for the dispensing device 112 replenishment before unlocking the medicament dispensing drawer 114 through the process described above.

Once the dispensing cell 116 identification, pharmacy worker 416 identification, bulk medicament stock bottle 164 identification, expiration date 290, and lot number 289 have been entered and verified, the controller 12 will instruct the drawer controller to enable the drawer release switch 186 as shown at 530. The pharmacy worker 416 then has access to the removable dispensing device 112 to be replenished by pressing the drawer release switch 186 (see block 532) which actuates the electronic drawer locking mechanism into the unlocked position allowing the dispensing drawer 114 to be extended from the cabinet 110 as shown at 534.

The medicament dispensing drawer controller 146 and cabinet controller 118 monitor the drawer position switch 188 to confirm when a dispensing drawer 114 is unlocked and extended from the cabinet 110 far enough to change the state of switch 188. The dispensing drawer and cabinet controllers monitor the dispensing device switch 166 while the medicament dispensing drawer 114 is unlocked and extended from the cabinet to insure the correct dispensing device 112, and only the correct dispensing device 112, is opened for replenishment as shown at 538. The worker has the option of removing the dispensing device 112 from the dispensing cell 116 to better position the removable dispensing device 112 in a more convenient location or position for pouring medicament 162 from the stock bottle 164 and then returning the removable dispensing device 112 to the dispensing cell 116. The controller 12 records the actions of the pharmacy worker 416 and will not dispense a patient prescription from a dispensing device 112 incorrectly opened during the replenishment process. Once the pharmacy worker has replenished the dispensing cell 112, the drawer controller 146, cabinet controller 118 and, ultimately, the controller 12, monitor the dispensing device switch 166 and the drawer position switch 188 to insure the dispensing cell lid 168 is closed and the drawer 114 returned to the closed and locked position, respectively, before dispensing medicament from the dispensing cells within the drawer.

The controller 12 instructs the pharmacy worker 416 to either accept the default replenishment quantity maintained in the medicament database or enter the quantity of medicament added at 540. The controller 12 increases the dispensing cell inventory level by the quantity added and maintains this value in the medicament database at 542.

If during the replenishment procedure, and assuming appropriate security measures are set to "on", should the worker inadvertently open an incorrect removable dispensing device 112, the controller 12 will require a pharmacist to correct the error. This insures the medicament 162 within each dispensing device 112 is correct. The controller 12 will not dispense a patient prescription from either the dispensing cell associated with the dispensing device that should have been replenished or the dispensing cell associated with the dispensing device that was incorrectly opened by the pharmacy worker during the replenishment process. The corrective actions taken by the pharmacist will be recorded by the controller 12. The controller 12 records the pharmacist identification provided by a bar code scan of the pharmacist's identification badge 418 and the pharmacist scanning the dispensing cell bar code indicia 144 from each dispensing cell checked or corrected by the pharmacist.

Figure 28A:
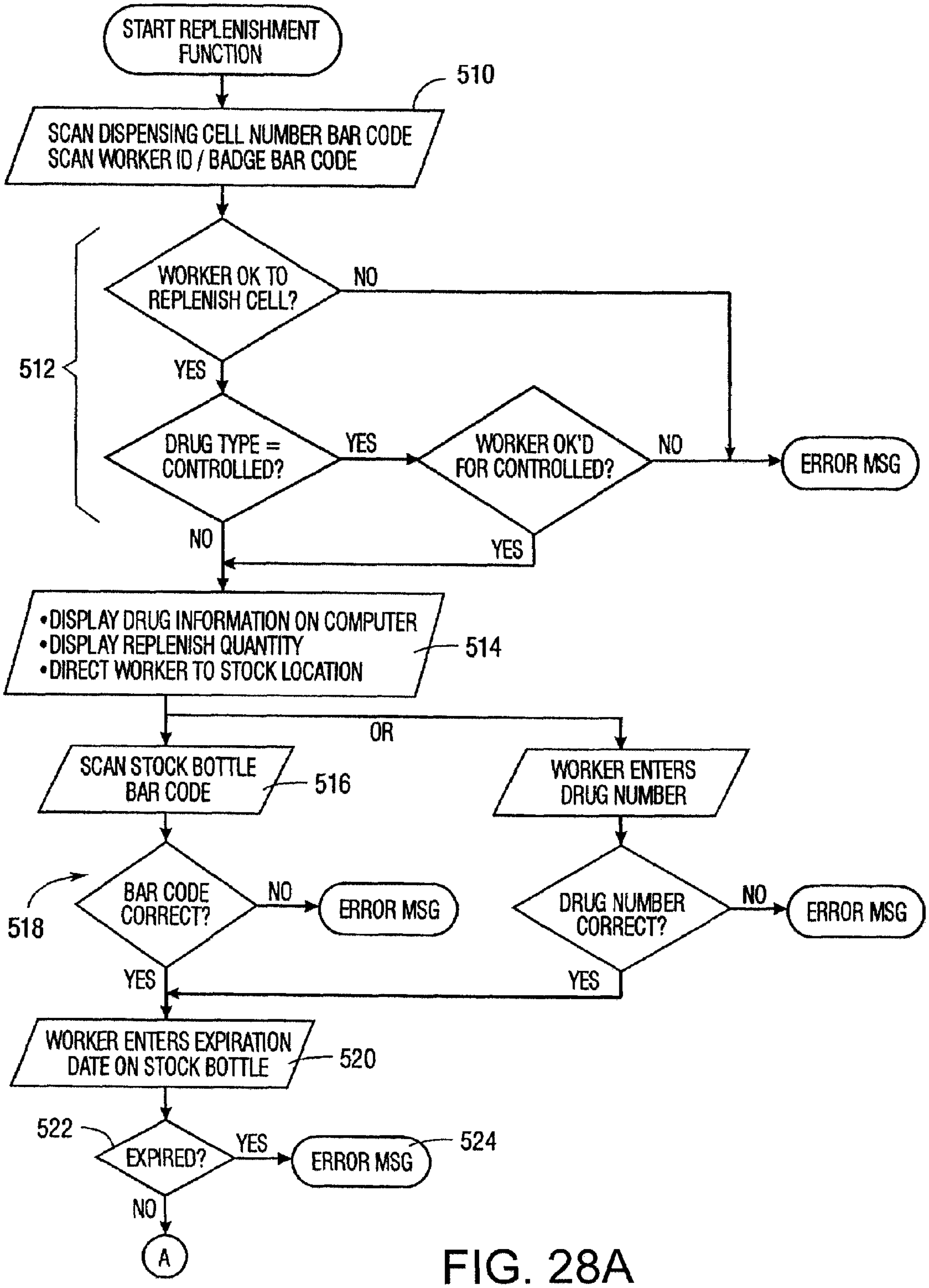
FIGS. 28A and 28B are a flow chart illustrating the dispensing cell and dispensing device replenishment function.
Figure 28B:
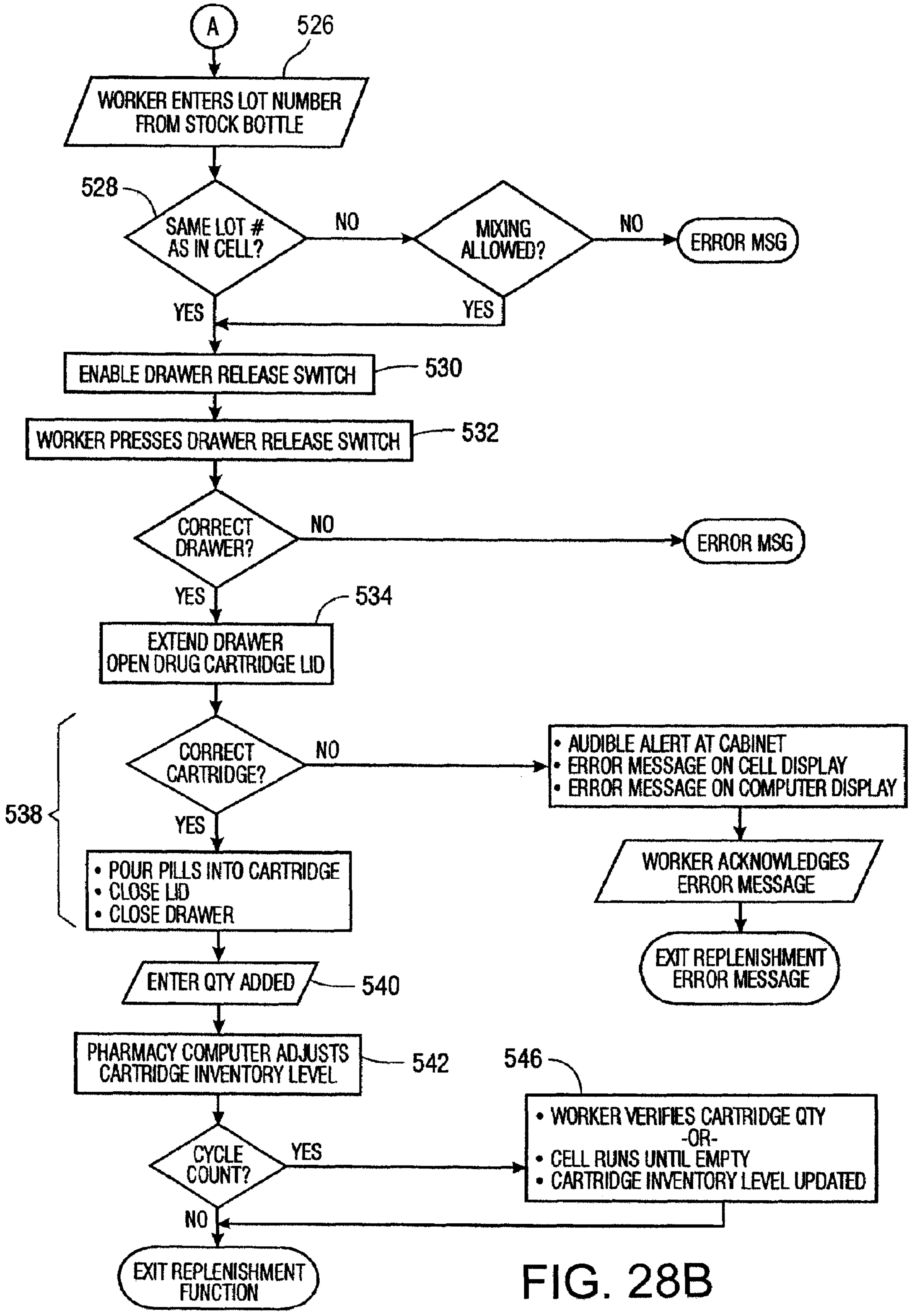

The pharmacy worker 416, e.g. inventory clerk, may initiate the cycle count procedure shown in FIG. 28B for a particular dispensing cell 116. The worker is guided through the steps as shown in the box labeled 546 to empty the removable dispensing device 112 of medicament 162 by the dispensing cell 116 operating and dispensing all medicament into the chute 132 for retrieval by the worker into a temporary container. The drawer controller 146 will pause the operation of the dispensing cell should it dispense a quantity equal to the maximum capacity allowed in the chute 132. The worker will be instructed to remove the medicament from the chute by pressing the gate release 136 with the temporary container under the chute. The drawer controller 146 will resume the inventory cycle count process once the worker has released the gate release 136 and the gate sensor 159 detects the chute gate 134 is in the closed position. When the drawer controller 146 has detected the removable dispensing device 112 is empty, the drawer controller 146 will stop the dispensing and instruct the worker to retrieve the medicament from the chute 132. The cell display 138 will indicate the total quantity dispensed during the cycle count procedure. The drawer controller 146 and cabinet controller 118 report the total quantity to the controller 12 and the worker will be allowed to accept this quantity as the correct inventory quantity for the dispensing cell 116. The controller 12 will record any variances for future processing or reporting. The worker is instructed to return the entire medicament dispensed during the cycle count procedure back into the removable dispensing device 112. At this time, the inventory value maintained in memory is in agreement with the physical inventory stored in the dispensing cell 116. The controller 12 monitors and tracks the worker and each step during the inventory cycle count procedure until the dispensing drawer 114 is returned to the fully closed position within the cabinet 110 and is in the locked position.

In summary, the controller 12 will direct, track and verify the worker during the replacement of the dispensing device 112 into the dispensing cell 116. The controller 12 directs the worker to identify the dispensing device 112, dispensing cell 116 and worker by scanning each item's unique bar code indicia. The controller 12 then directs the worker to the dispensing cell, illuminates the 'MAINTENANCE' annunciator LED 140, displays an appropriate message on the cell display 138 and unlocks the dispensing cabinet drawer 114 containing the dispensing cell 116. The controller 12 verifies the worker is allowed to access the dispensing device 112 identified by the dispensing cell bar code indicia 144 and all other dispensing devices in the dispensing drawer before unlocking the dispensing drawer. The controller 12 monitors the dispensing device switch 166 to insure the proper dispensing device was opened or inserted into the proper dispensing cell 116.

Figure 29:
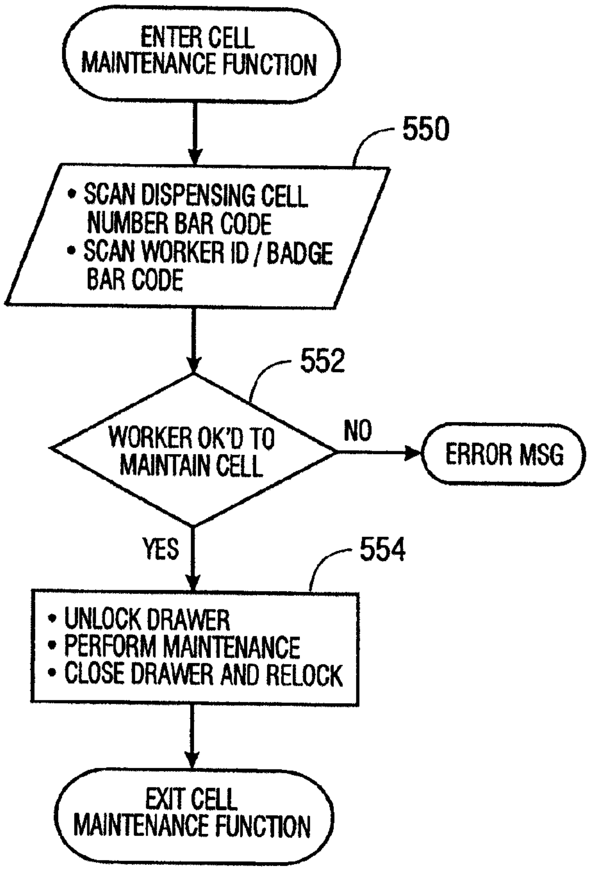
FIG. 29 is a flow chart illustrating a maintenance function.

The controller 12 may indicate to the pharmacy worker 416 when each dispensing cell 116 requires cleaning to maintain optimal dispensing cell performance. The system maintains two cleaning cycle fields for each dispensing cell. See FIG. 23, database 434. The first cleaning cycle field is the quantity of medicament to be dispensed from the removable dispensing device 112 before the 'MAINTENANCE' annunciator 140 is illuminated, indicating to the worker the dispensing cell should be cleaned. The second cleaning cycle field is the number of days between each cleaning cycle. Once the controller 12 determines the dispensing cell has not been cleaned in this number of days, the 'MAINTENANCE' annunciator LED 140 is illuminated. The pharmacy worker 416 may initiate the cleaning procedure from the controller 12, cordless bar code scanner 294 or handheld computer or handheld computer which incorporates a bar code scanning device 296. Referring to FIG. 29, the worker will be instructed to scan the dispensing cell bar code indicia 144 for the removable dispensing device 112 to be cleaned at 550. The worker 416 identification bar code indicia 420 must also be scanned and controller 12 verifies the worker is allowed to clean the identified cell and may access all cells in the dispensing drawer 114 at 552. At 554, electronic drawer locking mechanism may be actuated by the worker pressing the drawer release switch 186 to unlock the dispensing drawer 114 containing the dispensing device 112 and dispensing cell 116. The drawer controller 146 and cabinet controller 118 monitor the dispensing device switch 166 to verify the worker removes the correct dispensing device 112 from the dispensing cell 116 and the drawer position switch 188 to verify when the drawer is closed.

After the dispensing device and or dispensing cell have has been cleaned, or other maintenance performed, the pharmacy worker 416 must initiate the dispensing device insertion procedure on the controller 12, cordless bar code scanner 294 or handheld computer or handheld computer which incorporates a bar code scanning device 296. The worker will be directed through the proper steps required to return a removable dispensing device 112 to a dispensing cell 116. The dispensing cell must be identified by scanning the dispensing cell bar code indicia 144 and then the worker identified by scanning his indicia 420. The controller 12 verifies the worker is allowed to return a dispensing device 112 to the dispensing cell 116 and can access any cell 116 within the dispensing drawer 114. The electronic drawer locking mechanism may be actuated by the worker pressing the drawer release switch 186 to unlock the dispensing drawer 114 containing the dispensing device 112 and dispensing cell 116. The drawer controller 146 and cabinet controller 118 monitor the dispensing device switch 166 to verify the worker inserts the dispensing device into the correct dispensing cell. When the dispensing device is inserted into the dispensing cell, the dispensing cell tab 170 actuates the dispensing device switch 166. The drawer controller 146, cabinet controller 118, and controller 12 monitor the drawer position switch 188 to indicate the drawer has been closed and the dispensing device insertion procedure completed. Once the dispensing device has been correctly inserted, the worker may indicate to the controller 12 the cleaning process was completed which resets the quantity dispensed and number of days between cleaning intervals.

Figure 30:
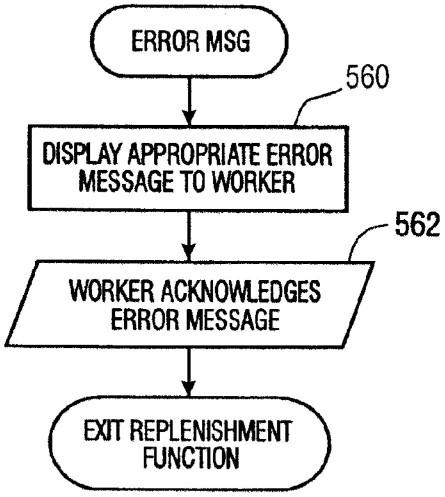
FIG. 30 is a flow chart illustrating an error message routine.

FIG. 30 is a flow chart illustrating an error message routine. The error message routine illustrated in FIG. 30 may be called in connection with any of the procedures previously discussed which requires the generation of an error message. As shown in FIG. 30, the error message is displayed at 560 followed by an acknowledgement by the worker at 562. Thereafter, the routine illustrated in FIG. 30 is exited.

It should be recognized that the above-described embodiments of the invention are intended to be illustrative only. For example although one embodiment was limited to the use of a single controller 12 in the product dispensing system 10, controller 12 may be deployed in combination with other controllers 14 in a single pharmacy environment while remaining within the scope of the present invention. Numerous alternative embodiments may be devised by those skilled in the art without departing from the scope of the following claims.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An interface comprising:

a memory configured to store:

one or more host definition files corresponding with a respective one or more host systems, said one or more host definition files comprises data defining one or more aspects of interacting with the corresponding host systems;

one or more backend definition files corresponding with a respective one or more product dispensing stations, said one or more backend definition files comprises data defining one or more aspects of interacting with the corresponding product dispensing stations; and a configuration file comprising information regarding the one or more host systems and the one or more product dispensing stations of a product dispensing system; and a processor in communication with the memory configured to:

access the one or more host definition files, the one or more backend definition files and the configuration file; and facilitate communication between the one or more host systems and the one or more product dispensing stations of the product dispensing system based at least in part on analyzing the data of the host definition files, the data of the backend definition files and the information of the configuration file.

2. The interface of claim 1, wherein the configuration file is specific to a particular installation of the product dispensing system.

3. The interface of claim 1, wherein the configuration file comprises an identification associated with respective host systems of the product dispensing system, an identification of the host definition files to use for interacting with the host systems, and an identification of the product dispensing stations of the product dispensing system.

4. The interface of claim 1, wherein respective host definition files comprise a description of a communication method to and from the corresponding host system.

5. The interface of claim 4, wherein the description comprises at least one of a message format layout, a description of how to implement a special handing script, or a pattern to recognize a type of message.

6. The interface of claim 4, wherein respective host definition files further comprise a mapping between a host message field and a backend message object.

7. The interface of claim 1, wherein respective backend definition files comprise a description of a communication method to and from the corresponding product dispending station.

8. The interface of claim 7, wherein the description comprises at least one of a message object definition, a command definition, or a backed service definition.

9. The interface of claim 1, wherein the processor is configured to receive information in a first format from at least one of the host systems and translate the received information into a second format that is recognizable by a respective product dispensing station, the second format is different from the first format.

10. A product dispensing system comprising:

one or more product dispensing stations;

a plurality of host systems configured to communicate with the one or more product dispensing stations; and an adaptive interface configured to:

analyze data in one or more host definition files defining one or more aspects of interfacing with corresponding ones of the host systems;

analyze data in one or more backend definition files defining aspects of interacting with corresponding ones of the product dispensing stations; and use the data in the host definition files and the backend definition files to facilitate communications between the one or more product dispensing stations and the host systems, and such that said one or more product dispensing stations and at least one of the host systems are configured to be altered, added or removed without requiring a change to any remaining host systems.

11. The product dispensing system of claim 10, wherein the adaptive interface further comprises a configuration file comprising information regarding the one or more host systems and the one or more product dispensing stations of the product dispensing system.

12. The product dispensing system of claim 10, wherein the interface is configured to receive information in a first format from at least one of the host systems and translate the received information into a second format that is recognizable by a respective product dispensing station, the second format is different from the first format.

13. The product dispensing system of claim 10, wherein respective host definition files comprise data indicating a description of a communication method to and from the corresponding host systems.

14. The product dispensing system of claim 13, wherein the description comprises at least one of a message format layout, a description of how to implement a special handling script, or a pattern to recognize a type of message.

15. The product dispensing system of claim 13, wherein the respective host definition files further comprise a mapping between a host message field and a backend message object that is associated with the data in a respective backend definition file.

16. The product dispensing system of claim 10, wherein respective backend definition files comprise a description of a communication method to and from the corresponding product dispensing station.

17. A product dispensing system comprising:

a controller;

one or more product dispensing stations in communication with the controller; and one or more validation devices also in communication with the controller, wherein the controller is configured to communicate with the one or more product dispensing stations and the one or more validation devices via an adaptive interface in response to the interface analyzing data in one or more host definition files corresponding with a respective plurality of host systems, the host definition files defining one or more aspects of interacting with the respective host systems and analyzing data in one or more backend definition files defining one or more aspects of interacting with respective ones of the one or more product dispensing stations, such that the one or more product dispensing stations and at least one of the host systems are configured to be altered, added or removed without requiring a change to any remaining host systems.

18. The product dispensing system of claim 17, wherein the one or more dispensing stations comprise one or more automated dispensing devices and one or more non-automated dispensing devices.

19. The product dispensing system of claim 17, wherein the one or more validation devices comprise some combination of a scale, a barcode scanner, an RF scanner and a quality control device.

20. The product dispensing system of claim 17, wherein the interface is configured to receive information in a first format from at least one of the host systems and translate the received information into a second format that is recognizable by a respective product dispensing station, the second format is different from the first format.

21. The product dispensing system of claim 17, wherein respective host definition files comprise data indicating a description of a communication method to and from the corresponding host systems.

22. The product dispensing system of claim 21, wherein the description comprises at least one of a message format layout, a description of how to implement a special handling script, or a pattern to recognize a type of message.

* * * * *